(12) United States Patent
Vaganay et al.

(10) Patent No.: US 12,209,974 B2
(45) Date of Patent: Jan. 28, 2025

(54) SYSTEMS, METHODS AND APPARATUS FOR SAFE LAUNCH AND RECOVERY OF AN INSPECTION VEHICLE

(71) Applicant: Square Robot, Inc., Boston, MA (US)

(72) Inventors: Jerome Vaganay, Norwell, MA (US); William O'Halloran, Boston, MA (US); Eric Levitt, Lincolnville, ME (US)

(73) Assignee: Square Robot, Inc., Marlborough, MA (US)

( * ) Notice: Subject to any disclaimer, the term of this patent is extended or adjusted under 35 U.S.C. 154(b) by 266 days.

(21) Appl. No.: 17/916,485

(22) PCT Filed: Apr. 2, 2021

(86) PCT No.: PCT/US2021/025540
§ 371 (c)(1),
(2) Date: Sep. 30, 2022

(87) PCT Pub. No.: WO2021/207019
PCT Pub. Date: Oct. 14, 2021

(65) Prior Publication Data
US 2023/0173551 A1 Jun. 8, 2023

Related U.S. Application Data

(60) Provisional application No. 63/120,778, filed on Dec. 3, 2020, provisional application No. 63/005,830, filed on Apr. 6, 2020.

(51) Int. Cl.
*G01N 21/954* (2006.01)
*B08B 9/093* (2006.01)
(Continued)

(52) U.S. Cl.
CPC ............ *G01N 21/954* (2013.01); *B08B 9/093* (2013.01); *B65D 90/44* (2013.01); *B65D 90/48* (2013.01);
(Continued)

(58) Field of Classification Search
CPC ........ G01M 3/3236; B63C 3/04; B65D 90/44; B65D 90/48; B08B 9/093; G01N 21/954; G01N 2021/9518
See application file for complete search history.

(56) References Cited

U.S. PATENT DOCUMENTS

| 5,640,982 A | 6/1997 | Landry et al. |
| 5,642,745 A | 7/1997 | Landry et al. |

(Continued)

FOREIGN PATENT DOCUMENTS

WO  WO-2019/035856 A1  2/2019

OTHER PUBLICATIONS

U.S. Patent and Trademark Office as International Searching Authority; International Search Report and Written Opinion; PCT/US2021/025540; Jun. 29, 2021; 8 pages.

*Primary Examiner* — Jonathan M Dunlap
(74) *Attorney, Agent, or Firm* — Foley & Lardner LLP

(57) ABSTRACT

Systems, methods and apparatus for launching and recovering a vehicle via a side manway of a tank are provided. A launcher is coupled to a vertical side of the tank via a manway adapter. The launcher includes a first side having a lid and a second side configured to couple with the manway adapter. The lid is removed from the first side of the launcher. An autonomous vehicle is loaded into the launcher via the first side of the launcher. The lid is placed on the first side of the launcher. The launcher can be pressurized with the autonomous vehicle inside the launcher. The manway adapter is opened at the second side of the launcher to (Continued)

release the flammable fluid into the launcher. Subsequent to opening the manway adapter, the autonomous vehicle launches from the launcher into the tank to perform a tank inspection process.

20 Claims, 49 Drawing Sheets

(51) Int. Cl.
*B63C 3/04* (2006.01)
*B65D 90/44* (2006.01)
*B65D 90/48* (2006.01)
*G01M 3/32* (2006.01)
*G01N 21/95* (2006.01)

(52) U.S. Cl.
CPC ............ *B63C 3/04* (2013.01); *G01M 3/3236* (2013.01); *G01N 2021/9518* (2013.01)

(56) References Cited

U.S. PATENT DOCUMENTS

| | | |
|---|---|---|
| 10,508,968 B1 | 12/2019 | Vaganay et al. |
| 11,526,168 B2 | 12/2022 | Lodhi et al. |
| 2016/0256904 A1 | 9/2016 | Hengen |
| 2020/0047016 A1 | 2/2020 | Staires et al. |

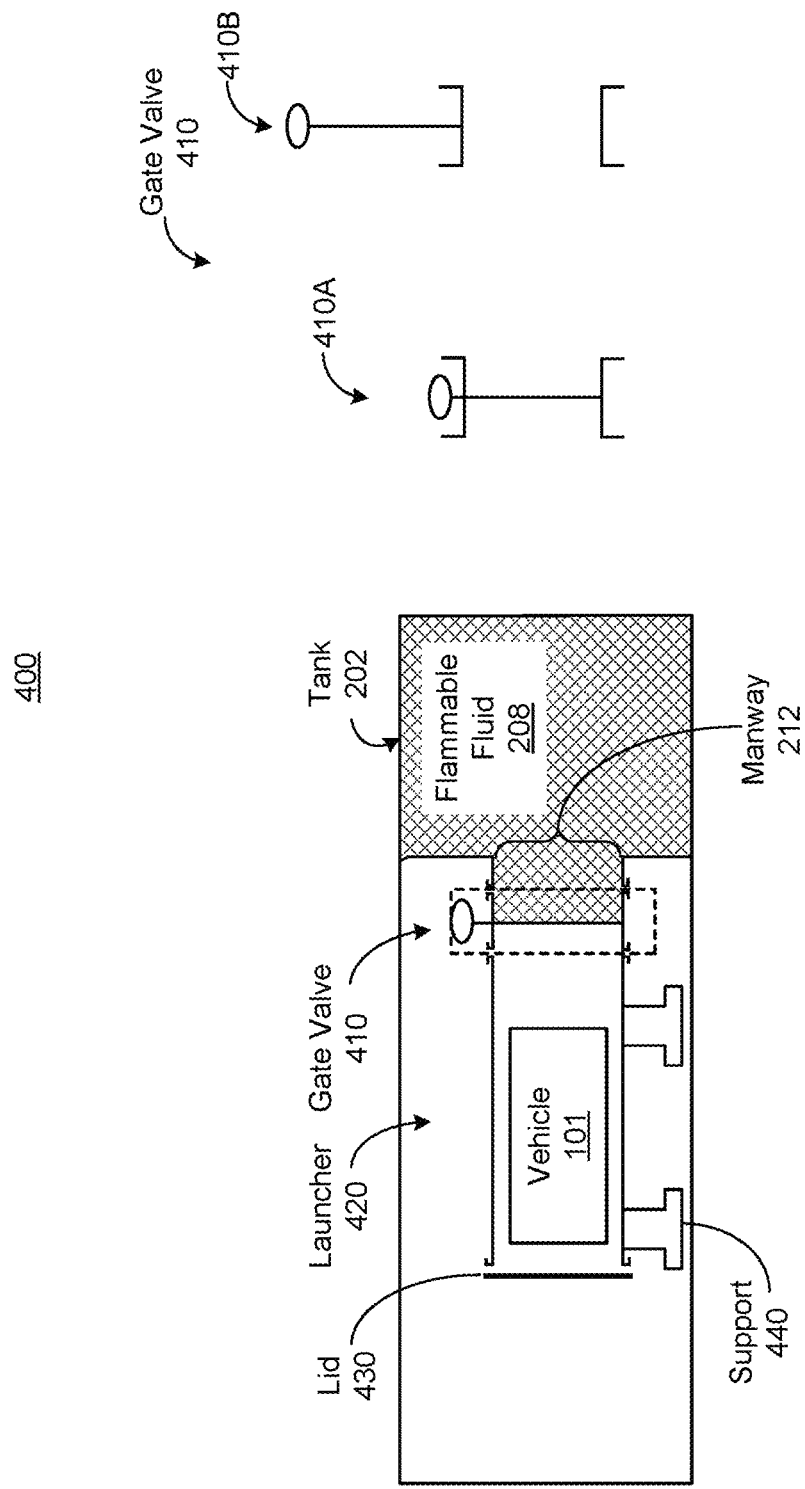

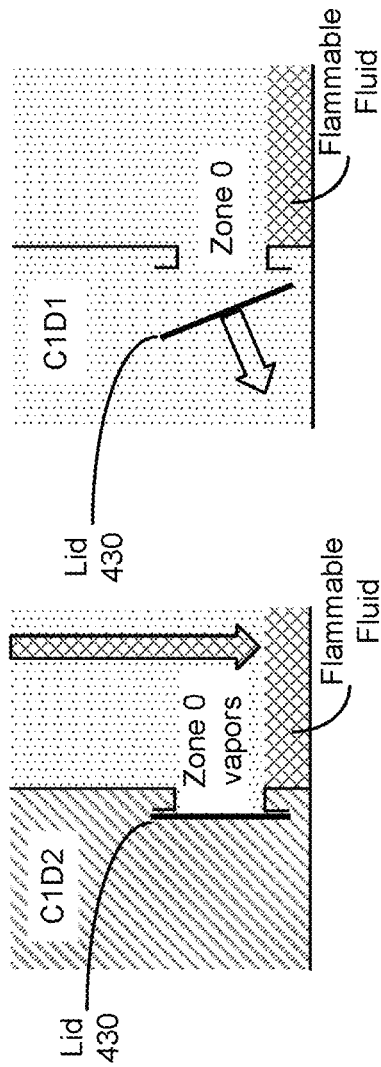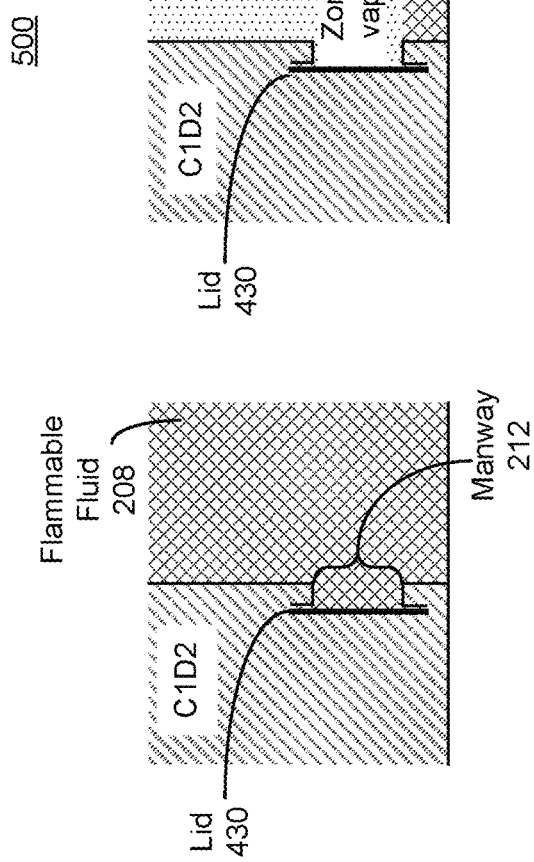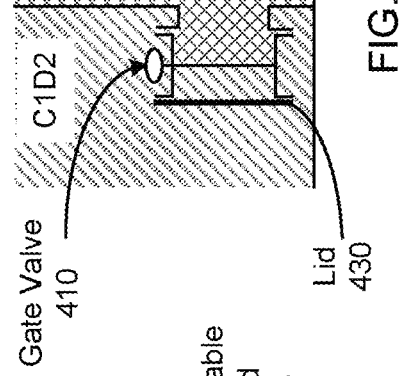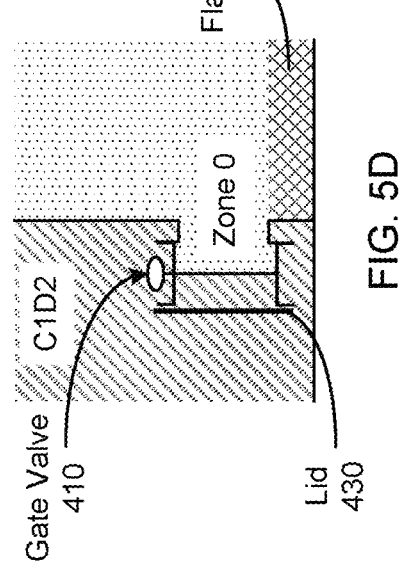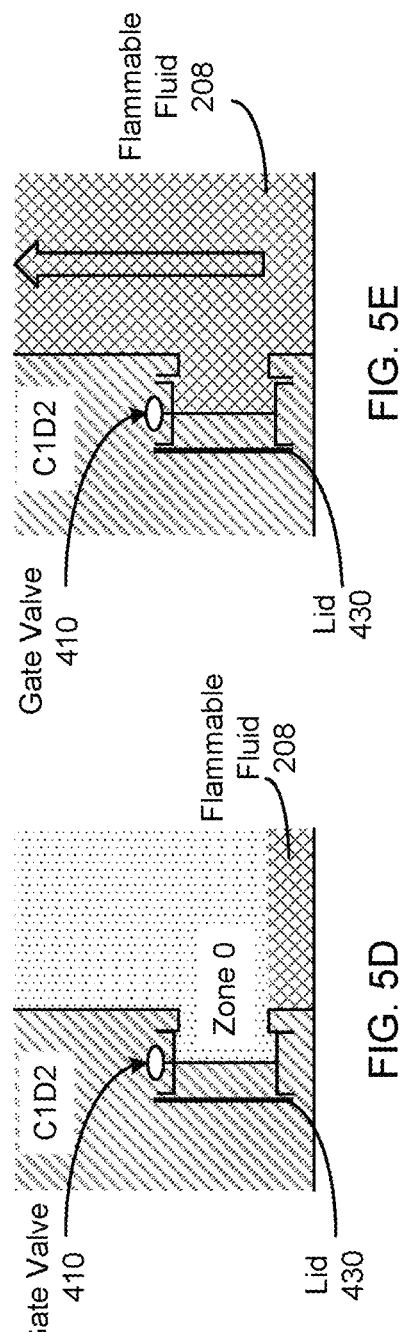

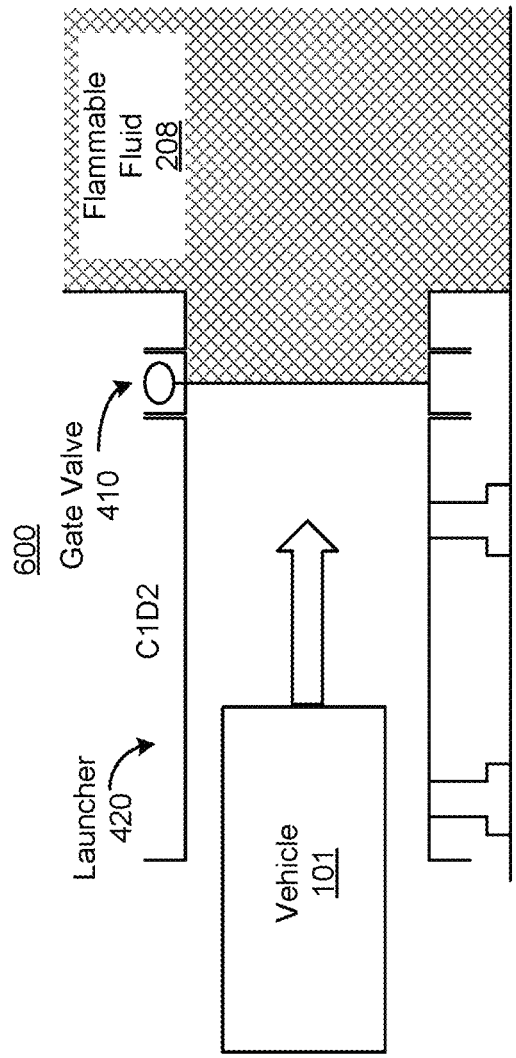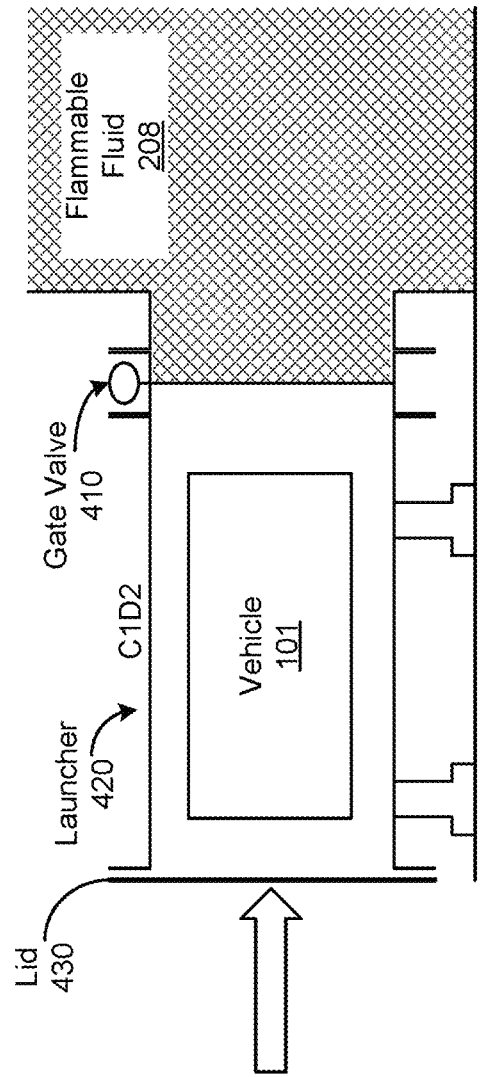
FIG. 6A
FIG. 6B

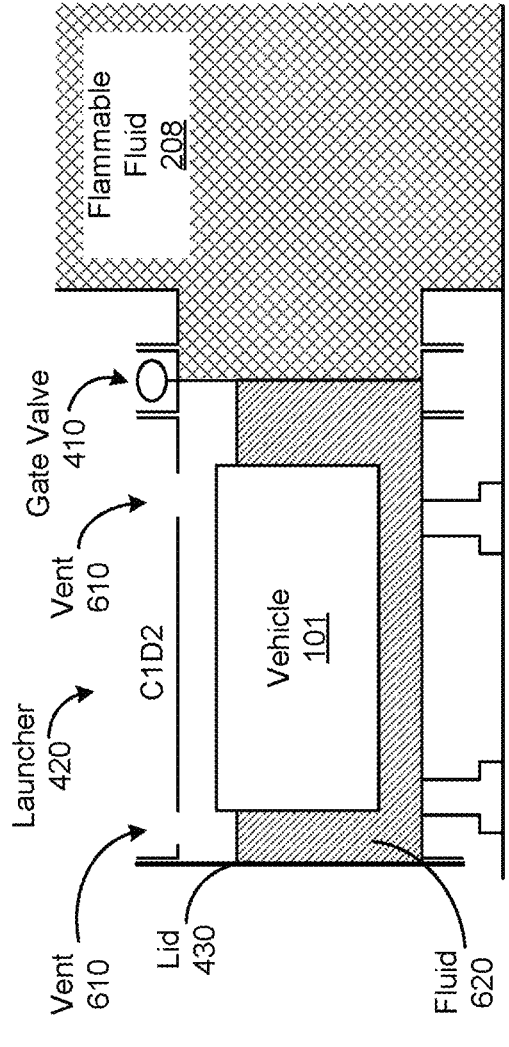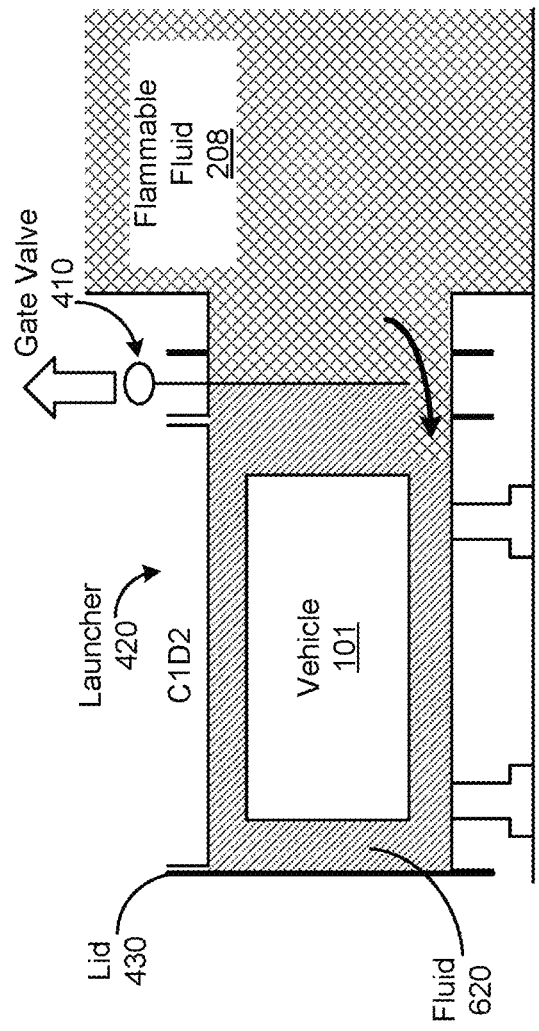

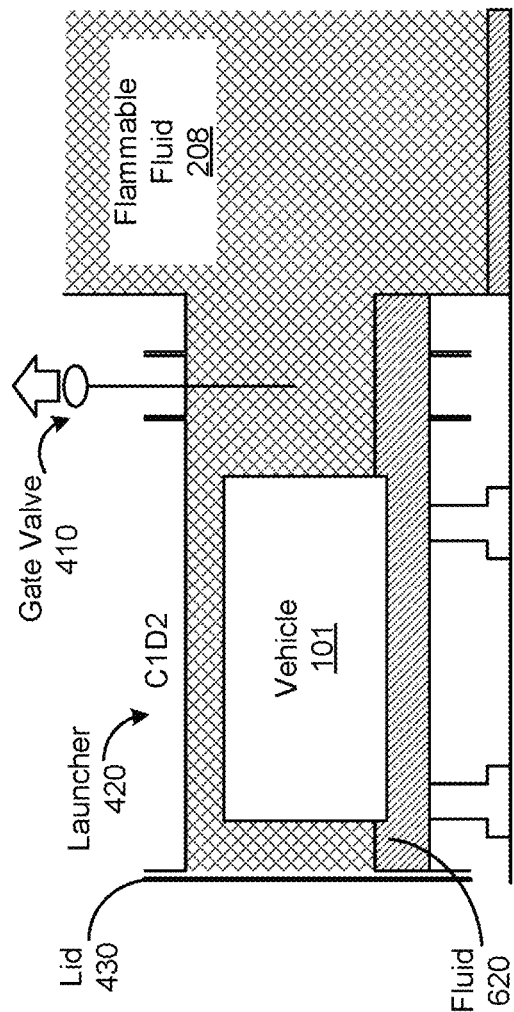
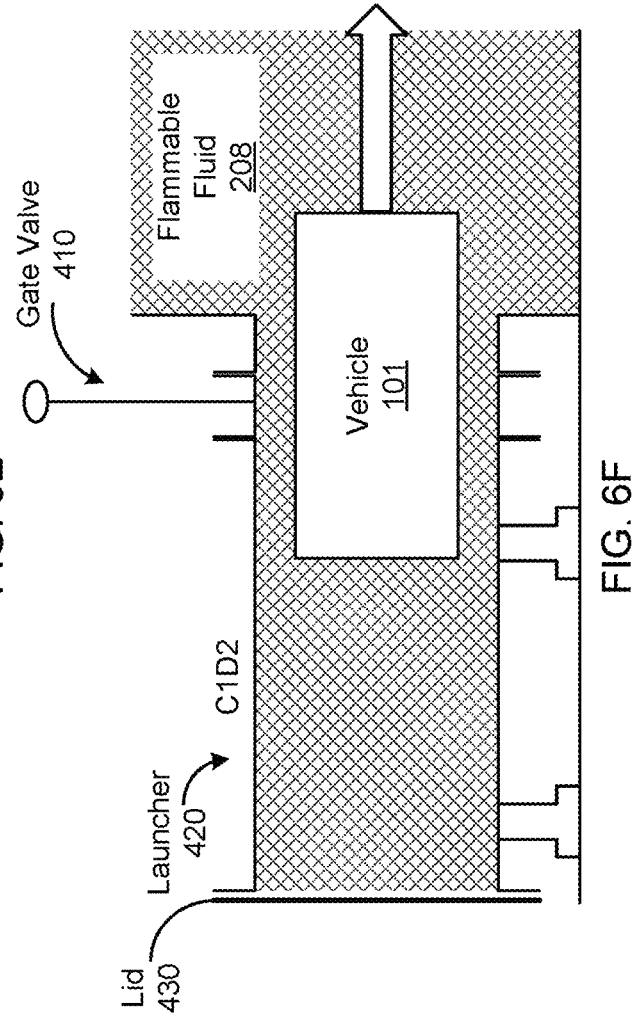

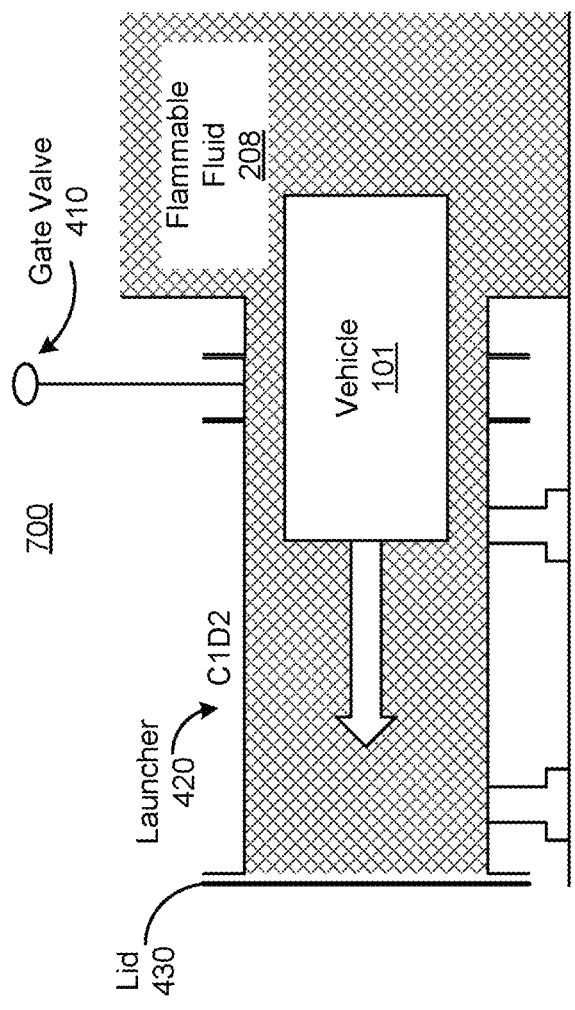
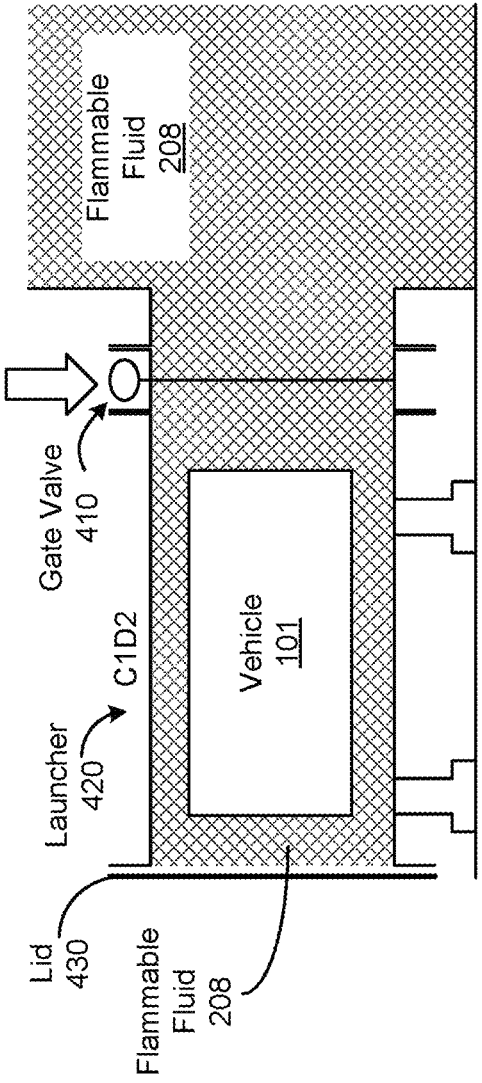
FIG. 7A
FIG. 7B

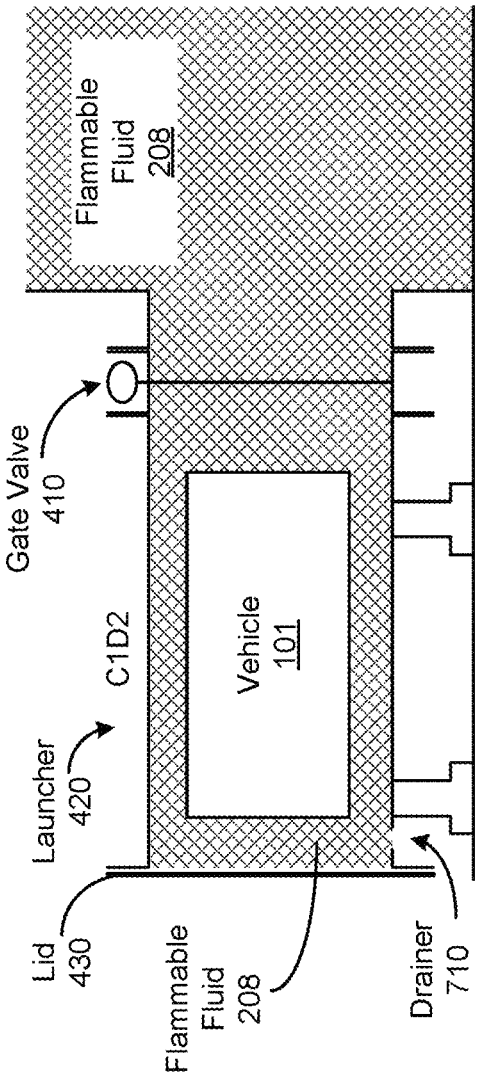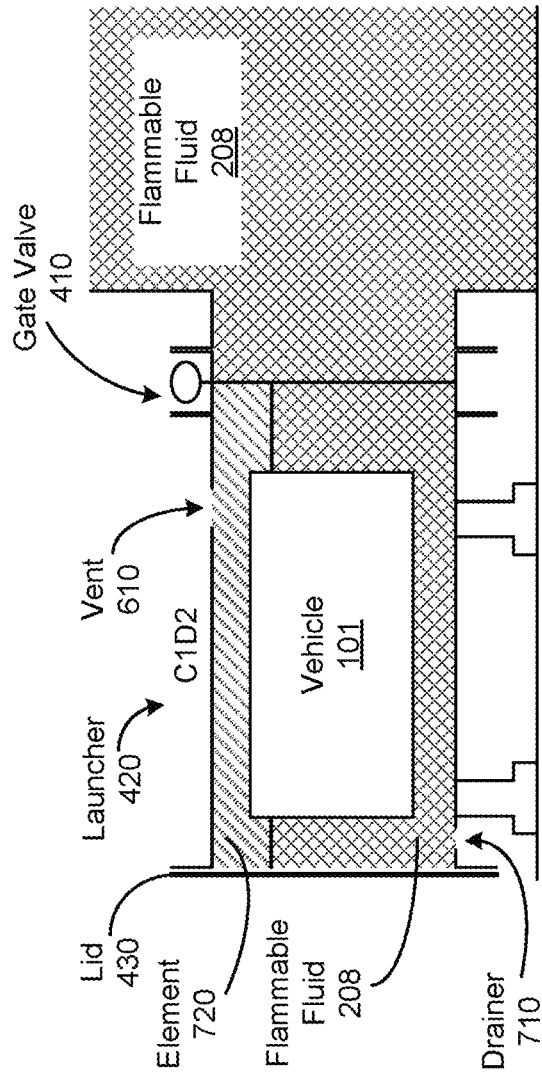
FIG. 7C
FIG. 7D

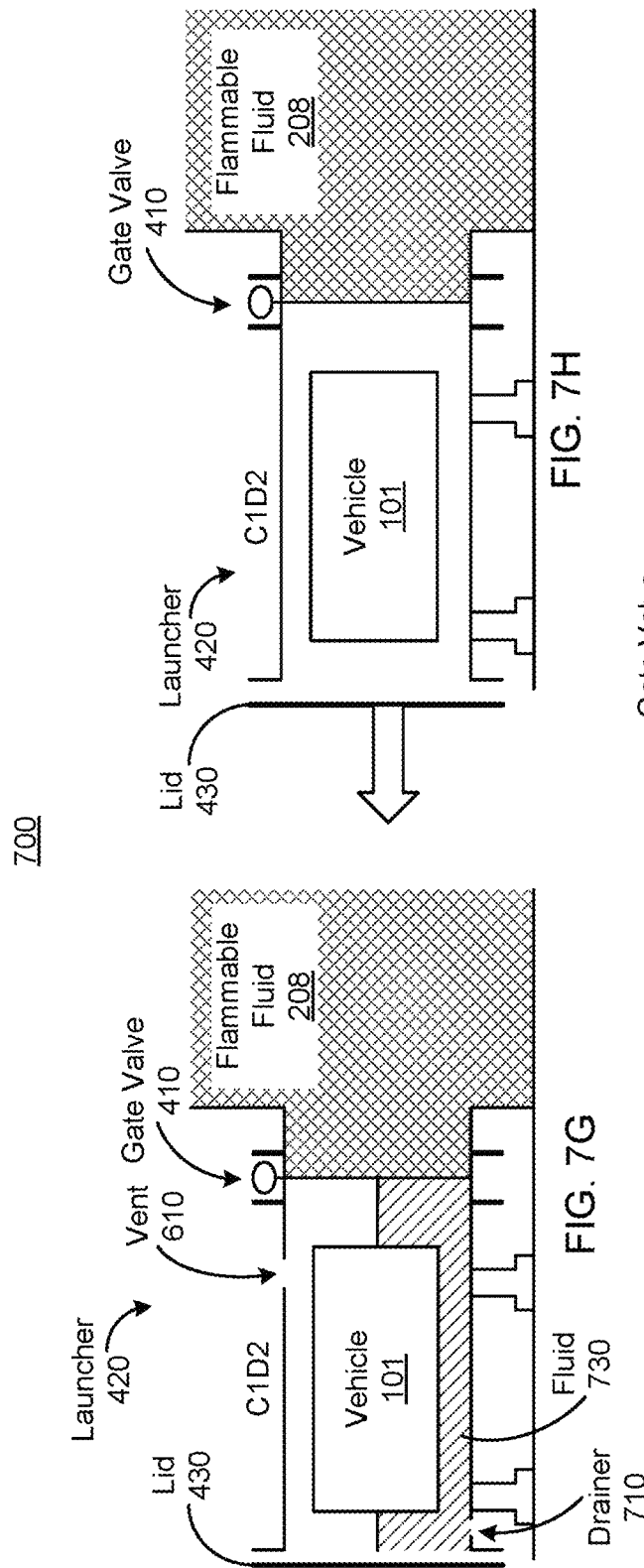
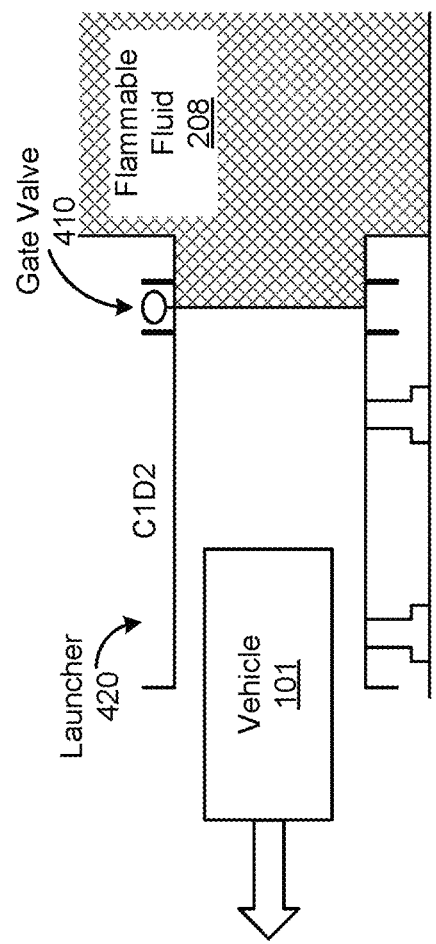

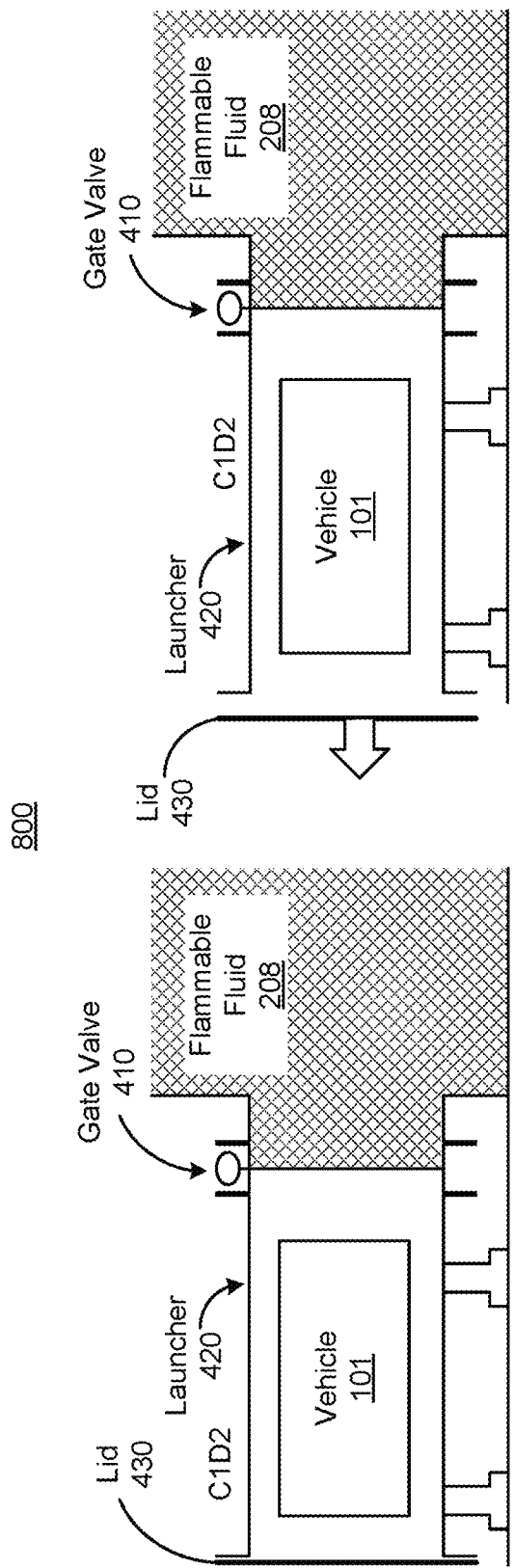
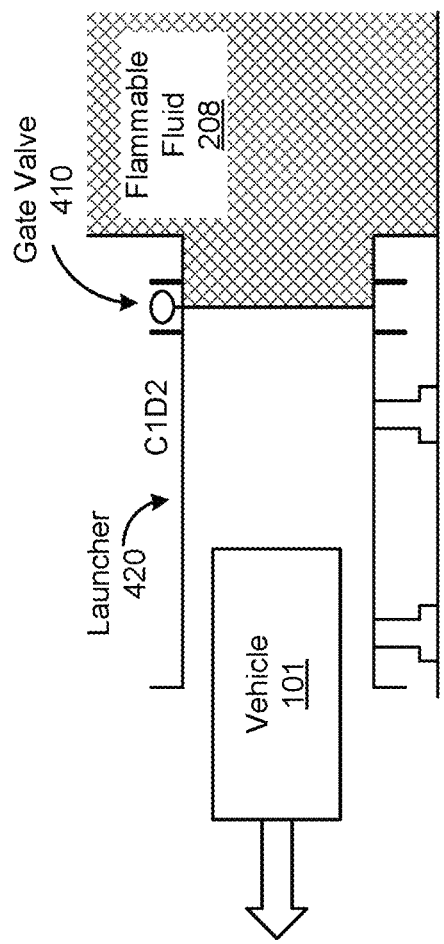

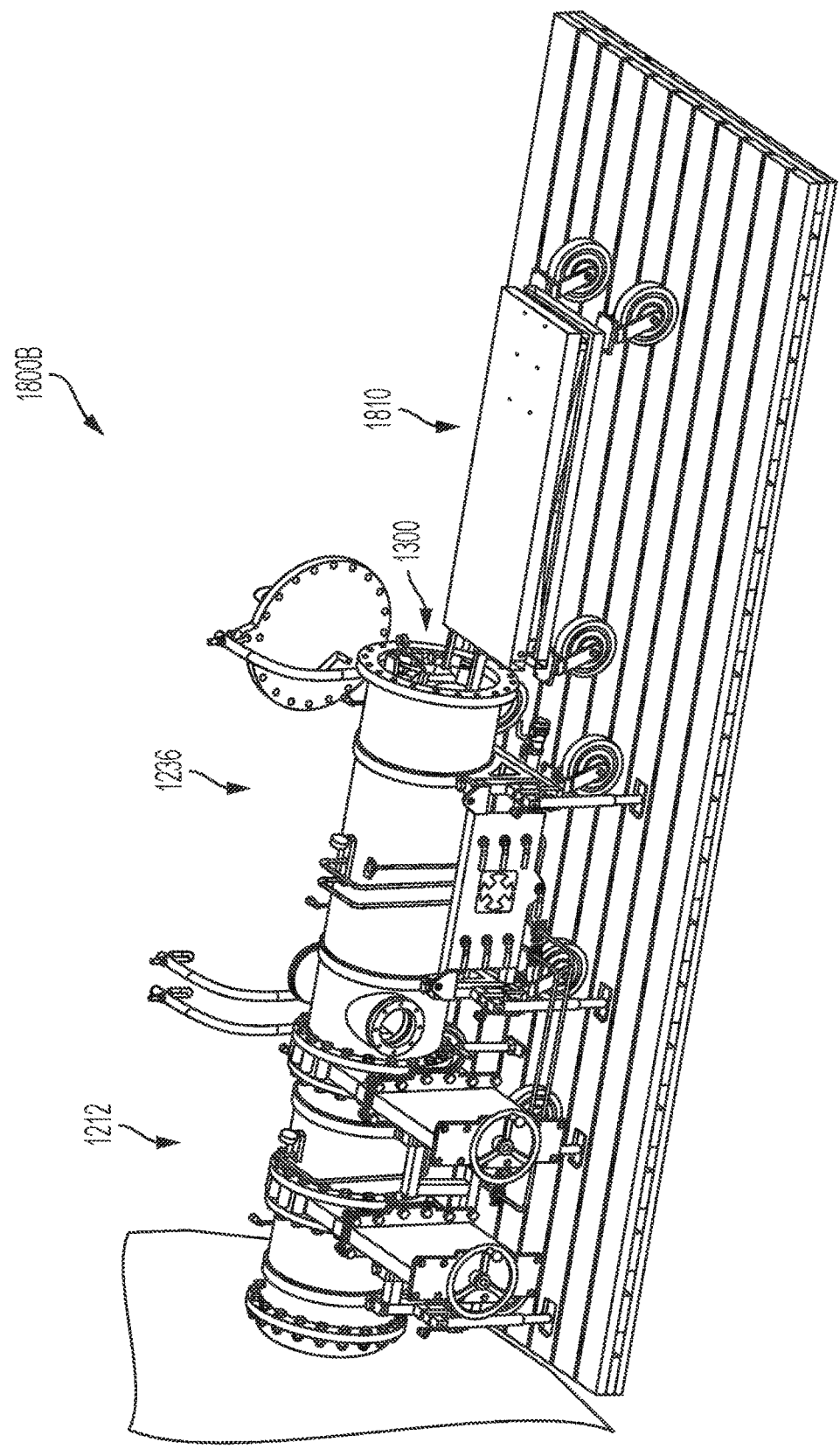

SYSTEMS, METHODS AND APPARATUS FOR SAFE LAUNCH AND RECOVERY OF AN INSPECTION VEHICLE

CROSS-REFERENCES TO RELATED APPLICATIONS

This application claims the benefit of priority under 35 U.S.C. § 119 to U.S. Provisional Patent Application No. 63/120,778, titled "SYSTEMS, METHODS AND APPARATUS FOR SAFE LAUNCH AND RECOVERY OF AN INSPECTION VEHICLE," and filed on Dec. 3, 2020, and claims the benefit of priority under 35 U.S.C. § 119 to U.S. Provisional Patent Application No. 63/005,830, titled "SYSTEMS, METHODS AND APPARATUS FOR SAFE LAUNCH AND RECOVERY OF AN INSPECTION VEHICLE," and filed on Apr. 6, 2020, each of which is hereby incorporated by reference herein in its entirety.

BACKGROUND

Tanks can store fluids or liquids, including flammable fluids such as oil or gas. The fluid can corrode portions of the tank that come into contact with the fluid. External surfaces of the tank can corrode due to water or other fluids under the floor of the tank, or water that leaked into the tank through, for example, a roof seal and sank below the hydrocarbon fluid due to its higher density. Corrosive elements in the hydrocarbon fluid can also contribute to corrosion. This corrosion can eventually cause the tank to leak. However, it can be challenging to determine the integrity of the tank to prevent leaks.

SUMMARY

This disclosure is directed to systems, methods and apparatus for launching and recovering an autonomous tank inspection vehicle via a side shell manway of an aboveground storage tank. Due to the technical challenges of inspecting a tank containing a flammable fluid, tank inspections may be performed in an out-of-service tank. However, out-of-service inspection entails hazardous steps and high resource consumption. For example, the tank is first emptied of its liquid content. The liquid content of the tank is emptied through one or more drain pipes. Manways are located at the side of the tank. A manway of the tank may be sealed by a lid or in use by a device, such as a product mixer. The lid of the manway is removed to allow operators and tools to enter. The residual sediments on the floor are collected, removed from the tank, and safely disposed of. The atmosphere inside the tank is degassed and rendered safe. Human operators then enter the confined space under harsh and hazardous conditions to perform tedious plate-by-plate floor inspection. Once the inspection is complete, the manway lid is closed, and the tank is refilled with flammable fluid. These additional steps taken to inspect a tank can be time consuming, resource intensive, and hazardous.

Furthermore, due to the technical challenges of inspecting a tank containing a flammable fluid, equipment and tools used for tank inspection may be deployed into the tank from a manhole located on the roof of the tank. However, the roof of the tank has weight limitation based on construction, material, and design of the roof. Moreover, entering through the roof manhole of the tank can be complex and entails a hazardous classification of class 1, division 1 ("C1D1") as explosive or flammable gases, vapors, or liquids can exist under regular operating conditions. Instead, the hazardous classification for entering through the side manway is labeled as class 1, division 2 ("C1D2"), where the explosive or flammable gases, vapors, or liquids are not likely to exist under regular operating conditions. By using the manway to perform tank inspection, hazardous procedures can be mitigated as access to the roof is not required. For example, equipment and tools may be lifted to the roof of the tank. This equipment may consist of weights greater than the weight limitation of the roof. In such cases, a first batch of equipment may be lifted onto the roof of the tank and deployed into the tank, prior to a second batch of equipment being lifted onto the roof for deployment. A vapor layer may reside on the surface of the flammable fluid. The vapor layer may be traversed to access the floor of the tank prior to the tank inspection. Performing these iterative steps can further be time consuming, resource intensive, and hazardous.

Systems, methods and apparatus of this technical solution provide a launcher and a gate valve for launch and recovery of an autonomous tank inspection vehicle via a side shell manway of an aboveground storage tank. The launcher of this technical solution can provide a pathway for safely inserting and retrieving an untethered autonomous vehicle into and from a tank containing a flammable fluid. The tank can include a side entry using a manway located at the side of the tank. A gate valve may be temporarily or permanently embedded, attached, or connected to the manway of the tank. The launcher may be temporarily or permanently embedded, attached, or connected to the manway via the gate valve. The gate valve can include a gate separating the interior of the launcher from the interior of the tank. The launcher can include one or more support structure to elevate and fit the launcher with the gate valve and the manway. The launcher can access the interior of the tank by opening of the gate valve. The launcher can include a lid to block elements and substances from entering or escaping the launcher. The autonomous vehicle can be configured to fit through the launcher, the gate valve, and the manway to perform an in-service tank inspection. An in-service tank inspection can refer to inspecting the tank while the flammable fluid is still contained in the tank. In some cases, an in-service tank inspection can refer to a closed tank inspection, such as inspecting a tank containing a flammable fluid while the lid of the tank is closed or sealed.

The launcher and the gate valve can allow for an autonomous vehicle to enter through the side of the tank to perform tank inspection in the tank containing a flammable fluid. The utilization of the launcher and the gate valve can eliminate access to the tank roof, as the roof manhole entry is not required to access the interior of the tank. Utilizing a side entry for the autonomous vehicle to perform tank inspection can reduce resource utilization, reduce the time for inspection, and reduce hazardous conditions. The roof of the tank entails hazardous conditions due to at least the weight limitation of the roof and the ignitable concentrations of flammable gases, vapors, and liquid exposed inside or under the manhole. For example, tank inspection using the launcher, the gate valve, and the autonomous vehicle can eliminate or minimize at least: i) machines to lift equipment and tools to the roof; ii) human operators accessing the roof; iii) and management of different operational procedures for various types of roof, as each type of roof may involve different equipment and approach to perform tank inspection. The type of roof can include, for example, open-top tank, fixed-roof tank, external floating-roof tank, internal floating-roof tank, and closed floating-roof tank. With access to side entry via the launcher, the gate valve, and the manway, the autonomous vehicle can use the same operational procedure to perform tank inspection on any type of tanks.

The manway of the tank may be elevated from the tank floor. To install the gate valve on the manway, the flammable fluid of the tank may be lowered or removed to be below the manway. The installation procedures may be referred to as a step for attaching, coupling, linking or connecting between one component to another, for example. Subsequent to the flammable fluid lowered below the elevation of the manway, the lid of the manway may be removed. The gate valve can attach to the manway via one or more locking or securing mechanism. The gate valve can close via electrical or mechanical mechanism, including at least a button, a lever, a knob, or a handle. The gate valve can couple with a lid, similar to the lid of the manway. The lid can engage with and enclose the gate valve by using at least one locking mechanism, such as bolt, screw, snap ring, rotational lock, or other locking mechanism. Once the gate valve is closed, the tank can be refilled with flammable fluid.

In some implementations, the gate valve can be installed on the manway during out-of-service tank inspection. The out-of-service tank inspection can refer to an opened tank inspection, such as inspecting a tank after the flammable fluid is emptied from the tank. For example, the tank can be emptied through one or more drain pipes of the tank. The out-of-service tank inspection can be performed while the tank is emptied. Subsequent to completing the tank inspection, the gate valve can be installed on the manway. The gate valve can be closed. A lid can be installed on the gate valve. The lid can be similar to the lid from the manway. The lid can be configured to fit with the gate valve. The tank can be filled with flammable fluid subsequent to closing the gate valve. In some cases, the tank can be filled with the flammable fluid in response to closing the lid off.

In some implementations, a gate valve can be embedded in the design of a new tank. For example, when constructing a tank, the gate valve can be integrated with the tank, in place of the manway. The tank can include the gate valve located at the side of the tank. The gate valve can protrude or extend from the side of the tank. In some cases, the gate valve may not protrude from the side of the tank. Instead, the gate valve may be flushed or leveled to the exterior of the tank.

The launcher can be installed on the gate valve after the installation of the gate valve on the manway. The launcher may include one or more support structure to elevate the launcher above ground level. The launcher may not include the one or more support structure to be on the ground level. The elevation of the launcher can correspond to the elevation of the manway and the gate valve. The support structure can include roller support to facilitate movement of the launcher. The launcher can couple or attach to the gate valve via one or more locking mechanism, similar to the gate valve to the manway. The launcher installation can be prior to launching the autonomous vehicle to perform tank inspection. The launcher may be permanently fixed to the gate valve and the manway, remaining in place between tank inspections. In some cases, the launcher installation may not be permanently fixed to the gate valve. Rather, the launcher can be removed or detached from the gate valve subsequent to the autonomous vehicle completing the tank inspection.

In some implementations, the gate valve can be configured as a part of the manway or vice versa. For example, the construction of the tank can include the gate valve permanently fixed to or integrated with the manway. The launcher can be installed on the gate valve as part of the manway. The gate valve can be coupled with a lid. The lid can provide protection against leakage and exposure to external conditions in addition to the gate valve.

In some implementations, the launcher may be a part of the gate valve or vice versa. The construction of the launcher can include the gate valve permanently fixed to the launcher. The launcher can include a first side and a second side. The first side of the launcher can be configured to couple with a lid. The second side of the launcher can include the gate valve integrated with the launcher. The launcher can be installed on the manway via the second side, such that the gate valve separates the launcher from the tank. The lid can be opened and closed for passing the autonomous vehicle.

At least one aspect is directed to a method of inspecting a tank containing a flammable fluid. The method can include coupling, via a manway adapter, a launcher to a vertical side of the tank containing the flammable fluid, the launcher comprising a first side having a lid and a second side configured to couple with the manway adapter. The method can include removing the lid from the first side of the launcher. The method can include loading, via the first side of the launcher, an autonomous vehicle into the launcher. The method can include placing, subsequent to loading the autonomous vehicle, the lid on the first side of the launcher. The method can include pressurizing the launcher having the autonomous vehicle. The method can include opening, subsequent to pressurizing the launcher, the manway adapter at the second side of the launcher to release the flammable fluid into the launcher. The method can include launching, subsequent to opening the manway adapter, the autonomous vehicle from the launcher into the tank to perform a tank inspection process.

The autonomous vehicle can be in a power off state upon the loading into the launcher. The method can include triggering, a pressure switch of the autonomous vehicle responsive to an increase in pressure above a threshold caused by releasing the flammable fluid into the launcher, the autonomous vehicle to enter a power on state. The method can include
  navigating, by the autonomous vehicle, responsive to entering the power on state, from the launcher into the tank to perform the tank inspection process.

The method can include opening one or more vents of the launcher. The method can include filling, via the one or more vents, the launcher with a substance to pressurize the launcher. The method can include closing the one or more vents of the launcher subsequent to pressurizing the launcher. Prior to coupling the launcher to the vertical side of the tank, the method can include removing a lid from a manway located at the vertical side of the tank not containing the flammable fluid. The method can include installing the manway adapter to the manway of the tank to seal the tank, the manway adapter having a closed gate. The method can include loading, subsequent to sealing the tank with the manway adapter having the closed gate, the tank with the flammable fluid.

The manway adapter can include a first side configured to couple with the launcher, a second side installed to the vertical side of the tank, and a first gate valve located between the first side and the second side of the manway adapter. To couple the launcher to the vertical side of the tank, the method can include coupling, via the first side of the manway adapter, a second gate valve at the second side of the launcher to the manway adapter located at the vertical side of the tank. To launch the autonomous vehicle, the method can include opening the first gate valve and the second gate valve to release the flammable fluid into the launcher.

The method can include receiving, by the autonomous vehicle, a command to terminate the tank inspection process. The method can include identifying, by the autonomous vehicle, the launcher located at the vertical side of the tank. The method can include navigating, by the autonomous vehicle responsive to identifying the launcher, from the tank to the launcher for retrieval. The method can include, subsequent to the autonomous vehicle navigating from the tank to the launcher for retrieval, closing the manway adapter at the second side of the launcher to seal the tank from the launcher. The method can include draining, via one or more drainers of the launcher, the flammable fluid from the launcher. The method can include removing the lid on the first side of the launcher to retrieve the autonomous vehicle from the launcher. The method can include connecting an external tank to the one or more drainers of the launcher. The method can include releasing, via the one or more drainers, a substance stored in the external tank into the launcher to drain the flammable fluid from the launcher.

The method can include releasing, subsequent to draining the flammable fluid from the launcher, one or more cleaning solutions into the launcher via one or more vents of the launcher. The method can include draining the one or more cleaning solutions from the launcher via the one or more drainer of the launcher. The launcher can include a plurality of wheels to maneuver the launcher for coupling to the vertical side of the tank. The autonomous vehicle can include at least one sensor, at least one propeller, at least one ranging device, and at least one inspection device.

At least one aspect is directed to a method of recovering a vehicle from a tank containing a flammable fluid. The method can include loading, via a second side of a launcher, an autonomous vehicle into the launcher. The autonomous vehicle executing an exit procedure in response to terminating tank inspection procedures. The method can include closing, subsequent to loading the autonomous vehicle into the launcher, a gate valve to seal the autonomous vehicle in the launcher. The method can include releasing, by a drainer of the launcher, the flammable fluid from the launcher. The method can include triggering, by a pressure switch of the autonomous vehicle responsive to a decrease in pressure below a threshold caused by the release of the flammable fluid from the launcher, the autonomous vehicle to enter a power off state. The method can include removing a lid from a first side of the launcher subsequent to releasing the flammable fluid from the launcher. The method can include recovering the autonomous vehicle from the first side of the launcher.

The vehicle can exit the tank containing a flammable fluid via a manway of the tank. The vehicle can be loaded into the launcher subsequent to exiting the tank. The launcher, the gate valve, or the tank may include at least one source to indicate the location of the manway. The vehicle can identify the location of the manway by detecting the at least one source using one or more sensors of the vehicle. The vehicle can position and move through the manway using one or more sensors. The vehicle can be terminated or shutdown in response to the vehicle entered the launcher. The instruction to terminate tank inspection can be responsive to the vehicle completing the tank inspection, a timeout, or an indication to abort operation. The indication to abort operation may be received from an external device.

The vehicle can be cleaned prior to being removed from the launcher. The launcher may include the one or more vents to provide additional substance to the launcher. The additional substance can further remove remaining flammable fluid from the vehicle and the launcher. The launcher can include the drainer to remove the additional substance and the remaining flammable fluid from the launcher. The vehicle may be retrieved from the launcher subsequent to removing the remaining flammable fluid from the launcher.

At least one aspect is directed to a system of inspecting a tank containing a flammable fluid. The system can include a launcher comprising a first side having a lid and a second side configured to couple, via a manway adapter, to a vertical side of the tank containing the flammable fluid. The system can include an autonomous vehicle comprising a data processing system and a memory, the autonomous vehicle loaded into the launcher via the first side of the launcher subsequent to removing the lid. The autonomous vehicle can detect, subsequent to the manway adapter at the second side of the launcher being opened to release the flammable fluid into the launcher, a pressure within the launcher greater than a pressure threshold. The autonomous vehicle can initiate, responsive to the detection of the pressure greater than the pressure threshold, a launching sequence stored in the memory. The autonomous vehicle can navigate, responsive to initiating the launching sequence, from the launcher into the tank to perform the tank inspection process.

The autonomous vehicle can be in a power off state upon the loading into the launcher. The autonomous vehicle can enter, via triggering of a pressure switch of the autonomous vehicle responsive to an increase in pressure above a threshold caused by releasing the flammable fluid into the launcher, a power on state. The autonomous vehicle can navigate, responsive to entering the power on state, from the launcher into the tank to perform the tank inspection process. The manway adapter can include a first side configured to couple with the launcher, a second side installed to the vertical side of the tank, and a first gate valve located between the first side and the second side of the manway adapter. The autonomous vehicle can include at least one sensor, at least one propeller, at least one ranging device, and at least one inspection device.

The manway can be located at the vertical side of the tank that may not contain the flammable fluid, where the manway having a removed lid. The manway adapter can be configured to be installed to the manway to seal the tank, the manway adapter having a closed gate, and the tank can be loaded with the flammable fluid subsequent to the tank sealed with the closed gate. The autonomous vehicle can receive a command to terminate the tank inspection process. The autonomous vehicle can identify the launcher located at the vertical side of the tank. The autonomous vehicle can navigate, responsive to identifying the launcher, from the tank to the launcher for retrieval.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4A is an example illustration of a launcher and a gate valve for launching and recovering a vehicle from a tank containing a flammable fluid via a manway, in accordance with an implementation;

FIG. 4B is an example illustration of a gate valve, in accordance with an implementation;

FIGS. 5A-E are example illustrations of a system for the gate valve installation, in accordance with some implementations;

FIGS. 6A-F are example illustrations of a system for launching the vehicle into the tank containing a flammable fluid, in accordance with some implementations;

FIGS. 7A-I are example illustrations of a system for recovering the vehicle from the tank containing a flammable fluid, in accordance with some implementations;

FIGS. 8A-G are example illustrations of a system for recovering the vehicle from the tank containing a flammable fluid, in accordance with some implementations;

FIGS. 18A-B are example illustrations of a system for installing an inspection robot in the launcher, in accordance with some implementations;

DETAILED DESCRIPTION

Figure 1:
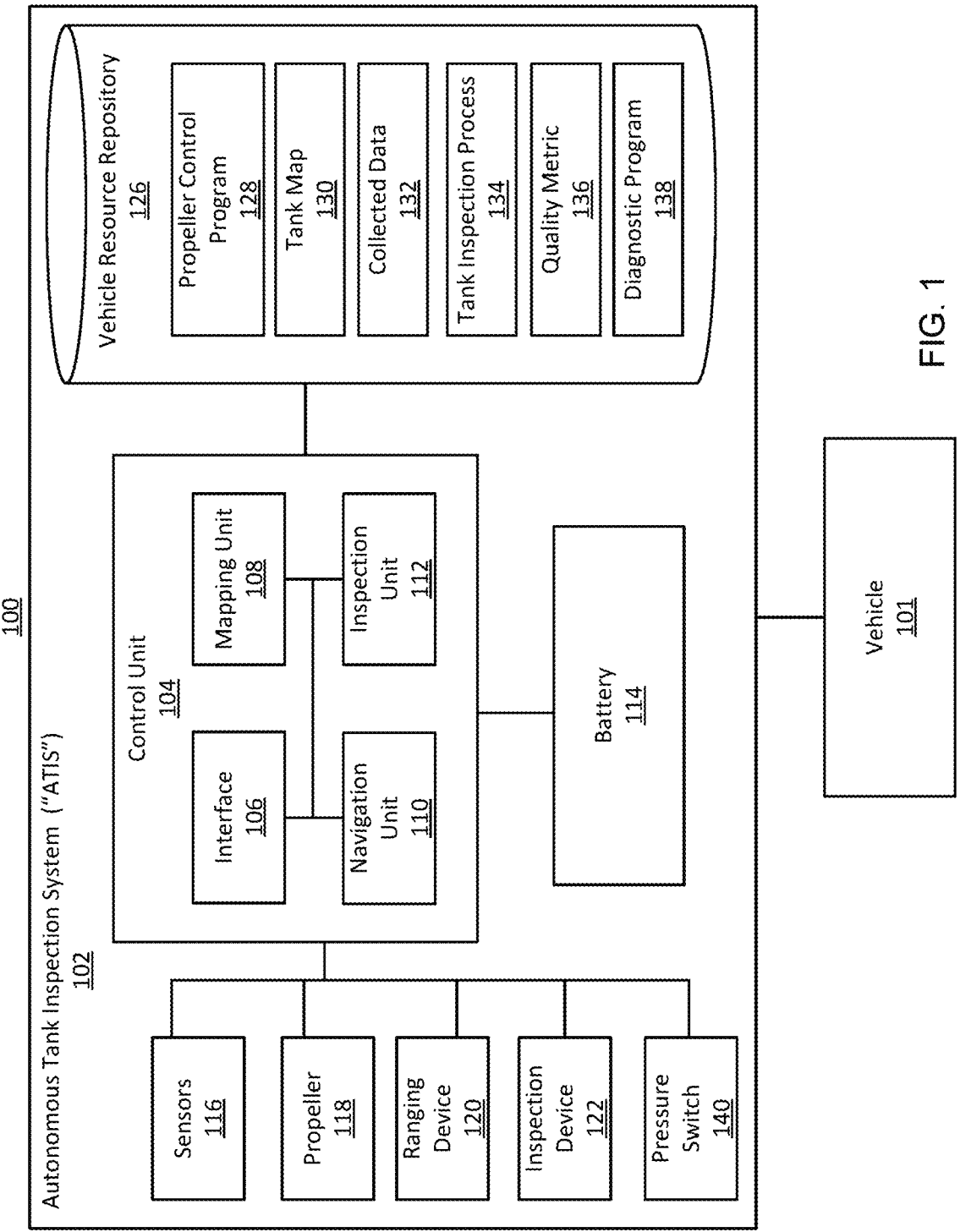
FIG. 1 is a block diagram of an example system to inspect a tank containing a flammable fluid, in accordance with an implementation.

Following below are more detailed descriptions of various concepts related to, and implementations of, systems, methods and apparatus for launching and recovering an autonomous tank inspection vehicle via a side shell manway of an aboveground storage tank. The various concepts introduced above and discussed in greater detail below may be implemented in any of numerous ways.

This technology is directed to systems, methods and apparatus for launching and recovering an autonomous tank inspection vehicle via a side shell manway of an aboveground storage tank. The system can include a vehicle including one or more processors and memory to perform tank inspection. The system can include a manway located at a side of the tank. The manway can be referred to as, and use interchangeably with other descriptive terms, such as side shell manway, side entry, or side door, for example. The system can include a gate valve installed on the manway of the tank. The gate valve can include a gate to expose or enclose the interior of the tank. The gate valve can be coupled with a gate motor or other mechanism to open and close the gate of the gate valve. The gate valve can be referred generally as a valve, for example. The system can include a launcher including a first side and a second side. The system can include a lid installed on the first side of the launcher. The lid can prevent a flammable fluid from escaping or leaking out of the launcher. The lid can prevent external elements from entering the interior of the launcher, the gate valve, and the tank. The launcher can be installed on the gate valve via the second side of the launcher. The system can include one or more supports coupled to the launcher for elevation and levelling. The system can include one or more vents of the launcher to provide or release one or more substances from the launcher. The system can include at least one drainer to remove one or more substances from the launcher. The one or more substances can refer to the flammable fluid, nitrogen gas or other inert gases, water, air, an agent (e.g., cleaning agent), or other elements. The launcher can be used to launch and recover the vehicle prior to or after the tank inspection. The vehicle can be situated inside the launcher prior to initiating the tank inspection instructions. The vehicle can be cleaned inside the launcher prior to recovering the vehicle from the launcher.

Thus, systems, methods and apparatus of this technical solution can allow for side entry for the autonomous vehicle to perform a tank inspection without emptying or draining a flammable fluid from the tank prior to inspecting the tank, thereby improving the efficiency and safety of the tank inspection process, saving time, and utilizing fewer resources. By performing the tank inspection via the side entry of the tank and without emptying the flammable fluid, the technology reduces hazardous steps to perform above-ground tank inspection and allows for more frequent tank inspections, which can facilitate early detection of tank failures, a more accurate prediction of when the tank may fail, a forecast of the predicted tank integrity. For example, it may be more hazardous to perform a tank inspection from a top side of the tank because a tank inspection vehicle may be lifted via crane to the top side of the tank, which utilizes additional equipment and energy. Further, there is an increased risk of the equipment or personnel falling off a topside of the tank and getting injured or damaged, and there is also an increased risk if the structural integrity of the top side of the tank is weakened, thereby resulting in a potential collapse of the topside. Finally, an inspection vehicle may come into contact with increased flammable vapors that exist at the topside, relative to at the side shell manway.

Referring to FIG. 1, a block diagram of an example system to inspect a tank containing a flammable fluid, in accordance with an implementation, is shown. The system 100 can include a vehicle 101 and an autonomous tank inspection system 102 for performing an autonomous tank inspection. The autonomous tank inspection system ("ATIS") 102 can include at least one control unit 104, at least one battery 114, at least one sensor 116, at least one propeller 118, at least one ranging device 120, at least one inspection device 122, or at least one vehicle resource repository 126. The vehicle resource repository 126 can store software or data associated with the vehicle, including programs, instructions, or data collected by sensors 116. The ATIS 102 can include hardware or a combination of hardware and software, such as communications buses, circuitry, processors, communications interfaces, among others. The autonomous tank inspection system 102 can reside on or within a corresponding vehicle 101.

Each of the components of the ATIS 102 can be implemented using hardware or a combination of software and hardware. Each component of the ATIS 102 can include logical circuitry (e.g., a central processing unit or CPU) that responds to and processes one or more instructions fetched from a memory unit (e.g., memory, storage device, or vehicle resource repository 126). Each component of the ATIS 102 can include or use a microprocessor or a multi-core processor. A multi-core processor can include two or more processing units on a single computing component. Each component of the ATIS 102 can be based on any of these processors, or any other processor capable of operating as described herein. Each processor can utilize instruction level parallelism, thread level parallelism, different levels of cache, etc. For example, the ATIS 102 can include at least one logic device such as a computing device or server having at least one processor.

The components or elements of the ATIS 102 can be one or more separate components, a single component, or a part of the ATIS 102. For example, the control unit 104 (or the other components of the ATIS 102) can include one or more combinations of hardware and software, such as one or more processors configured to initiate stop commands, initiate motion commands, and transmit or receive timing data. The one or more components can work individually external to the ATIS 102.

The one or more component of the ATIS 102 can be hosted on or within a vehicle 101. The components of the ATIS 102 can be connected or communicatively coupled to one another. The connection between the various components of the ATIS 102 can be wired or wireless, or any combination thereof.

The vehicle 101 can include the autonomous tank inspection system ("ATIS") 102 to inspect the tank containing a flammable fluid. The vehicle 101 can include a transducer to transmit a plurality of acoustic signals. The vehicle 101 can be constructed using one or more materials including steel, stainless steel, aluminum, iron, glass, rubber, plastic, or titanium. The vehicle 101 can include one or more wheels and one or more propellers. The wheels can be constructed with one or more materials similar to the vehicle 101. The wheels can be designed as standard/fixed wheel, orientable wheel, ball wheel, Omni wheel, Mecanum wheel, or continuous track. The vehicle 101 can perform one or more tasks by the control unit 104. The tank and the flammable fluid can be referred to in FIG. 2.

In some implementations, the vehicle 101 can include one or more propellers 118 which can be driven by a motor, but not include any wheels. The wheels may be absent from the vehicle 101 because the one or more propellers can propel or move the vehicle 101 through the flammable fluid in the tank. The vehicle 101 can include one or more wheels driven by a motor. In some cases, the vehicle 101 can include wheels but not a motor to drive the wheels. For example, the wheels may not be motor driven because the propeller 118 can propel or move the vehicle 101 through the flammable fluid in the tank. The vehicle 101 can include one or more fans (e.g. blower fan or axial fan) or heat sinks inside the body that can cool, reduce, maintain, or otherwise manage a temperature of physical components of the ATIS 102.

In some implementations, the vehicle 101 can operate in one or more orientations. The orientations indicating a tilt of the vehicle 101, for example, a 30 degrees tilt or a 180 degrees tilt (e.g. upside-down orientation). The one or more wheels can be located at the front, back, side, or bottom of the vehicle, for example. The vehicle 101 can include the one or more wheels on one or more surfaces of the vehicle 101, for example, the wheels can be included on top of the vehicle 101 which can move the vehicle 101 during a reverse or an upside-down orientation. The vehicle 101 can configure the one or more wheels located on the one or more surfaces based on the orientation of the vehicle 101.

The vehicle 101 can be coated with non-flammable solution or an insulator. The non-flammable solution or insulator can be applied by spray coating, paint coating, attachment, or sheet cover. The non-flammable solution can include glass, mineral wool, gypsum, or magnesium. The insulator can include glass fiber, polyurethane, clay, or ethylene propylene diene terpolymer ("EPDM") rubber. The vehicle 101 can be coated with linked or merged non-flammable solution and insulator to form a protected layer. The non-flammable solution and insulator can be selected based on the flammable fluid contained inside the tank. The vehicle 101 can incorporate the protected layer for flammable environment, for example, the vehicle can be submerged in the tank containing a flammable fluid. The vehicle 101 can be further coated with water resistance solution including durable water repellent ("DWR"). The vehicle 101 coated with DWR can be hydrophobic, which can prevent fluid from entering the vehicle 101. The one or more coating of the vehicle 101 can be coated on the exterior of the vehicle 101 or embedded into the vehicle 101 containing the ATIS 102. The vehicle 101 can operate under mild environment, for example, below freezing temperature or above boiling temperature. The vehicle 101 can operate under submerged environment or on dry environment, such as to perform an in-service tank inspection by submerging the vehicle 101 under the flammable fluid, for example. The vehicle 101 can be re-coated based on the solubility of the coating exposed to the flammable fluid. However, in some cases, the vehicle 101 may not be coated with a non-flammable solution or insulator and perform an in-service tank inspection due to the vehicle 101 using a battery, cable and remaining powered off as the vehicle 101 traverses a vapor layer and until fully submerged in the flammable fluid.

The vehicle 101 can be constructed to prevent sparks or electrostatic discharge. The vehicle 101 can be constructed with one or more insulated layers to prevent sparks or electrostatic discharge. The one or more insulated layers can include a spark protection layer, which can be, for example, a rubber layer between one or more layer of steels, preventing accidental collision between the steel layers which can cause a spark. The vehicle 101 can be equipped with a non-sparking tool or at least one anti-static tool. The non-sparking tool can be characterized by lack of ferrous metals including steel or iron, which can prevent ignition of sparks under certain condition. The vehicle 101 and the ATIS 102 can be grounded by the anti-static tool, which can prevent static electricity build up to cause an ignition. The vehicle 101 can equip the non-sparking tool or the anti-static tool to operate inside the tank containing the flammable fluid, which can prevent the vehicle 101 from igniting sparks caused by grinding one or more vehicle 101 layers or the building up of electrostatic discharge caused by the battery 114 supplying power to the ATIS 102, for example. The vehicle 101 can include housing for the one or more components of the ATIS 102, which can be constructed using similar materials to the vehicle 101.

The vehicle 101 can operate under dense flammable environment. The dense flammable environment can include ethanol, gasoline (petrol), diesel, oil, or jet fuel. The vehicle 101 can maintain a temperature lower than an ambient temperature, an autoignition temperature, or a flash point. The autoignition temperature can indicate a temperature point at which a substance can be ignited in normal atmosphere without an external source of ignition. The flash point can indicate the lowest temperature at which vapors of the material will keep burning after an ignition source is removed. For example, gasoline can include an autoignition temperature of 280 Celsius and a flash point of 43 Celsius. The vehicle 101 can use a temperature sensor of the ATIS 102 to indicate the temperature of the vehicle 101, such that the vehicle 101 can initiate an operation condition upon the temperature exceeding certain threshold, for example. The operation condition can lower the speed of the propeller 118, pause the vehicle 101, or stop the vehicle 101 operation. The vehicle 101 can determine the speed of the propeller 118 or inspection time, based on the density of the dense flammable environment. For example, a vehicle submerged in gasoline can determine a first speed of one or more propellers configured for a density of 750 kg/m$^3$, and a second vehicle similar to the first vehicle submerged in diesel can determine a second speed, faster than the first speed, of one or more propellers configured for a density of 830 kg/m$^3$.

The vehicle 101 can determine, based on the control unit 104 using a diagnostic program 138, a malfunction of one or more components of the ATIS 102, which can be based on a signal received from the components or a discontinued electrical signal to the components. The vehicle 101 can further determine to use a different component, based on the malfunctioned components, to continue inspecting the tank, for example, the vehicle 101 can determine, based on a malfunctioned propeller 118 due to the propeller 118 not receiving power, to continue the tank inspection using the one or more wheels to drive the vehicle 101, if the vehicle 101 is configured with a propeller 118 and wheels, for example.

The battery 114 can provide power to the vehicle 101 and the components of the ATIS 102. The battery 114 can be embedded into or attached on to the vehicle 101. The battery 114 can include a rechargeable or non-rechargeable type including an alkaline battery, a nickel-cadmium battery, a nickel-metal hydride battery, a lithium-ion battery, or a lead-acid battery. The battery 114 can be recharged using an interface 106 of the control unit 104 of the ATIS 102. The vehicle 101 or battery 114 can be equipped with a temperature sensor. The temperature sensor can determine the temperature of the battery 114, which can indicate a thermal dissipation of the battery 114. The vehicle 101 or ATIS 102 can use the measured or detected temperature of the battery 114 to initiate or change an operation condition associated with the vehicle 101, ATIS 102, tank inspection process or proper control program. Operation conditions can include, for example, an exit condition, waiting condition, low power state, cooling state, or high-performance state. For example, the diagnostic program 138 can access the temperature information of the battery 114 and initiate the cooling state based on the temperature reaching a threshold temperature set by the ATIS 102 or initiate the wait condition based on the temperature exceeding the threshold temperature by a predetermined amount. The predetermined amount can be configured prior to the vehicle 101 initiating the tank inspection process 134.

The battery 114 can be embedded inside a housing, which can be constructed with materials similar to the vehicle. The battery 114 can dissipate heat to the housing, such that the housing can dissipate the heat of the battery 114. The housing of the battery 114 can include a temperature sensor, which can indicate the temperature of the housing. The housing temperature can be used to initiate or change an operation condition upon exceeding a temperature threshold of the diagnostic program 138. The temperature threshold can be determined or set based on the type of a flammable fluid, such as ethanol, gasoline (petrol), diesel, or jet fuel, a dimension of the tank, the construction of the vehicle 101, or a location of the tank.

The battery 114 can provide an indication of power available to the control unit 104, which can be used by the diagnostic program 138. The indication of power available can be used to determine an operation condition by the diagnostic program 138 of the control unit 104. For example, the power available can be used to determine a speed setting of the propeller 118, such that the ATIS 102 operates on high performance state prior to reaching a first power threshold, operates on low power state based on reaching the first power threshold, or execute the exit condition based on the power available reaching a second power threshold lower than the first power threshold.

The sensors 116 can include a proximity sensor, touch sensor, accelerometer, angular rate sensors, gyroscopes, speed sensor, torque sensor, pressure sensor, temperature sensor, light sensor, electrical charge sensor, electrical current sensor, electrostatic sensor, position sensor, tilt sensor, pitch, roll and heading sensor, or odometer. The sensors 116 can be connected to the battery 114. The sensors 116 can be attached to the vehicle 101 or embedded inside the vehicle 101 such as in front, back, above, side, or underneath the vehicle 101. The sensors 116 can collect one or more information of the vehicle 101 or the ATIS 102 including vehicle speed, propeller torque, component temperature, vehicle travel distance, or vehicle touch information. The vehicle 101 can determine the vehicle state (e.g., accelerations, angular rate, attitude and heading, depth, or position). The sensors 116 can provide data or measurements to the navigation unit 110, which can determine the state of the vehicle 101 (e.g., accelerations, angular rate, attitude and heading, depth, or position).

The vehicle 101 can include a pressure switch 140. The pressure switch can be designed, constructed or configured to close an electrical contact when a certain set fluid pressure has been reached on its input. The pressure switch 140 can be configured to make contact either on pressure rise or pressure fall. The pressure switch 140 can detect mechanical force. The pressure switch 140 can be configured with various types of sensing elements to detect or sense pressure. For example, the pressure switch 140 can include a capsule, bellows, Bourdon tube, diaphragm or piston element that deforms or displaces proportionally to applied or detected pressure. The pressure sensing element of the pressure switch 140 can be arranged to respond to a difference of two pressures. The resulting motion can be applied directly, or through amplifying levers, to a set of switch contacts to power on the vehicle 101 or control unit 104 by closing an electronic circuit between the control unit 104 and the battery 114.

The pressure switch 140 can be configured to operate in a flammable fluid by having an enclosure to prevent an arc at the contacts from igniting the surrounding gas. The switch enclosure can be formed of a material that can be non-flammable, weatherproof, corrosion resistant, or submersible.

The pressure switch 140 can close an electrical contact to power the control unit 104 responsive to detecting a threshold pressure. The threshold pressure can correspond to the vehicle 101 being submerged at least 1 meter, 2 meters, 3 meters or more in a fluid. The pressure switch 140 can be designed, constructed or operational to detect the depth based on a known density of the fluid. The pressure can be determined based on P=height*density*acceleration of gravity. The threshold pressure can be set based on determining the desired depth at which the control unit 104 is to be powered on (e.g., 1 meter, 2 meters, 3 meters, or more), the density of the fluid (e.g., 0.7 kg/m$^3$, and gravity (e.g., 9.8 m/s$^2$). The pressure switch 140 can be configured to power on the control unit 104 responsive to detection of the threshold pressure. The pressure switch 140 can be configured to power on the vehicle 101 responsive to the pressure exceeding the threshold pressure.

The sensors 116 of the vehicle 101 can include a fuel level sensor. In some cases, the vehicle 101 can derive or determine the fuel level via an external fuel level sensor or by not using a separate fuel level sensor. For example, the vehicle 101 can derive the fuel level based on its depth and altitude above the floor. In another example, the vehicle 101 can receive the fuel level information from an external source (e.g., checking the mechanical level gauges installed in or on a tank) prior to deployment into the tank the mechanical level gauges usually installed in tanks. The vehicle 101 can determine the fuel level based on the density of the flammable fluid, the pressure sensor in the vehicle, and an acoustic speed sensor (which can provide altitude above the floor). The vehicle 101 can determine the depth and altitude based on the pressure, which can indicate the liquid level. In some cases, the vehicle 101 can determine the fuel level from a gauge configured on the tank.

The information identified by the sensor 116 can be stored in the collected data 132 within the vehicle resource repository 126, which can be accessed by the control unit 104. The sensor 116 can perform an operation by the control unit 104. The operation can include sensor selection, sensor initiation, or sensor deactivation. The sensor selection can select a sensor 116 from multiple sensors based on one or more commands to be executed by the control unit 104. The sensor initiation can activate at least one sensor 116 to perform the one or more commands, and the sensor deactivation can deactivate at least one sensor 116 upon completing the one or more commands. For example, sensor initiation and deactivation can include selecting the proximity sensor to identify obstruction within the tank for collision avoidance, activating the sensor 116 to obtain proximity data of the tank, and deactivating the sensor 116 upon storing the collected data in the data repository, indicating completion of the one or more commands.

The sensors 116 information can configure or determine a plurality of settings for one or more components of the ATIS 102, for example, using the temperature sensor to determine an operation condition of the vehicle 101. The temperature sensor can be included in or on the battery 114, the propeller 118, or one or more portions of the vehicle 101 to determine the temperature information, wherein the temperature information can be stored in the collected data 132. The temperature sensor can detect changes in temperature based on changes in the one or more substances of the temperature sensor, the changes in the substance can be an expansion or contraction of mercury inside the sensor 116 container. The temperature information can be accessed by the control unit 104 executing the diagnostic program 138 to determine an operation condition of the one or more components of the system 100. The diagnostic program 138 can determine to change the operation condition based on the temperature reaching a first threshold, or to initiate the operation condition based on the temperature reaching a second threshold, for example, the diagnostic program 138, initiating the low power state, decrease the propeller speed based on the temperature of the battery 114 reaching the first threshold and initiate the exit condition to stop the vehicle 101 from executing a command based on the battery 114 reaching the second threshold.

The sensors 116 and the ranging device 120 provide data used by the navigation unit 110 to determine the position of vehicle 101 as it moves along its desired path in the tank. The navigation unit 110 can determine or configure the navigation path using the sensors 116. The proximity sensor can be attached or embedded in front of the vehicle 101 to detect nearby object for collision avoidance without physical contact with the object. The proximity sensor can emit an acoustic beam or beam of electromagnetic radiation (e.g., a laser range finding system), and measure travel time to determine the present of one or more objects, which can be referred to as one or more targets. For example, the navigation unit 110, based on the proximity sensor detecting obstruction in close proximity of the vehicle 101, can responsively maneuver the vehicle 101 to avoid collision. A combination of measurements from sensors 116 and the ranging device 120 can be used to determine the vehicle's position over time and generate a map of the tank. For example, the ranging device 120 can determine the position of the vehicle 101 relative to the side of the tank. The ranging device 120 can use sensors 116, or other sensors, for dead reckoning (e.g., the process of determining the position of the vehicle 101 by estimating the direction and distance traveled). In some cases, the sensor 116, such as the odometer, can be used to determine total distance travelled by the vehicle 101. The total distance can be used to generate a map of the tank, determine an operation efficiency of the tank inspection, determine a resource utilization value of the tank inspection, or an amount of power consumed by the vehicle 101 during the tank inspection process.

The sensors 116 can provide fuel level information using the fuel level sensor embedded in or on the vehicle 101 indicating an amount of fuel remaining in the tank during inspection. The fuel level sensor can include a float, an actuating rod, and a resistor, which can provide a signal indicating the amount of fuel in residing in the tank. The fuel level sensor on the vehicle 101 can provide information to determine a submersion level of the vehicle 101. The submersion level can be used by the control unit 104 to initiate the diagnostic program 138. The fuel level sensor can be used to determine or configure an operation condition based on the tank dimension. The sensors 116 can determine the tilt information using the tilt sensor, indicating the orientation of the vehicle 101. The tilt sensor can be used by the control unit 104 to prevent disorientation of the vehicle 101. Disorientation can refer to the vehicle 101 being upside down, or otherwise oriented in an incorrect or erroneous direction.

The vehicle 101 can be powered on based on a pressure threshold. The pressure threshold can be predetermined prior to executing a tank inspection procedure, such as before inserting the vehicle 101 into the launcher connected to the manway of the tank. The vehicle 101 can measure the surrounding pressure using at least the pressure sensor of the vehicle 101. For example, the pressure threshold can be set to 40 pound per square inch ("PSI"). The vehicle 101 can initially be powered off under 15 PSI of pressure. The pressure surrounding the vehicle 101 can increase from 15 PSI to 45 PSI. In response to the pressure exceeding 40 PSI (i.e. the pressure threshold), the vehicle 101 can turn on and execute instructions to perform tank inspection procedures.

In some implementations, the pressure threshold can be dynamically adjusted based on at least the pressure or the condition surrounding the vehicle 101. The condition surrounding the vehicle 101 may refer to whether the vehicle 101 is in contact with a fluid or is not in contact with the fluid. For example, the pressure threshold can entail a pressure 20 PSI greater than a starting pressure surrounding the vehicle 101. The starting pressure can refer to a pressure measurement an instance prior to the vehicle 101 being in contact with a fluid. The vehicle 101 can receive, using the pressure sensor, a first pressure measurement of 15 PSI. The vehicle 101 may be moved to a different location prior to turning on the vehicle 101. The vehicle 101 may receive, using the pressure sensor, a second pressure measurement of 17 PSI. The second pressure measurement can be the starting pressure for turning on the vehicle 101. The pressure surrounding the vehicle 101 may increase from 17 PSI to 45 PSI, while the vehicle 101 is in contact with a fluid. Subsequent to the pressure exceeding 37 PSI (i.e. the pressure threshold above the starting pressure) and the vehicle 101 being in contact with the fluid, the vehicle 101 can turn on to execute tank inspection instructions.

The vehicle 101 may exit the tank via a manway of the tank. The vehicle 101 can use sensors 116 to navigate back to the location of the manway. For example, the launcher may be installed with at least one indicator (e.g. light source) positioned on the inside of the launcher's lid. The vehicle 101 can detect the light source using a light sensor (e.g. camera). The vehicle 101 can align itself with the light source to initiate a sequence of exiting procedures. Accordingly, once the vehicle 101 in position, the vehicle 101 can travel towards the light source to exit the tank via the manway.

The launcher can include an acoustic source, a laser, an ultrasound generator, or other sources to indicate a location of the manway. The vehicle 101 can use the sensors 116 to detect at least one of the indicators to identify the location of the manway to exit the tank.

In some implementations, the launcher may not include an indicator to indicate the location of the manway. Instead, the vehicle 101 can use one or more sensors 116 to identify the location of the manway. For example, the vehicle 101 can utilize a light source and an imaging sensor installed on the vehicle 101. The vehicle 101 can utilize the light and imaging sensor to search for the manway inside the tank. The vehicle 101 may perform an exit procedure subsequent to identifying the manway.

The propeller 118 can include a controllable-pitch propeller, skewback propeller, modular propeller, or Voith Schneider propeller. The propeller 118 can be connected to the battery 114. The propeller 118 can use the one or more sensors 116 to determine one or more propeller information including a propeller speed, a propeller torque, or a propeller motor temperature. The propeller information can be stored within the collected data 132 of the vehicle resource repository 126. The propeller 118 can execute one or more commands by the navigation unit 110 of the control unit 104 using the propeller control program 128 stored in the vehicle resource repository 126, which can be based on an execution of a diagnostic program 138. The control unit 104 can increase or decrease the speed of the propeller 118 to adjust the vehicle 101 speed or change the orientation of the propeller 118 to adjust the direction of the vehicle 101. The control unit 104 can adjust the speed or orientation of the vehicle responsive to or based on the results of executing the diagnostic program 138, or a location of the vehicle 101 on the map of the tank. In some cases, the control unit 104 can disable or turn off the propeller 118 responsive to the results from executing diagnostic program 138. For example, the diagnostic program 138 can identify a failure of a component or an undesired operating condition. The control unit 104, based on the failure or operating condition, can determine not to provide power to the propeller 118. Instead, the control unit 104 can determine to re-run the diagnostic program 138 one or more times until a satisfactory operating condition has been detected.

The propeller 118 can be used to rotate or move the vehicle 101 through the flammable fluid in the tank in one or more directions based on the navigation unit 110 using the propeller control program 128. The propeller 118 can be configured with an operation condition to increase or decrease the propeller speed. In some cases, the propeller 118 can be configured by the diagnostic program 138 to operate in a low power state based on the amount of power or energy remaining in the battery 114. The propeller 118 can operate in a cooling state, based on the temperature information of the battery 114 or the propeller 118. In some cases, the control unit 104 can be configured with a wait condition in which the control unit 104 pauses the propeller 118 responsive to a condition (such as heat buildup or a buildup in electrostatic charge as detected by a sensor 116).

The ranging device 120 can include a bump sensor, infrared sensor, ultrasonic sensor, laser sensor, or radar sensor. The ranging device 120 can be controlled, instructed or managed by the mapping unit 108 of the control unit 104 to execute one or more mapping commands. The ranging device 120 can be connected to the battery 114. The ranging device 120 can provide data to the mapping unit 108 to generate or update a map of the tank based on information from the one or more components of the ranging device 120. The ranging device 120 can collect data used to generate or update the map of the tank based on the vehicle 101 traversing a plurality of portions of the tank. The ranging device 120 can determine, maintain, or update a position of the vehicle 101. The ranging device 120 can be configured by the mapping unit 108 of the control unit 104, for example, to update the position of the vehicle 101. The map of the tank generated by the ranging device 120 can be included, stored, maintained, and updated within a tank map 130 of the vehicle resource repository 126. The mapping unit 108 can use information obtained from any sensors 116 or other sources to generate the map, including, but not limited to, for example the ranging device 120 and sensors 116.

The ranging device 120 can include or use the radar sensor to measure distance between the vehicle 101 and the enclosure of the tank using radio waves with an antenna. The antenna can transmit the radio waves and receive a reflection of the radio waves, the reflection of the radio waves can indicate the enclosure of the tank, which can indicate the dimension of the tank. The dimension of the tank can be stored within the tank map 130. The ranging device 120 can use the ultrasonic sensor to measure the distance between the vehicle 101 and the enclosure of the tank. The ultrasonic sensor can include an ultrasonic element for both emission and reception of ultrasonic waves, the ultrasonic element can emit the ultrasonic waves, initiate a timer, receive the ultrasonic waves, and stop the timer. The ultrasonic sensor can execute a distance measurement technique to determine the distance between the vehicle 101 and the enclosure of the tank. The ranging device 120 can generate the tank map 130 based on acoustic waves reflected off one or more portions of the tank, the acoustic waves generated by the one or more ranging device 120 sensors.

The inspection device 122 can include a magnetic sensor, a magnetic sensor array, an ultrasonic sensor, an ultrasonic array system, an ultrasonic phased array system, or a sweeping device. The inspection device 122 can be connected to the battery 114. The inspection device 122 can be configured by the inspection unit 112 of the control unit 104 to execute one or more commands. The inspection device 122 can inspect the tank to make quality metric measurements, such as measurements related to the thickness or level of corrosion of a portion of the tank. The inspection device 122 can initiate a tank inspection process 134 to make quality metric measurements for portions of the tank. The tank inspection process 134, which can be retrieved from the vehicle resource repository 126, which can be subsequent to the generation of a portion of a tank map 130. The tank inspection process 134 can be based on the result of the diagnostic program 138. The ATIS 102 can store the inspected portion of the tank within the tank map 130 in the vehicle resource repository 126. The inspection device 122 can determine a quality metric 136 of a portion of the tank. The quality metric 136 can include or indicate the thickness of a portion of the tank, or a level of corrosion of a portion of the tank. The vehicle 101 can determine and store the quality metric 136 in the vehicle resource repository 126. The inspection device 122 can execute the inspection process 134 responsive to identifying that a portion of the tank map 130 has not yet been inspected. The inspection device 122 can, however, determine not to execute the inspection process 134 responsive to identifying that the portion of the tank map 130 has already been inspected, thereby reducing computing and energy resource consumption by the vehicle 101.

The inspection device 122 can use the magnetic sensor or magnetic sensor array to determine the thickness of the tank floor. The magnetic sensor can include one or more coils or one or more conductors that can generate a magnetic field. The inspection device 122 can induce loops of electric current at one or more portions of the tank corresponding to a first position of the vehicle 101 on the tank map 130. The position can refer to a region, area or section of the tank. The control unit 104 can provide instructions or commands to the inspection device 122 to cause the inspection device 122 to modify the magnitude, intensity, or duration of the magnetic field generated by the conductors. For example, the control unit 104, executing the inspection process 134, can generate control commands and output the commands to the inspection device 122.

The inspection device 122 can detect or measure values corresponding to the induced loops of electric current at the one or more portions of the tank. The measured values can correspond to a property of the magnetic field, such as a magnitude, intensity, or decay time, and can be stored in the collected data 132 of the vehicle resource repository 126. The control unit 104 can receive the detected or measured values from the inspection device 122, and process the values to determine a quality metric. The control unit 104 can store the received values as collected data 132 for future processing by the ATIS 102 or an external data process system. To process the values, the inspection unit 112 can use a thickness table (e.g., stored in the vehicle resource repository 126) to convert the measured values associated with the magnitude field to tank floor thickness, which can be stored in the quality metric data structure 136.

The vehicle 101 can include a sweeping device to remove debris that might negatively affect measurements related to the quality metric. For example, the sweeping device can remove substances between the tank enclosure and the inspection device 122 (or sensors 116). The vehicle 101 can measure values after sweeping to obtain an accurate measurement. The vehicle 101 can measure values before and after sweeping to determine the variation or impact on the measurement caused by the debris.

The inspection device 122 can generate pulsed eddy currents to determine the quality metric 136. The inspection device 122 can include a pulsed eddy currents probe to determine a thickness or a corrosion of the tank floor using the pulsed eddy current. The magnetic field can penetrate through the one or more layers or constructions of the tank floor and stabilize in the layer of the tank floor. The electrical current generated by the inspection device 122 can be disabled to cause a drop in the magnetic field, which results in eddy currents appearing in the layers of the tank floor and decreasing strength over time. The pulsed eddy currents probe can be used to monitor the decay in eddy current, the decay can determine the thickness of the tank floor. The electrical current magnitude in a given loop can be proportional to the strength of the magnetic field, the area of the loop, and the rate of change of flux, and inversely proportional to the resistivity of a material.

In some implementations, the inspection device 122 can generate array eddy currents along an array of coils to determine the quality metric 136 at a portion of the tank corresponding to a second position of the vehicle 101 on the tank map 130. An alternating current can be injected into the coil of the inspection device 122 to create a magnetic field. The inspection device 122 can be placed over the tank floor to generate one or more opposed alternating current. The inspection device 122 can then determine a flaw or corrosion of the tank floor based on the measured distortion of the opposed alternating current.

The inspection device 122 can include an ultrasonic array system or ultrasonic phased array system to determine a second quality metric 136 at the portion of the tank corresponding to the first position of the vehicle 101 on the tank map 130. The second quality metric 136 can be similar to, or different from, the first quality metric 136. The ultrasonic phased array system can include ultrasonic transducers, which can be pulsed independently using computer-calculated timing. Pulsing the ultrasonic transducers can result in steering a beam generated by the ultrasonic transducers to scan the portions of the tank. In some implementations, the inspection device 122 can include two different technologies to generate the quality metric 136 at the portion of the tank. For example, the inspection device 122 can determine a thickness of the tank floor using eddy currents information and a thickness of the tank floor using the ultrasonic phased array information. This allows the vehicle 101 to take advantage of the complementarity of the two technologies. For example, eddy current technology can provide better results compared to ultrasonic technology in the presence of residual sediment after the brush cleans the floor, or in the case the tank floor inside the tank (e.g., topside) is corroded corrosion. Ultrasonic can provide better results as compared to eddy current technology when the floor has been sufficiently cleaned by the brush and is primarily affected by pitting. In some cases, one technology may consume more battery power than another technology, so the vehicle 101 can select a lower power technology in the event the battery level is low in order to prolong the inspection. Thus, the inspection device can include at least two different types of sensors, and select, based on a condition associated with the portion of the tank corresponding to the first position of the vehicle on the map, one of the at least two different types of sensors to inspect the portion of the tank.

In some implementations, the tank may not include any object (e.g. tools, equipment, devices, or mechanism) on the roof of the tank. Existing or remaining object can be removed from the tank. Access to the roof of the tank may be removed or disabled subsequent to removing the object. For example, a personnel or employee may investigate and remove remaining equipment or tools on the roof of the tank. Subsequently, access to the roof may be disabled or lifted to avoid overloading the roof of the tank.

The vehicle resource repository 126 can include or store the propeller control program 128, the tank map 130, the collected data 132, the tank inspection process 134, the quality metric 136, and the diagnostic program 138. The propeller control program 128 can include or store one or more propeller commands, the propeller commands can determine propeller speed, torque, and orientation, which can adjust the vehicle 101 speed, distance travel, or direction, for example. The propeller control program 128 can be controlled based on the result of the diagnostic program 138. The propeller control program 128 commands can include moving the vehicle 101 through the flammable fluid in the tank. The propeller control program 128 can be used or updated by the navigation unit 110 of the control unit 104 to control the propeller 118.

In some cases, the propeller control program 128 can be configured by the control unit 104 to operate in high performance state based on the available power of the battery 114 or the tank map 130 dimension. In some cases, the propeller control program 128 can operate in low power state based on the available power reaching a first power threshold. In some cases, the propeller control program 128 can initiate an exit condition based on the available power reaching a second power threshold, lower than the first power threshold. In some cases, the propeller 118 can operate in the cooling state, based on the temperature information of the battery 114 or the propeller 118.

The tank map 130 can include, store, or maintain one or more maps of the tank to generate a path for tank inspection or a map data structure to generate a map of the tank. The map data structure can be stored in the data repository 126, which can be part of the tank inspection process 134. The tank map 130 can store information collected from the ranging device 120, which can be configured by the inspection unit 112 of the control unit 104. The tank map 130 can include or store information on the dimension of the tank, or position information of the vehicle 101 corresponding to the map. The dimension information of the tank can include length, width, height, or the circumference or diameter or radius, which can be used by the navigation unit 110 to set the vehicle 101 speed to move in the tank or by the inspection unit 112 using the tank inspection process 134 to set the inspection speed. The tank map 130 can include or store information on one or more inspected portions or one or more uninspected portions of the map. The tank map 130 can be updated by data received from the ranging device 120.

The collected data 132 can include or store data from the sensors 116, the propeller 118, the inspection device 122, or the battery 114. The sensor data can include the speed of the vehicle 101, speed of the propeller 118, temperature of the vehicle 101 (or portion thereof), temperature of the propeller motor 118, temperature of the battery 114, the travel distance (or position, direction, or heading) of the vehicle 101, the propeller 118 torque, touch information, the magnetic field information, the ultrasonic sensor information. The collected data 132 can store acknowledgement feedback from the propeller 118 as a response to the propeller 118 receiving the control instruction. The collected data 32 can store inspection data obtained by the inspection device 122, including magnetic field information and the ultrasonic sensor information to determine a quality metric 136 of the tank enclosure. The collected data 132 can store diagnostic result from executing the diagnostic program 138. The diagnostic result can be used by the control unit 104 to determine whether to initiate the tank inspection process 134, disable the propeller 118 to prevent the propeller 118 from moving the vehicle, or set a speed of the propeller 118. The collected data can include or store the battery information indicating the power available in the battery 114, the power available can initiate the operation condition by the control unit 104.

The tank inspection process 134 can include or store a plurality of inspection instruction, which can comprise generating the tank map 130 and determining a quality metric 136 for a portion of the tank corresponding to a location on the generated map. The tank inspection process 134 can be configured or used by the inspection unit 112 of the control unit 104 to initiate the inspection device 122. The tank inspection process 134 can be configured based on the result of the diagnostic program 138. The tank inspection process 134 commands can include sweeping instruction for removing sediment on the tank floor, or data collection command for the inspection unit 112 to determine the quality metric 136 of a portion of the tank. The tank inspection process 134 can maintain or update the inspection commands based on the collected data 132 from the inspection device 122, one or more uninspected portions of the tank indicated by the tank map 130, or path of the tank inspection based on the navigation unit 110.

The control unit 104 (e.g., via an inspection unit 112) can retrieve, from the vehicle resource repository 126, a tank inspection process 134. The control unit 104 can load, execute, initiate, run or otherwise perform the tank inspection process 134 retrieved from the vehicle resource repository 126. The tank inspection process 134 can include one or more rules, parameters, conditions, operations, procedures, or other information used to perform a tank inspection. For example, the tank inspection process 134 can include a type of tank inspection, such as an expedient, preliminary, or efficient inspection on one or more portions of the tank floor based on the tank map 130. The tank inspection process 134 can execute a type of inspection based on the size of the tank, tank status, vehicle 101 status, or other condition. An expedient inspection process can reduce the amount of time spent inspecting one or more portion of the tank floor. The expedient inspection process can include increasing the speed at which the vehicle 101 moves through the flammable fluid within the tank, or using a wider track spacing than the length of the inspection device such that the tank floor is not fully covered.

In some implementations, the tank inspection process 134 can maintain or update a predetermined duration (e.g. 30 minutes, 1 hour, 2 hours, etc.) for tank inspection based on one or more inspection unit 112 commands. The predetermined duration can be stored in the tank inspection process 134. The tank inspection process 134 can include a timer based on the predetermined duration. The tank inspection process 134 can be initiated the timer based on the vehicle 101 being sealed in the tank, the timer can provide an indication to terminate the tank inspection process 134 based on the timer reaching the predetermined duration (e.g. expiration of the timer).

The quality metric 136 can refer to values, measurements, or determinations made using collected data 132. The quality metric 136 can be generated by applying one or more processes or techniques to the collected data 132. The processing techniques can include, for example, a thickness measurement technique, thickness table, or corrosion level measurement technique. The quality metric 136 can include or indicate computed thickness information which can be obtained by using the stored collected data 132 from the inspection device 122. The quality metric 136 can maintain and update one or more corrosion level corresponding to the portion of the tank map 130 determined by the inspection device 122. The quality metric 136 can indicate the corrosion level for one or more portions of the tank based on a plurality of tank inspection process 134 performed by the vehicle 101 during a time interval. The quality metric 136 can indicate the corrosion level based on a comparison between the computed thickness information of a first portion compared to a previous inspected thickness information of the first portion, which can be from past inspection, or a second portion thickness information different from the first portion using the thickness table. The thickness table can indicate the standard thickness corresponding to the tank, the standard thickness corresponding to the original thickness of the tank prior to filling the tank with the flammable fluid. The thickness table can include a comparison between magnitude, intensity, or decay time of a magnetic field to the thickness of the tank. The quality metric 136 can include or store a comparison metric, identifying corrosion level difference between the one or more portions of the tank.

The diagnostic program 138 can include or store diagnostic instruction for the vehicle 101. The diagnostic program 138 can include or store one or more instructions to at least test one or more functionalities of the sensors 116, the propeller 118, the ranging device 120, the inspection device 122, or the battery 114. The diagnostic program 138 can include one or more policies indicating a condition of the vehicle 101. The condition can include the vehicle 101 at least partially submerged in the flammable fluid or a successful test of the one or more functionalities of the ATIS 102. The condition can be used by the control unit 104 to provide one or more instructions to the component. The diagnostic program 138 can store one or more diagnostic results in collected data 132 of the vehicle resource repository 126. The diagnostic program 138 can disable the propeller 118 to prevent the propeller 118 from moving the vehicle 101 from a position.

The diagnostic program 138 can provide the one or more diagnostic results to the control unit 104 for determining to initiate the tank inspection process 134, or to initiate the operation condition, which can be based on one or more condition of the ATIS 102 components including the power available in the battery 114, the sensors 116 information, the propeller 118 information, the ranging device 120 information, or the inspection device 122 information. The diagnostic program 138 can detect the state of the cable, which can indicate the connection of the cable to the vehicle 101. The operation condition can include an exit condition, a wait condition, a low power state, a cooling state, or a high-performance state. The exit condition can include one or more commands to move the vehicle 101 towards a first portion of the tank map 130 or terminate vehicle 101 operation. The exit condition can be based on an expiration of a timer of the tank inspection process 134. The wait condition can include one or more commands to hold the vehicle 101 operation which can include movement and sensor activation, or initiate a countdown before executing the vehicle 101 operation. The low power state can include one or more commands to decrease the propeller 118 speed, deactivate one or more sensors 116, or execute a quick tank inspection process 134 which can cover more portions of the tank using the available power of the battery 114. The cooling state can include one or more commands to initiate the propeller 118 inside the body of the vehicle 101 to cool the ATIS 102, decrease execution of the ATIS 102, or hold the vehicle 101 operation based on the temperature. The high-performance state can include one or more commands to increase execution of the ATIS 102 which can include activating one or more sensors 116, increasing the propeller 118 speed, or initiating a comprehensive tank inspection process 134.

In some implementations, the control unit 104 can determine to generate the map for the tank based on the vehicle 101 being lowered in the tank. The control unit 104 can then instruct the ranging device 120 using the mapping unit 108 to generate the map for the tank. The map of the tank can be stored in tank map 130. In some implementations, the control unit 104 can identify one or more uninspected portions of the tank based on an absence of indication of inspected one or more portions of the tank map 130. The uninspected one or more portions of the tank can be flagged by the inspection unit 112, the flag can be stored in the tank map 130. The control unit 104 can cause the propeller 118 of the vehicle 101 to move the vehicle 101 towards the identified uninspected portion of the tank. The control unit 104 can initiate the tank inspection process 134 on the uninspected portion using the inspection unit 112. In some implementations, the control unit 104 can identify an absence of any uninspected portions of the floor of the tank based on the tank map 130 generated. The control unit 104 can then provide an indication that the tank inspection process 134 is complete using the exit condition based on identifying the absence of an uninspected portion of the tank. The indication of completing the tank inspection process 134 can comprise an acoustic signal or radio waves.

The interface 106 can include an LCD display, which can include haptic feedback capability for receiving and transmitting information to the control unit 104. The LCD display of the interface 106 can include a graphical user interface which can be used to configure the vehicle 101 setting prior to lowering the vehicle 101 into the flammable fluid. The interface 106 can maintain or update processes of the mapping unit 108, the navigation unit 110, and the inspection unit 112 based on the received or transmitted information. The interface 106 can include one or more ports for external connection to the ATIS 102, such as a serial port, USB port, display port, Ethernet port, or Bluetooth receiver and transmitter. The one or more ports can be used to transfer one or more data to or from the vehicle resource repository 126, such as the propeller control program 128, the tank map 130, the collected data 132, the tank inspection process 134, the quality metric 136, or the diagnostic program 138. The port can be used to charge the battery 114 of the vehicle 101. The interface 106 can be covered by one or more materials for waterproofing.

The mapping unit 108 can provide one or more commands to the ranging device 120, which can be based on the tank map 130, the collected data 132, or the tank inspection process 134. The mapping unit 108 can initiate the map data structure stored in the data repository 126 to generate the map of the tank using the ranging device 120. The mapping unit 108 can be connected to the battery 114. The mapping unit 108 can configure or instruct the ranging device 120 to collect acoustic, electromagnetic radiation, touch or other data associated with the tank. The mapping unit 108 can store the collected data and generate a map of the tank, which can be stored in the tank map 130 located in the vehicle resource repository 126. The mapping unit 108 can determine a first position of the vehicle on the tank map 130. The mapping unit 108 can receive data from the ranging device 120 to generate or update the tank map based on traversing a plurality of points of the tank.

The navigation unit 110 can provide one or more commands to the propeller 118, which can be based on the propeller control program 128, the tank map 130, the operation condition based on the diagnostic program 138 result, or the collected data 132. The navigation unit 110 can configure the propeller 118 to move the vehicle 101 through the flammable fluid in the tank from the first position to the second position, which can be based on the tank inspection process 134. The navigation unit 110 can disable the propeller 118 to prevent the propeller 118 from moving the vehicle 101 from the second position based on the operation condition. The navigation unit 110 can hold the vehicle 101 operation before execution of the diagnostic program 138. The navigation unit 110 can further configure the propeller 118 speed, which can be based on the operation condition, or the location of the vehicle 101. The navigation unit 110 can navigate the vehicle 101 to only the one or more uninspected portions of the tank based on the tank map 130. The navigation unit 110 can navigate the vehicle 101 to cover the entire tank map 130.

The inspection unit 112 can provide one or more commands to the inspection device 122, which can be based on the tank inspection process 134 or the quality of the collected data 132 stored in the vehicle resource repository 126. The inspection unit 112 can identify, based on the collected data 132 using the inspection device 122, the quality of the collected data 132 for the quality metric 136. The quality of the collected data 132 can be based on the inspection device 122, the magnitude of noise obtained by the inspection device 122, or obstruction within the tank, for example, one or more substances covering the tank enclosure can misrepresent the thickness of the tank. The inspection unit 112 can configure the inspection device 122 to inspect the tank based on initiating a tank inspection process 134. The tank inspection process 134 can be based on the operation condition of the diagnostic program 138 result.

The inspection unit 112 can determine the quality metric 136 of a portion of the tank based on the collected data 132 from the inspection device 122, the quality metric 136 indicating a thickness of the portion of the tank at a vehicle 101 position. The quality metric 136 determined by the inspection device 122 can be stored in the vehicle resource repository 126 accessible by the control unit 104. The inspection unit 112 can update the tank inspection process 134 based on the collected data 132, for example, to repeat the tank inspection process 134 on one or more portions of the tank. The inspection unit 112 can re-execute the tank inspection process 134 based on the identified quality of the collected data 132. The inspection unit 112 can configure the inspection device 122 to perform the quick inspection based on the tank map 130 size, or the operation condition, for example, the inspection unit 112 can initiate the quick inspection during the low power state based on the available power of the battery 114 and the one or more uninspected portions of the tank.

Figure 2:
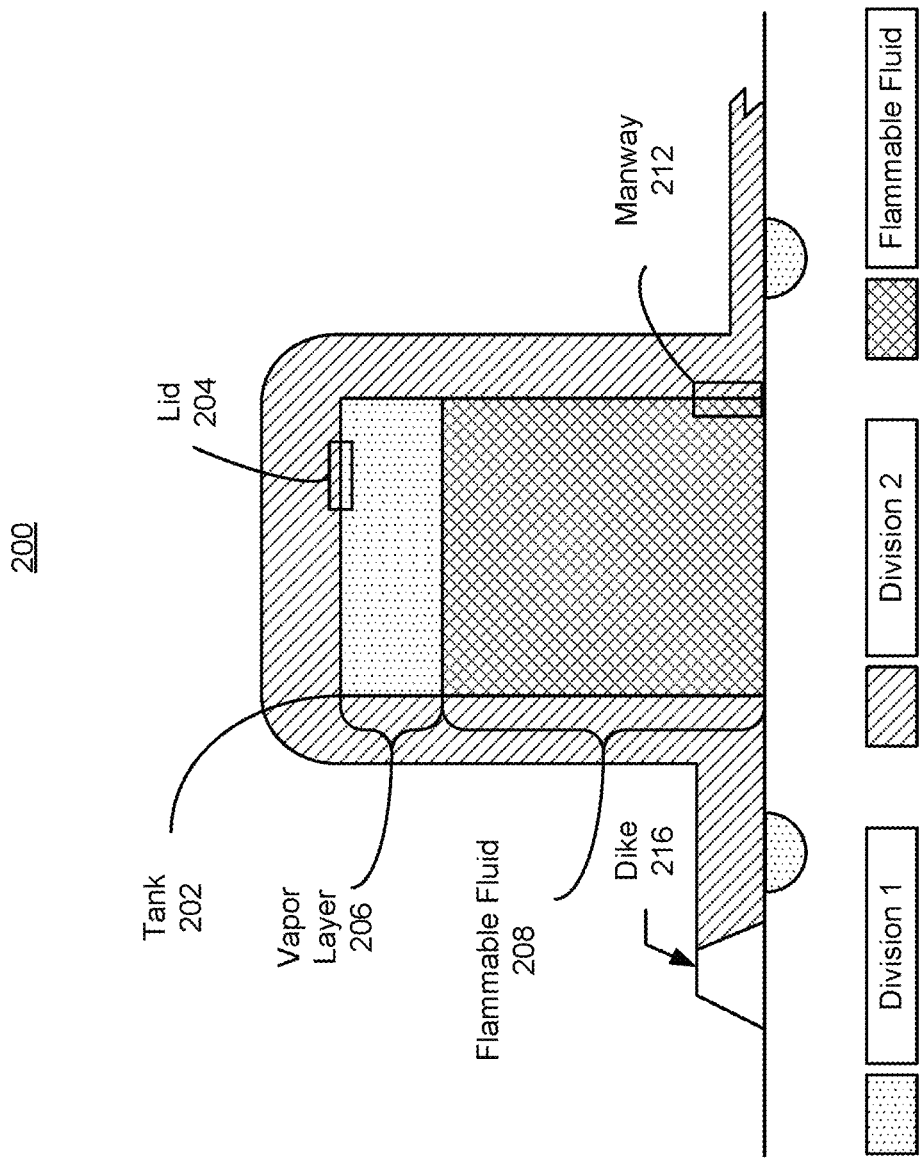
FIG. 2 is an example illustration of a tank containing a flammable fluid, in accordance with an implementation.

Referring to FIG. 2, example illustrations for inspecting a tank containing a flammable fluid, in accordance with some implementations, are shown. The system 200 can include one or more components or functionalities of system 100 depicted in FIG. 1. FIG. 2 provides a side view illustration of the tank 202. The system 200 can include a tank 202 configured for inspection by the vehicle 101. The vehicle 101 can include one or more aspects of the vehicle 101 depicted in FIG. 1. The vehicle 101 can include an autonomous tank inspection system ("ATIS") 102 which can include one or more aspects depicted in FIG. 1. The tank 202 can include a lid 204, a vapor layer 206, the flammable fluid 208, a manway 212, and a dike 216. In some implementations, the tank 202 can include a winch. The tank 202 can be constructed using one or more materials including metal (e.g. steel, aluminum, alloys, etc.), glass, or plastic (e.g. high-density polyethylene). The lid 204 of the tank can be constructed using the one or more materials similar to the tank 202. The lid 204 can be configured with a locking mechanism to prevent opening of the lid 204 prior to a completion of the tank inspection process 134. The lid 204 can be constructed to seal or keep the vapor layer 206 within the tank 202.

Within the tank 202, and above the surface of the flammable fluid 208, there can be a vapor layer 206. The vapor layer 206 can refer to or include a gaseous state of the flammable fluid 208. The vapor layer 206 can be internal to the tank 202 and above the flammable fluid 208. The vapor layer 206 may elevate based on the height of the flammable fluid 208 (e.g. elevation of the vapor layer 206 increase as the volume of the flammable fluid 208 increases). The vapor layer 206 can be flammable.

The vehicle 101 can perform the tank inspection process 134 using power provided by the battery 114. The battery 114 can provide power to one or more component of the vehicle 101, including, for example, the control unit 104, sensors 116, propeller 118, ranging device 120, inspection device 122, or data repository 126. The control unit 104 can execute a tank inspection process 134 to inspect the tank. The tank inspection process 134 can include instructions to generate a map of the tank 202 or to determine a quality metric 136 for a portion of the tank 202 corresponding to a location of the generated tank map 130. The control unit 104 can perform or execute the one or more instructions of the tank inspection process 134 when the vehicle 101 is at least partially submerged, or fully submerged, in the flammable fluid 208.

The tank 202 can include a manway 212 located at the side of the tank 202 for the vehicle 101 to access the interior of the tank 202. The manway 212 may be used for accessing the interior of the tank 202. The manway 212 may be included as part of the construction of the tank 202. The manway 212 may include a lid (e.g., lid 430 depicted in FIG. 4A). The lid may be similar to the lid 204 on the roof of the tank 202. The lid of the manway may be removed similarly to removing the lid 204 on the roof of the tank 202. The manway 212 may be coupled with a gate valve and a launcher. The gate valve and the launcher can allow for the vehicle 101 to enter the tank 202 containing a flammable fluid. The manway 212 may be located anywhere on the side of the tank. The manway 212 may be elevated from the ground (i.e. grade, tank floor, etc.), such as 12 inches, 14 inches, or 16 inches from the ground. The manway 212 may not be elevated from the ground (e.g. the bottom edge of the manway sits on the ground).

The manway 212 of the tank 202 may protrude from the tank shell. The tank shell can refer to the exterior surface of the tank 202. The manway 212 may protrude from the tank shell as to couple with a lid. For example, bolts may be used for coupling a lid with the manway 212. The protrusion of the manway 212 can prevent the bolts used from entering the interior of the tank 202. In some implementations, the manway 212 may not protrude from the tank shell. For example, the manway 212 may be flushed or leveled to the tank shell or the exterior surface of the tank 202. The manway 212 can include a door or a gate to form an opening in the side of the tank 202. The door or the gate of the manway 212 can be opened via pulling, sliding, or lifting method.

The system 200 can include a dike 216 located around the tank 202 to contain potential product leaks from the tank 202. The dike 216 can be constructed with metal, cement, granite, etc. In some cases, the system 200 may not include the dike 216.

Still referring to FIG. 2, areas around the tank 202 may be classified with one or more hazardous classifications. The hazardous classification can include at least a class 1, division 1 ("C1D1") and a class 1, division 2 ("C1D2"). The C1D1 hazardous classification can refer to an area where explosive or flammable gases, vapors, or liquids can exist under regular operating conditions. The C1D2 hazardous classification can refer to an area where explosive or flammable gases, vapors, or liquids are not likely to exist under regular operating conditions. For example, the area above the flammable fluid 208 can include a hazardous classification of C1D1. This classification is due to the fumes and vapors rising up above the flammable fluid 208 and vapor layer 206 of the tank 202. The roof of the tank 202 may be classified as C1D1. Subsequently after opening the lid 204 on the roof of the tank 202, the area on the roof of the tank 202 can be classified under C1D1 hazardous classification.

In further example, the vicinity around the tank 202 can include a C1D2 hazardous classification, as with the manway 212 location. Accordingly, the location of the manway 212 can entail less hazard than the location of the lid 204 on the roof of the tank 202.

Figure 3:
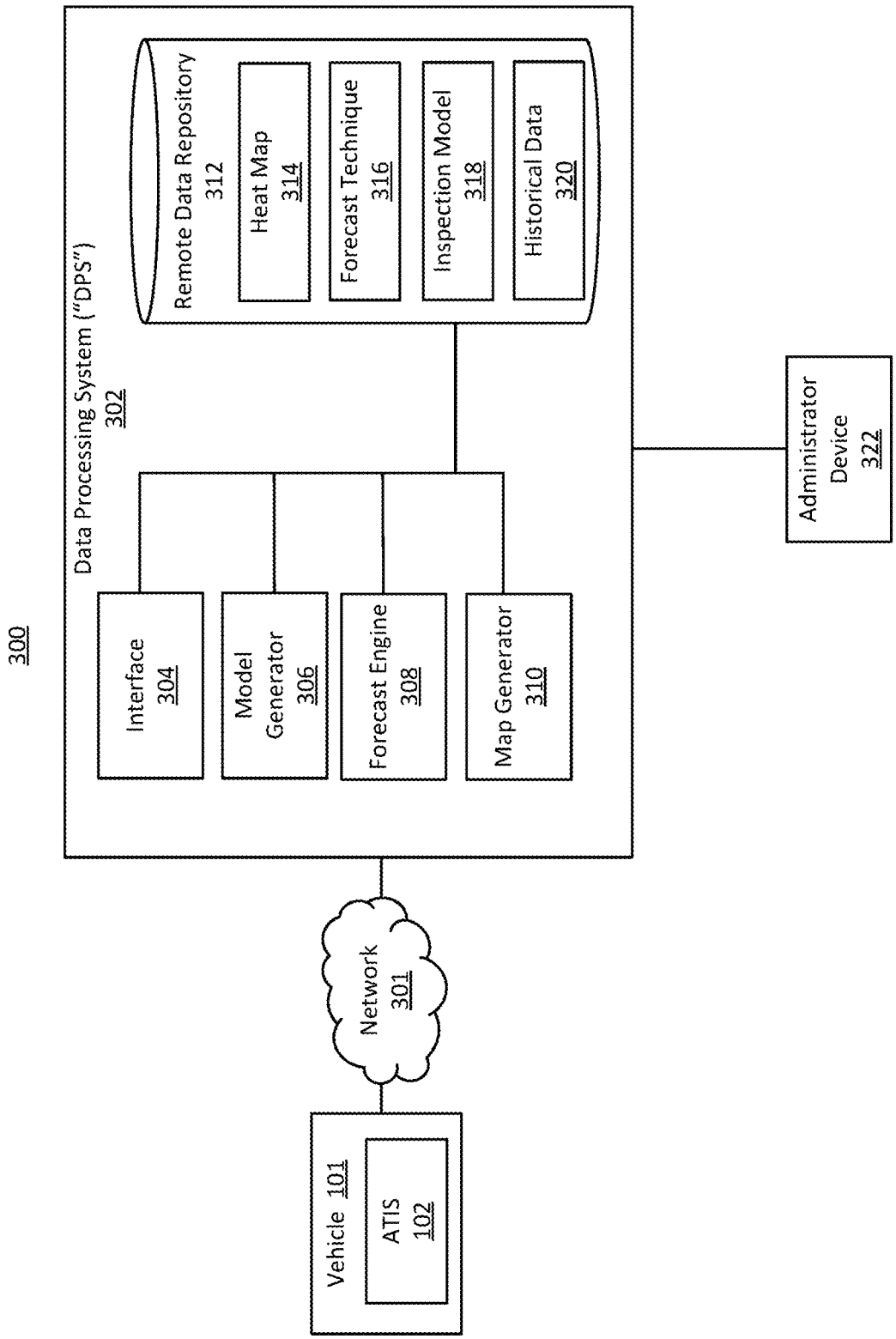
FIG. 3 is a block diagram of an example system to facilitate a tank inspection, in accordance with an implementation.

FIG. 3 is a block diagram of an example system to perform a tank inspection. The system 300 can include one or more component or functionality of system 100 depicted in FIG. 1. The system 300 can include a vehicle 101, network connection 301, data processing system ("DPS") 302, or administrator device 322. The vehicle 101 can include an autonomous tank inspection system ("ATIS") 102 which can include at least one aspect depicted in FIG. 1. The vehicle 101 can be connected to the network 301 via wired or wireless connection. The vehicle 101 can be disconnected from the network 301 and operate independent from the data processing system 302. The vehicle 101 can access information from the data processing system 302 via the network 301. The data processing system 302 can be updated or configured by the administrator device 322. The administrator device 322 can be connected wired or wireless to the data processing system 302.

The network 301 can include or refer to a wired or wireless connection, communication, or transfer of information. The network 301 can include computer networks such as the Internet, local, wide, metro, or other area networks, intranets, satellite networks, and other communication networks such as voice or data mobile telephone networks. The network 301 can include a wired connection or communication using, for example, USB, Ethernet, serial port, digital subscriber line ("DSL"), cable, or fiber. The network 301 can transmit information to or receive information from the vehicle 101 via the interface 106 of the vehicle 101.

The network 301 can be any type or form of network and can include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 301 may include a wireless link, such as an infrared channel or satellite band. The topology of the network 301 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The data processing system 302 can include an interface 304, a model generator 306, a forecast engine 308, a map generator 310, or a remote data repository 312. The data processing system 302 can include hardware or a combination of hardware and software, such as communications buses, circuitry, processors, communications interfaces, among others, similar to the ATIS 102. The data processing system 302 can be connected to the vehicle 101 via the network 301. The data processing system 302 can be connected to the network 301 via a wired or wireless connection.

Each of the one or more components of the data processing system 302 can be implemented using hardware or a combination of software and hardware. Each component of the data processing system 302 can include logical circuitry (e.g., a central processing unit or CPU) that responses to and processes one or more instructions fetched from a memory unit (e.g., memory, storage device, or remote data repository 312). Each component of the data processing system 302 can include or use a microprocessor or a multi-core processor. A multi-core processor can include two or more processing units on a single computing component. Each component of the data processing system 302 can be based on any of these processors, or any other processor capable of operating as described herein. Each processor can utilize instruction level parallelism, thread level parallelism, different levels of cache, etc. For example, the data processing system 302 can include a logic device such as a computing device or server having at least one processor.

The one or more components or elements of the data processing system 302 can be one or more separate components, a single component, or be part of the data processing system 302. For example, the model generator 306 (or the other components of the data processing system 302) can include one or more combinations of hardware and software, such as one or more processors configured to initiate model generation commands, initiate update model commands, and transmit or receive the model information. The one or more components can work individually external to the data processing system 302.

The one or more component of the data processing system 302 can be configured or updated by the administrator device 322. The one or more components of the data processing system 302 can be connected or communicatively coupled to one another. The connection between the various components of the data processing system 302 can be wired or wireless, or any combination thereof.

The interface 304 of the data processing system 302 can include one or more ports for connecting to the network 301 or the administrator device 322. The one or more ports can include, for example, a serial port, USB port, Ethernet port, or Bluetooth receiver and transmitter. The interface 304 can transmit or receive one or more remote data repository 312 information to or from the vehicle 101 or the administrator device 322. The information of the remote data repository 312 can include a heat map 314, a forecast technique 316, an inspection model 318, and historical data 320. The interface 304 of the data processing system 302 can be similar to the interface 106 of the ATIS 102. For example, the interface 304 can be provided with one or more inspection information by the vehicle 101 to store or update the historical data 320. The interface 304 can be provided with one or more previous inspection information from a plurality of tanks 202 inspection by the administrator device 322 to update the historical data 320.

The model generator 306 can generate a risk-based inspection model 318 based on a time-series of quality metrics 136 determined based on ultrasonic thickness data or the loops of electric current provided by the inspection device 122 that extend towards one or more portions of the tank 202. The inspection model 318 can be stored in the remote data repository 312. In some implementations, the quality metric 136 can only store one or more raw information of the tank 202 based on the information from the inspection device 122. The model generator 306 can access or utilize the historical data 320 of the tank 202, the historical data 320 comprising one or more information of the quality metrics 136 from one or more past inspection of various tanks 202. The model generator 306 can generate a model based on a forecast of the forecast engine 308 using the forecast technique 316. The forecast can provide an indication of predicted one or more level of thickness of the tank 202 based on one or more information of the historical data 320.

The model generator 306 can aggregate one or more historical quality metrics 136 from the historical data 320 obtained from a plurality of tank inspections to forecast a level of thickness of the tank 202 based on the quality metric 136. The historical quality metrics 136 indicating one or more thickness level of the tank 202. The forecast thickness level of the tank 202 can indicate the risk of leakage of the tank 202, the risk can be provided to the administrator device 322. For example, a plurality of quality metrics 136 of the tank 202 obtained from year 2018 can be aggregated with a quality metric 136 of the tank 202 obtained from year 2019 using the forecast engine 308. The forecast engine 308 can utilize the forecast technique 316 to indicate a deterioration rate of the tank 202, which can be based on the difference between the 2019 quality metric and the 2018 quality metric. The model generator 306 can receive the indication of the deterioration rate of the tank 202 and generate a risk-based inspection model 318 which can indicate a time leakage will occur in one or more portions of the tank 202.

Inputs to the risk-based inspection model 318 can include original design and construction drawings as well as information about the quality of the materials and fabrication techniques (e.g., welding or bolting) used to build the tank, which can provide a baseline for future inspections. A record of operating conditions can allow verification that the tank was operated within its functional limits (e.g., max fill level). A history of tank floor quality metrics, recorded during previous inspections, can be used as the primary driver to establish deterioration trends using a variety of models associated with different types of deteriorations (for instance general, local or pitting corrosion). The forecast engine 308 can perform risk analysis by determining the probability of failure, which is then converted into a period of time after which the tank should be taken out of service for repairs. The forecast engine 308 can assess the probability of failure based on a qualitative approach (engineering/expert judgement and experience using qualitative terms such as very unlikely, unlikely, possible, probable, or highly probable), a semi-qualitative approach (modification of the nominal floor failure frequency—if available—by factors specific to the particular floor's management and environment) or a quantitative approach (structural reliability analysis method). The output of the model can include a period of time the tank can remain in service until the tank should be taken out of service for repairs. Thus, the model generator 306 can generate a risk-based inspection model based on a time-series of quality metrics (e.g., determined based on the loops of electric current provided by the inspection device that extend towards the portion of the tank), and aggregate the historical quality metrics obtained from a plurality of tank inspections to forecast a level of thickness of the tank based on the quality metric.

The forecast engine 308 can access one or more forecast techniques 316 to perform a risk prediction of the tank 202. The risk can indicate a corrosion level of the tank 202, an indication of the tank 202 thickness over time, or a leakage time of the tank 202. The risk can be determined based on a historical quality metric 136, a historical flammable fluid level, or a historical environment of the tank 202. The historical quality metric 136 can indicate one or more thickness levels of the tank 202 from one or more past inspection. The historical flammable fluid level can indicate a plurality of periodic flammable fluid levels of the tank 202 based on flammable fluid level information provided by the administrator device 322, or the historical data 320 including flammable fluid level information from a previous inspection of the tank 202. The historical environment or an environmental information of the tank 202 can indicate a plurality of periodic information based on atmospheric information (e.g. gases and other atmospheric particles) or a climate information provided by the administrator device 322 or the historical data 320 comprising one or more environmental conditions (e.g. temperature, humidity, etc.) of the tank 202 based on one or more past inspection. The forecast engine 308 can generate a graph to indicate a corrosion rate based on one or more historical data 320 containing a plurality of quality metric 136 from a plurality of inspections, the graph can be a time to thickness comparison. The quality metric 136 from the historical data 320 can be one or more points on the graph, for example, the forecast engine 308 can use a first quality metric 136 from an inspection of the tank 202 performed in the year 2010 and a second quality metric 136 from an inspection performed in the year 2015 to generate a line on the graph illustrating a linear rate of decay of the tank 202. The forecast engine 308 can further use the plurality of quality metric 136, such as 50 quality metrics 136 over a time, to predict a time interval for leakage based on the condition of the tank 202. The condition of the tank 202 can include a geographical location of the tank 202, a fuel level contained in the tank 202, or a current thickness of the tank 202. In some implementations, the graph can display a linear decay rate based on the tank 202 thickness from 20 cm to 15 cm and an exponential decay rate based on the tank thickness from 15 cm to 0 cm.

The map generator 310 can generate a heat map 314 of the tank 202 based on the quality metric 136 of the one or more portions of the tank 202. The map generator 310 can initiate a generation of the heat map 314, based on the vehicle 101 providing the tank map 130 and the quality metric 136 to the data processing system 302 via the network 301. The map generator 310 can aggregate the tank map 130 information and the quality metric 136 information to generate a heat map 314 indicating one or more levels of thickness of a plurality of portions of the tank 202 using a plurality of color codes. The plurality of color codes can range from red to green to blue. For example, a very thick portion of the tank 202 can be color coded with blue, a very thin portion of the tank 202 can be color coded with red, and a spectrum of color between the blue and the red can indicate the gradual increase or decrease of the thickness of the one or more portions of the tank 202. The map generator 310 can generate a 2-D heat map 314 or a 3-D heat map 314 of the tank 202 indicating the thickness of the plurality of portions of the tank 202.

The remote data repository 312 can include the heat map 314, the forecast technique 316, the inspection model 318, or the historical data 320. The remote data repository 312 can include storage (e.g. hard disk drives, solid state drives, floppy disks, magnetic tape, etc.) which can store tank information including information associated with previous inspections of one or more tanks. The remote data repository 312 can store environmental information. The environmental information can include, for example, atmospheric information (e.g. pressure, gases, atmospheric particles), climate information (e.g. temperature, humidity, radiation, and amount of rain), topographic information, altitude information, ground information, or subsurface information. The data processing system 302 can obtain the environmental information from the vehicle 101. The data processing system 302 can obtain the environmental information from external sources or databases. The administrator device 322 can provide the environmental information to the data processing system 302.

The heat map 314 can include or store a plurality of color-coded tank maps 130 of the tank 202 generated by the map generator 310. The color code can range from red to green to blue. The heat map 314 can utilize the plurality of color codes to provide a graphical representation of the tank map 130 indicating the thickness level of the tank 202. For example, a very thick portion of the tank 202 can be color coded with blue, a very thin portion of the tank 202 can be color coded with red, and a spectrum of color between the blue and the red can indicate the gradual increase or decrease of the thickness of the one or more portions of the tank 202. The heat map 314 can indicate the texture of the tank 202 based on the thickness level information. The texture of the tank 202 can represent one or more bumps or one or more dips of the tank 202. The plurality of color code can be configured by the administrator device 322. The heat map 314 can be provided to the administrator device 322 to display the graphical representation of the tank map 130. The heat map 314 can store a 2-D heat map 314 or a 3-D heat map 314 of the tank 202 generated by the map generator 310.

The forecast technique 316 can include a plurality of time-series forecasting techniques for determining a risk-based inspection model 318. The forecast technique 316 can be accessed or used by the forecast engine 308. The risk can represent a deterioration rate of the tank 202 based on the difference between present and one or more past tank 202 thickness level, the environmental information, or the historical data 320. The risk can further represent a predicted leakage time of the one or more portions of the tank 202 or the indication of one or more thickness level of the tank 202 over time. The predicted time of leakage can be based on the present thickness level of the one or more portions of the tank 202 and the corrosion rate of the tank 202. The forecast technique 316 can be assisted by a machine learning technique or one or more information from the administrator device 322.

The inspection model 318 can store a plurality of risk-based model based on the time-series of quality metrics 136 generated by the model generator 306. The inspection model 318 can be a human readable report. The inspection model 318 can be provided to the administrator device 322 indicating the corrosion rate of the tank 202, at least an indication of the tank 202 thickness over time, or the predicted time of leakage of the tank 202. The inspection model 318 can be presented in a graphical format or a table. For example, the inspection model 318 can be generated and stored in the remote data repository 312 by the model generator 306. The inspection model 318 can be accessed and obtained by the administrator device 322 to display an inspection model 318, which can include the indication of the corrosion rate, the thickness over time, or the predicted time of leakage of the tank 202. The inspection model 318 can be used by the administrator device 322 to identify a maintenance time for one or more portions of the tank 202, at least an inspection cycle for the tank 202, or at least an indication of occurring leakage of the tank 202. The occurring leakage of the tank 202 can be based on an absence of one or more portions of the tank 202 identified by the inspection device 122.

The historical data 320 can include or store one or more quality metrics 136 which can indicate the thickness level of the tank 202. The historical data 320 can include or store a plurality of quality metrics 136 from one or more previous inspections of a plurality of tanks 202. Each tank 202 of the plurality of tanks 202 can be different in at least dimension, construction, or location. The historical data 320 can include or store a flammable fluid level of the tank 202, dimensions of tank 202, or the environmental information of the tank 202. The environmental information can include atmospheric information (e.g. gases and other atmospheric particles) or an environmental condition (e.g., temperature, humidity, pressure, or altitude) of the tank 202. The historical data 320 can be obtained, configured, or updated by the administrator device 322. The historical data 320 can be accessed by the forecast engine 308 or the model generator 306 for generating an inspection model 318. The vehicle 101 can receive historical data 320 via a network.

The administrator device 322 can include an interface 304 similar to the data processing system 302 or the ATIS 102. The interface can include an LCD display, serial port, USB port, display port, Ethernet port, or Bluetooth receiver and transmitter. The administrator device 322 can be connected to the data processing system 302 via wired or wireless connection to the interface 304 of the data processing system 302. The administrator device 322 can be remote to the data processing system 302. The administrator device 322 can configure or update one or more components of the data processing system 302 which can include the model generator 306, the forecast engine 308, the map generator 310, or the remote data repository 312.

The administrator can be provided with a risk-based inspection model 318 based on a time-series of quality metrics 136, the inspection model 318 can be displayed on the administrator device 322 illustrating one or more risk of the tank 202 including the corrosion rate of the tank 202, at least an indication of the tank 202 thickness over time, or the predicted time of leakage of the tank 202. The administrator device 322 can update the historical data 320 with one or more quality metrics 136 of a plurality of tanks 202 via the interface 304. The administrator device 322 can update the historical data 320 with one or more environmental information of the tank 202. The administrator device 322 can provide one or more settings to adjust one or more color codes of the heat map 314 or adjust a type of heat map 314 to generate (e.g. 2-D or 3-D). The administrator device 322 can update the forecast technique 316 based receiving a different technique for forecasting. The administrator device 322 can identify a maintenance time for one or more portions of the tank 202, an inspection cycle for the tank 202, or an indication of occurring leakage of the tank 202 based on the inspection model 318.

Referring to FIGS. 4A-B, an illustration of an example system of a launcher and a gate valve for launching and recovering a vehicle from a tank containing a flammable fluid via a manway is shown. The system 400 can include one or more components or functionalities of systems 100, 200, and 300 depicted in FIGS. 1-3. The system 400 can include a tank 202, a manway 212, a gate valve 410, a launcher 420, a lid 430, and a support 440. The system 400 can include a vehicle 101, which can be deployed into the tank via the launcher 420, as an example. The vehicle 101 can include an autonomous tank inspection system ("ATIS") 102 which can include one or more aspects depicted in at least FIG. 1. The tank 202 can include one or more aspects depicted in at least FIGS. 2A-B.

The one or more components or functionalities of the system 400 can facilitate launching of a vehicle 101 into a tank 202 containing a flammable fluid 208 via a manway 212. The launcher 420 can be loaded with the vehicle 101 via a first side of a launcher 420. The vehicle 101 can be in a power off state upon being loaded into the launcher 420. A second side of the launcher 420 can couple to a vertical side of the tank 202 containing the flammable fluid 208 via a gate valve 410. The launcher 420 may not contain the flammable fluid 208. The first side of the launcher 420 can couple to or be placed with a lid 430 to seal the launcher 420. Subsequent to sealing the launcher 420 with the lid 430, the gate valve 410 can open at the second side of the launcher 420 to release the flammable fluid 208 into the launcher 420. An increase in pressure above a threshold, cause by the release of the flammable fluid 208 into the launcher 420, can responsively trigger a pressure switch 140 of the vehicle 101 to enter a power on state. The vehicle 101 can navigate, via one or more propellers 118 of the vehicle 101, responsive to entering the power on state, from the launcher 420 into the tank 202 to perform a tank inspection process.

The one or more components or functionalities of the system 400 can facilitate the retrieval of a vehicle 101 from the tank 202 containing a flammable fluid 208 via a manway 212. The vehicle 101 can be loaded into a launcher 420 via a second side of the launcher 420. The vehicle 101 can move into the launcher 420 subsequent to executing an exit procedure in response to terminating tank inspection procedures. Subsequent to loading the vehicle 101 into the launcher 420, the gate valve 410 can close at a second side of the launcher 420 to seal the vehicle 101 in the launcher 420. Once sealed, the flammable fluid 208 can be released or drained from the launcher 420 by a drainer of the launcher 420. During the process of draining the flammable fluid 208 from the launcher 420, pressure can decrease in the launcher 420. A pressure switch 140 of the vehicle 101, responsive to the decrease in the pressure below a threshold, can be triggered to cause the vehicle 101 to enter a power off state. The lid 430 located on the first side of the launcher 420 can be removed subsequent to releasing the flammable fluid 208 from the launcher 420. The vehicle 101 can be retrieved from the first side of the launcher 420, once the lid 420 is removed.

Referring to FIG. 4A, a side view illustration of a gate valve 410, a launcher 420, and a lid 430, and a portion of a tank 202 is shown. The tank 202 can contain a flammable fluid 208 inside the tank 202. The manway 212 may be submerged inside the flammable fluid 208, such that opening the manway 212 would allow the flammable fluid 208 to flow out the tank 202. The manway 212 may include a diameter, such as 20 inches, 24 inches, 30 inches, or 36 inches. The manway 212 may be circularly, rectangular, or other geometric shapes. The manway 212 may protrude from the tank shell, such as 8 inches, 10 inches, or 12 inches from the tank shell. The manway 212 may not protrude from the tank shell, such that the manway 212 is flushed or leveled to the tank shell. The manway can be located above the floor of the tank 202, but below the vapor layer 206.

The gate valve 410 can be configured to couple with at least the manway 212, the launcher 420, or the lid 430. The gate valve 410 may be composed of similar materials as the tank 202. The gate valve 410 may generally be referred to as a valve or a side entry of the tank 202, for example. The gate valve 410 can include a gate, a door, or an entrance to pass substances and objects to and from the tank 202. The gate valve 410 can include multiple gates. The gate valve 410 may be coated with a non-flammable solution or an insulator. The gate valve 410 may be opened or closed via a mechanical or electrical mechanism. For example, the gate valve 410 may be coupled with a lever, a switch, or a computing system with executable instructions to open the gate of the gate valve 410. The computing system can manage the operation of the gate valve 410, such as opening and closing the gate based on a rule (e.g. satisfaction of a criteria), a timer, or a trigger. The gate valve 410 can include a diameter and a shape similar to the diameter and the shape of the manway 212 (e.g., 24 inches, 32 inches, among other diameters configured by the manufacturer where the vehicle 101 is configured to fit). The gate valve 410 can include a diameter and a shape similar to a diameter and a shape of the launcher 420. The gate valve 410 may be used as a diameter or a bolt pattern adapter between the diameter of the manway 212 and the diameter of the launcher 420. For example, the diameter of the manway 212 may be different from the diameter of the launcher 420. The gate valve 410 may include a first side configured to couple with the launcher 420 and a second side configured to couple with the manway 212. The first side of the gate valve 410 may include a first diameter similar to the diameter of the launcher 420. The second side of the gate valve 410 can include a second diameter similar to the diameter of the manway 212. Accordingly, the gate valve 410 may act as an intermediary or adapter between the launcher 420 and the manway 212 of the tank 202. The first side and the second side of the gate valve 410 can be interchangeable. The installation between two components may be referred to as an association between two components, such as installing the gate valve 410 to the manway 212.

The launcher 420 can include a diameter similar to a side of the gate valve 410. The launcher 420 may include a diameter similar to a lid 430. The launcher 420 may be referred to as a tube, a pathway, or a platform. The launcher 420 may be configured to encapsulate the vehicle 101 for preparation to launch into the tank 202 for initiating tank inspection procedures. The launcher 420 can include one or more openings for ventilation or drainage. The one or more openings can be opened to provide or remove substances to or from the launcher 420. The one or more openings can be closed to encapsulate the interior of the launcher 420 and prevent leakage. The launcher 420 can be coated with non-flammable materials. The launcher 420 can be constructed using similar materials as the tank 202 or the gate valve 410.

The launcher 420 can include a first side and a second side. The first side and the second side may be the same diameter and shape. The first side and the second side may not be the same diameter and shape. The first side may be configured to couple with the lid 430. The second side may be configured to couple with the gate valve 410. The second side may include a diameter larger than the diameter of the gate valve 410, such as to bind or cover over the gate valve 410 for installation. The lid 430 may include a diameter larger than the diameter of the first side. The lid 430 may be installed to the launcher 420 by twisting, snapping, bolting, or clipping on the first side of the launcher 420.

The launcher 420 can include at least one support 440 (e.g. support structure, leg, or base). The support 440 can provide elevation and levelling to the launcher 420, such as to correspond to the elevation of the gate valve 410 and the manway 212. For example, if the gate valve 410 is 12 inches above the ground, the support 440 can be 12 inches to align the launcher 420 with the gate valve 410 for installation. The support 440 can include wheels, locks, or other mechanism to facilitate movement and stability of the launcher 420. The launcher 420 may be constructed with the support 440. The support 440 may be removable from the launcher 420. The support 440 may be constructed using similar materials as the gate valve 410, the launcher 420, or the tank 202.

In some implementations, the launcher 420 can allow for more than one vehicle 101 to be deployed into the tank 202 containing a flammable fluid 208. For example, an inspection of the tank 202 may entail launching of more than one vehicle 101 into the tank. A first vehicle 101 and a second vehicle 101 may be moved into the launcher 420. The lid 430 of the launcher 420 can be installed, and the gate valve 410 can open. The first vehicle 101 and the second vehicle 101 can initiate tank inspection procedures asynchronously, for example. The first vehicle 101 and the second vehicle 101 can form a communication link to facilitate the tank inspection procedures. Forming the communication link can prevent overlap in inspected areas by each vehicle 101.

Referring to FIG. 4B, an example illustration of a gate valve 410 is shown. The example illustration can include an opened gate 410B of the gate valve 410 and a closed gate 410A of the gate valve 410. The gate valve 410 may be opened or closed manually (e.g. by an operator or a motorized gate), using a motor with a remote controller, or automatically (e.g. by a computing system based on a rule or criteria). The gate valve 410 can slide, swing, or twist open and close. The gate of the gate valve 410 may be constructed with similar compositions as lid 430 or lid 204. The gate valve 410 may be closed prior to installation on the manway 212.

In some implementations, the gate valve 410 may be opened subsequent to closing the lid 430 of the launcher 420. The closing of the lid 430 can seal off the launcher 420, preventing substance or object from leaving the launcher 420. The opened gate 410B can allow the flammable fluid 208 inside the tank 202 to pass from the manway 212 into the launcher 420. As the flammable fluid 208 increases inside the launcher 420, the pressure inside the launcher 420 can increase to power on the vehicle 101 inside the launcher 420.

In some implementations, the gate valve 410 may include one or more triggers, switches, or sensors. The gate valve 410 may be closed subsequent to the vehicle 101 completing the tank inspection. The gate valve 410 may be closed in response to the vehicle 101 passing the manway 212 and the gate valve 410 into the launcher 420. For example, the one or more sensors of the gate valve 410 can include a motion sensor or an imaging sensor. The gate valve 410 can use the one or more sensors to detect the vehicle 101 moving pass the gate valve 410 from the manway 212. In response to the vehicle 101 entered into the launcher 420, the gate valve 410 can close. The closed gate 410A can prevent the flammable fluid 208 from leaving the tank 202 and substances of the launcher 420 from entering the tank 202.

In some implementations, the gate valve 410 can include a wireless transceiver for wireless communication with the vehicle 101 or one or more external devices (e.g. remote controller or computing device). The gate valve 410 can receive, via the wireless transceiver, a signal from the vehicle 101 or an external device to open and close the gate of the gate valve 410. For example, the vehicle 101 can confirm re-entrance into the launcher 420 after completing the inspection by transmitting a signal to the wireless transceiver to close the gate valve 410. The gate valve 410 can close the gate in response to receiving the signal from the vehicle 101. In some cases, the gate valve 410 may transmit, via the wireless transceiver, an indication that the vehicle 101 has re-entered the launcher 420 to a computing device external to the tank 202. Subsequently, an operator may use a remote controller to manually close the gate valve 410, for example.

Referring to FIGS. 5A-E, illustrations of an example system for a gate valve installation are shown. The system 500 can include one or more components or functionalities of systems 100, 200, 300, and 400 depicted in FIGS. 1-4. The system 500 can include a tank 202, a flammable fluid 208, a manway 212, a gate valve 410, and a lid 430. The lid 430 installed on the manway 212 may be similar to the lid 430 installed on the launcher 420 or the lid 204 installed on the roof of the tank 202. In some implementations, the lid 430 installed on the manway may be different than the lid 430 installed on the launcher or the lid 204 installed on the roof of the tank 202 (e.g. different dimension and shape).

Referring to FIG. 5A, the manway 212 located at the side of the tank 202 may be exposed to an area labeled as class 1, division 2 ("C1D2") hazardous classification. The C1D2 label indicates that explosive or flammable gases, vapors, or liquids are not likely to exist under regular operating conditions around the side of the tank 202. As a first step to installing the gate valve 410, the flammable fluid 208 may be removed from the tank 202, as shown in FIG. 5B. The flammable fluid 208 may be reduced below the entrance formed by opening the lid 430 of the manway 212. For example, if the manway 212 is elevated 12 inches from the tank floor, the flammable fluid 208 may be reduced to a height of 11 inches or less within the tank 202. The reduction of the flammable fluid 208 below the manway 212 can expose the manway 212 to zone 0 areas. The zone 0 areas can refer to locations in which explosive or flammable gasses or vapors atmospheres are present continuously or for long periods of time or will frequently occur.

Referring to FIG. 5C, the lid 430 of the manway 212 may be removed subsequent to the removal of the flammable fluid 208 below the manway 212. The fume or vapor from inside the tank 202 may exit the manway 212 once the lid 430 is opened. In this instance, the area around the side of the tank 202 may be classified as a class 1, division 1 ("C1D1") hazardous location. The C1D1 classification refers to an area where explosive or flammable gases, vapors, or liquids can exist under regular operating conditions.

Referring to FIG. 5D, the gate valve 410 can be installed on the manway 212. The gate valve 410 may be installed on the manway 212 by bolting the gate valve 410 and the manway 212 together. The gate valve 410 can use one or more of a gasket, flange, bolts, or other tools for installation on the manway 212. A gate valve 410 can refer to a type of valve that can use a gate or wedge type disk. The gate or disk can move perpendicular to the flow of the flammable fluid 208 via a linear motion to start or stop the fluid flow. The gate valve 410 can be fully opened or fully closed. The gate valve 410 can control the flow rate of the flammable fluid 208. The gate valve 410 can be opened vertically, horizontally, or at any angles. The gate valve 410 may be closed initially, to prevent the flammable gases, vapors, or liquids from exiting the tank 202. The gate valve 410 may include a gate and a lid 430. The lid 430 of the gate valve 410 can provide additional blockage or obstruction to prevent substances or objects from leaving or entering the tank 202. Referring to FIG. 5E, the tank 202 may be refilled with the flammable fluid 208. The tank 202 may resume operation once filled with the flammable fluid 208.

In some implementations, the gate valve 410 can be an adapter or a bridge between the manway 212 and the launcher 420. The gate valve 410 may use the lid 430 of the manway 212 as a lid 430 for the gate valve 410. For example, the lid 430 of the manway 212 may be configured similar to the lid of the gate valve 410. In this case, the lid 430 of the manway 212 may be referred to as a manway gate. The gate valve 410 (i.e. adapter or bridge) may be installed on the manway gate. Accordingly, the manway lid may be configured as a lid of the gate valve 410.

In some implementations, the gate valve 410 may be installed during an out-of-service tank inspection. An out-of-service tank inspection can refer to an inspection where the flammable fluid 208 is emptied from the tank 202 prior to initiating the tank inspection procedures. For example, the tank 202 may be emptied of the flammable fluid 208 to perform an out-of-service tank inspection. The gate valve 410 may be installed prior, during, or after completing the tank inspection.

In some implementations, the gate valve 410 may be installed during the construction of the tank 202. For example, the tank 202 may be designed with the gate valve 410 as part of the manway 212. The gate valve 410 may be permanently fixed to the side of the tank 202. The gate valve 410 may not be permanently fixed to the tank 202. Instead, the gate valve 410 may be removable for maintenance and configuration.

The launcher 420 may be installed to the gate valve 410 similarly to the installation of the gate valve 410 to the manway 212. The launcher 420 can be installed immediately after the installation of the gate valve 410. For example, the launcher 420 may be prepared for installation during the installation of the gate valve 410.

In some implementations, the launcher 420 may be installed to the gate valve 410 prior to the gate valve 410 installation to the manway 212. In this case, the installation of the gate valve 410 to the manway 212 entails the installation of the launcher 420 to the manway 212. The gate valve 410 may be a part of the launcher 420, or the launcher 420 may be a part of the gate valve 410. The launcher 420 can be installed to the tank 202 after the gate valve 410 has been installed.

In some implementations, the launcher 420 may be installed to the gate valve 410 prior to deploying or launching the vehicle 101 for tank inspection. The launcher 420 may be removed subsequent to the vehicle 101 completion of the tank inspection. For example, the launcher 420 can be installed to the gate valve 410 to encapsulate the vehicle 101 inside the launcher 420 prior to executing the tank inspection procedures. The vehicle 101 may exit the launcher 420 and enter the tank 202 to perform tank inspection. The vehicle 101 may complete the tank inspection and return to the launcher 420. The gate valve 410 can close and the substance inside the launcher 420 can be drained. The launcher 420 may be disconnected and removed from the gate valve 410 subsequent to completing the tank inspection procedures.

In some implementations, the launcher 420 may be installed to the gate valve 410 permanently. For example, the launcher 420 can be installed prior to deploying the vehicle 101 for tank inspection. The vehicle 101 may complete or terminate the tank inspection procedures and exit the tank 202 into the launcher 420. Once the vehicle 101 is removed, the launcher 420 remains in place on the gate valve 410 for additional tank inspection procedures. In some cases, the launcher 420 may be a part of the tank design and construction.

Referring to FIGS. 6A-F, illustrations of an example system for launching a vehicle into a tank containing a flammable fluid are shown. The system 600 can include one or more components or functionalities of at least systems 100, 200, 300, and 400 depicted in FIGS. 1-4. First, referring to FIG. 6A, the vehicle 101 can be moved into the launcher 420. The vehicle 101 can be powered off. The gate valve 410 can remain closed during the process of loading the vehicle 101 into the launcher 420, as the lid 430 of the launcher 420 is open. The area around the launcher 420 are classified as C1D2, which is less hazardous than the area on the roof of the tank 202 classified as C1D1. The C1D1 hazardous classification may refer to an area above the flammable fluid 208 of the tank 202, such as at the vapor layer 206. Once the vehicle 101 is situated inside the launcher 420, the lid 430 can be installed on the launcher 420, as in FIG. 6B. The installation of the lid 430 can prevent substances or objects from entering or leaving the launcher 420.

The launcher 420 can include at least one vent 610 for ventilation. The vent 610 may be used to provide substance into the launcher, such as fluid, gas, or other substances, as in FIG. 6C. For example, the launcher 420 may be filled with fluid (e.g. water) through the vent 610 of the launcher 420. Once the fluid fills the launcher 420, the gate valve 410 may be opened to allow the flammable fluid 208 to enter the launcher 420, as in FIG. 6D. The fluid can provide an initial pressure inside the launcher 420 to avoid a sudden change in pressure, such as from atmospheric pressure contained inside the launcher 420 to the pressure at the bottom of the tank 202. The fluid can facilitate control over the flow of the flammable fluid 208 into the launcher 420. The flammable fluid 208 fills up the launcher 420 until the pressure in the launcher equalizes with the pressure at the bottom of the tank. The increase of the flammable fluid 208 in the launcher 420 can increase pressure inside the launcher 420. The fluid provided through the vent 610 can have a higher density than the flammable fluid 208. In this case, the flammable fluid 208 may rise or float above the fluid provided through the vent 610. Subsequently, as the flammable fluid 208 fill the launcher 420, the fluid may flow below the flammable fluid 208 and enter the tank 202, as in FIG. 6E. The pressure build-up inside the launcher 420 from increase in the flammable fluid 208 can power on the vehicle 101. The vehicle 101 may initiate tank inspection procedures in response to being powered on. The vehicle 101 may enter the tank 202 through the gate valve 410 and the manway 212, as in FIG. 6F.

The vent 610 may be different types and styles. For example, the vent 610 can be a box vent, a power vent, a ridge vent, an off ridge vent, a cupola vent, or a soffit vent. The vent 610 may be opened or closed based on the type and style of the vent 610. The vent 610 can include multiple doors, lids, or hood, such that opening a first door closes a second door of the vent 610, and closing the first door opens the second door of the vent 610. For example, the first door of the vent 610 may be exposed outside the launcher 420. The second door of the vent 610 may be located between the first door and the interior of the launcher 420. In this case, substances and objects may not enter the launcher 420 directly without closing the first door of the vent 610, such as to open the second door of the vent 610 for passing the substances and objects into the launcher 420.

In some implementations, the launcher 420 may not include a vent 610 for ventilation or providing substances into the launcher 420. For example, the fluid as shown in FIG. 6C may not be provided to the launcher 420. Instead, the gate valve 410 may proceed to open. The flammable fluid 208 may flow into the launcher 420 subsequent to opening the gate valve 410.

In some implementations, the vehicle 101 may be powered on prior to transferring the vehicle into the launcher 420. The vehicle 101 can move into the launcher 420 without external assistance. In some other implementations, the vehicle 101 can power on in response to installing the lid 430. The vehicle 101 can use one or more sensors 116 to detect the opening of the gate valve 410. The vehicle 101 can initiate tank inspection procedures in response to the gate valve 410 opening. The vehicle 101 may move out the launcher 420 using at least one propeller 118, wheel, or both.

Referring to FIGS. 7A-I, illustrations of an example system for recovering the vehicle from the tank containing a flammable fluid are shown. The system 700 can include one or more components or functionalities of at least systems 100, 200, 300, and 400 depicted in FIGS. 1-4. The launcher 420 can include a drainer 710 to remove substances from the launcher 420. The vehicle 101 can return to the launcher 420 from the tank 202 through the manway 212 and the gate valve 410. The vehicle 101 may return to the launcher 420 in response to completing the tank inspection, a timeout, or a wireless communications message to terminate the tank inspection procedures. The gate valve 410 can close the gate once the vehicle 101 passes the gate valve 410. The drainer 710 may be opened to remove the flammable fluid 208 from the launcher 420. While the flammable fluid 208 is being drained, the pressure inside the launcher 420 can decrease. The vehicle 101 can turn off in response to a pressure threshold, as in FIG. 7C. For example, the pressure threshold may be set to 5 PSI above atmospheric pressure. The launcher 420 containing a flammable fluid 208 may include a pressure measurement of 30 PSI. While the launcher 420 is being drained, the pressure drops below 5 PSI. In response to the pressure drop, the vehicle 101 can power off. The drained or removed flammable fluid 208 from the launcher 420 may be refilled into the tank 202.

For example, the vehicle 101 can include a pressure switch 140. The vehicle 101 can be inserted into an empty launcher in an off state. After the vehicle 101 is inserted in the launcher and the lid 430 of the launcher is closed and the gate valve is opened, the flammable fluid can fill the launcher and increase the pressure in the launcher. The pressure switch 140 can detect that the pressure has increased above a threshold. Responsive to detecting the pressure has increased above the threshold, the pressure switch 140 can trigger and turn on the vehicle 101 or otherwise provide power to the vehicle 101 or provide an indication to the vehicle 101 to begin a tank inspection process. The vehicle 101, responsive to the pressure switch 140 triggering, can turn on the propellers 118 and navigate towards the tank. Thereafter, the vehicle 101 can return to the launcher and navigate beyond the gate valve location. The gate valve can be closed and the fluid contents of the launcher can be drained. The pressure switch 140 can detect a drop or decrease in the pressure below the threshold. Responsive to detecting the drop in pressure below the threshold, the pressure switch 140 can shut off the vehicle 101 or otherwise power off the vehicle 101. Thus, the vehicle 101 can use the pressure switch 140 to turn or off based on the pressure in the launcher being above or below a threshold.

In some implementations, the vehicle 101 can power off in response to the gate valve 410 closing. For example, the vehicle 101 can use one or more sensors 116 to detect the closing of the gate valve 410. The vehicle 101 can detect a movement from the gate of the gate valve 410, such that the opening through the gate valve 410 is reducing in diameter. The vehicle 101 can power off in response to the gate valve 410 closing off the entrance to the manway 212.

Figure 7E:
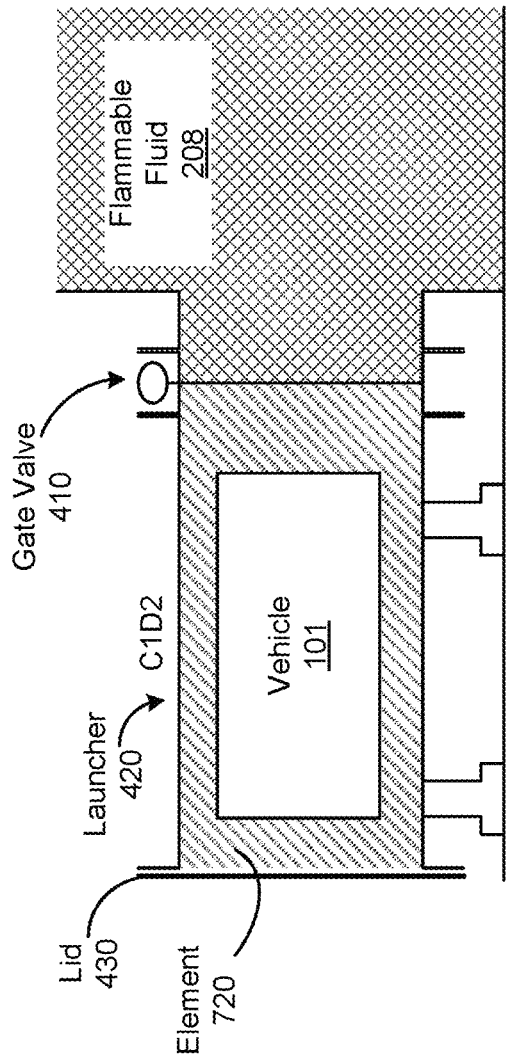

Still referring to FIGS. 7A-I, the vent 610 can be opened in the launcher 420 to provide element 720 to facilitate removal of the flammable fluid 208, as in FIG. 7D. The element 720 may be referred to as a substance. The element 720 may prevent flammable vapors build up from the flammable fluid inside the launcher 420. For example, the vent 610 can open in the launcher 420. The launcher 420 may be filled with nitrogen through the vent 610. The launcher 420 may be filled with nitrogen concurrent to removing the flammable fluid 208 through the drainer 710. The drainer 710 can close subsequent to removing the flammable fluid 208 from the launcher 420. The launcher 420 may be filled with element 720 instead of the flammable fluid 208 or its flammable vapors, as in FIG. 7E.

Figure 7F:
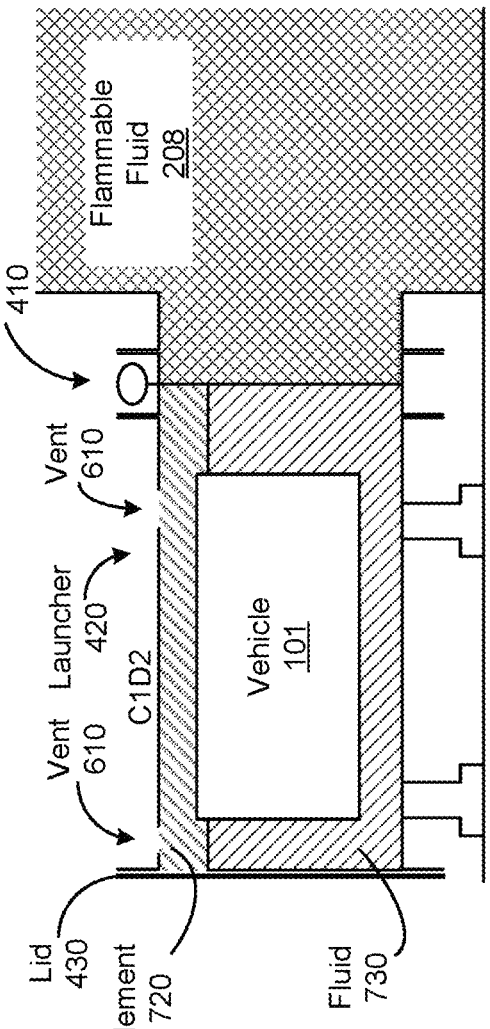
Figure 8A:
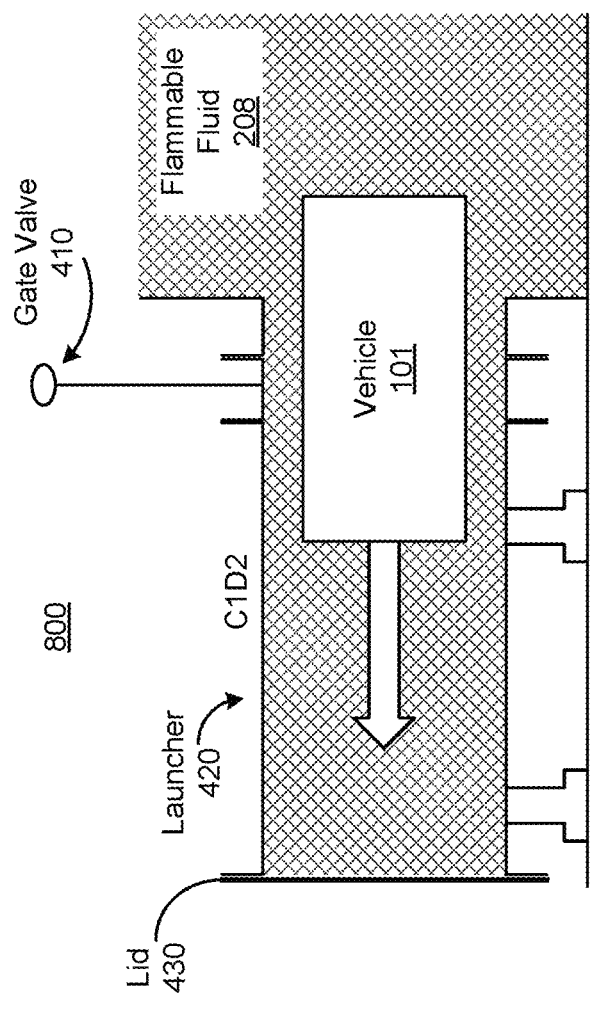
Figure 8B:
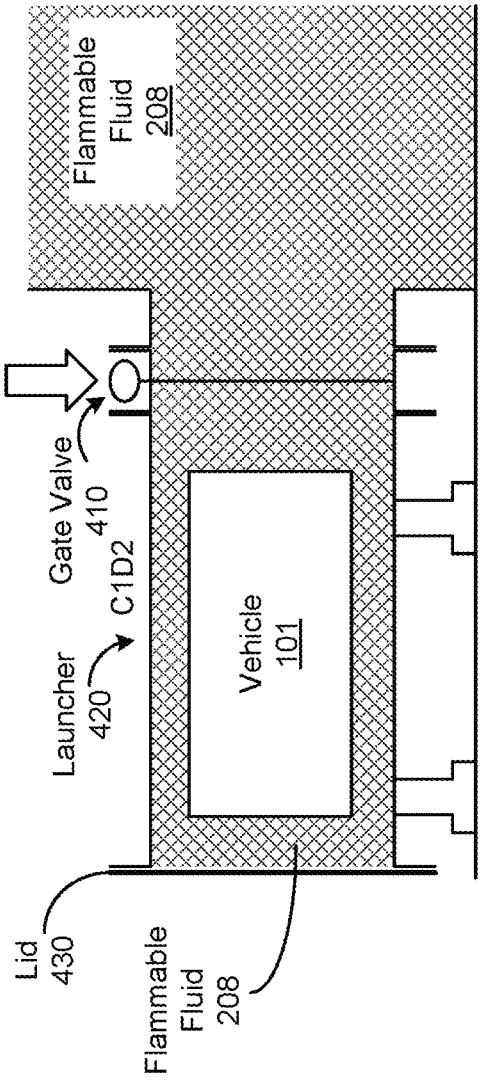
Figure 8C:
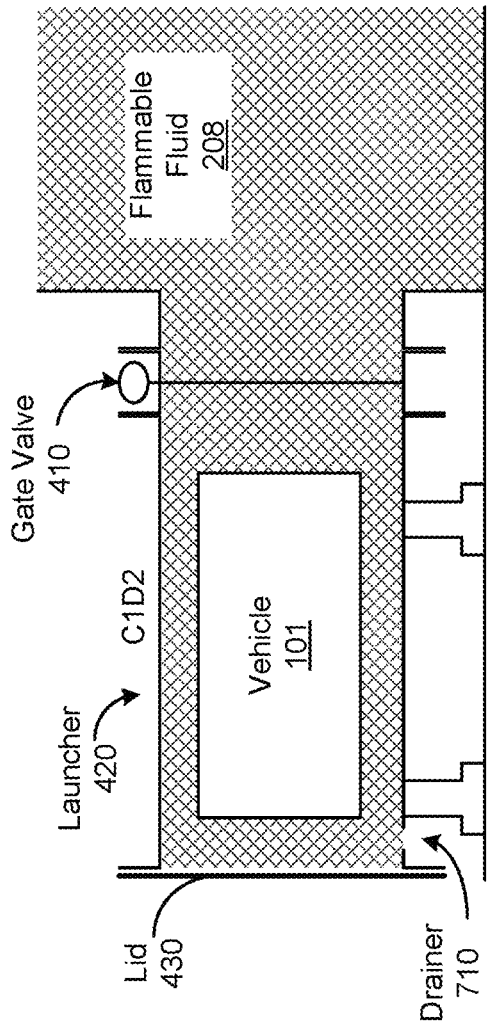
Figure 8D:
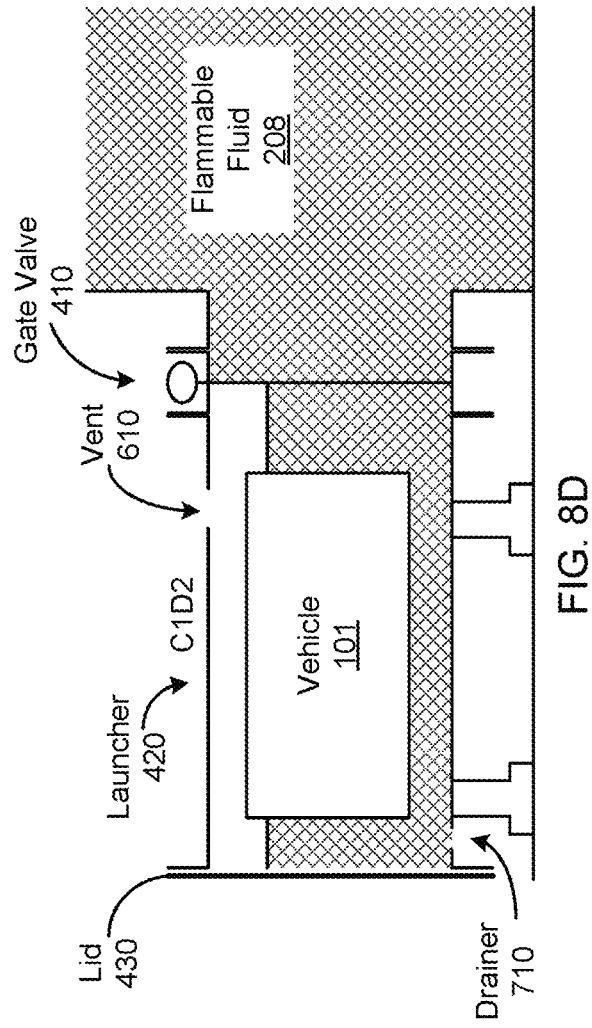

The vent 610 can be opened to provide fluid 730 into the launcher 420, as in FIG. 7F. The drainer 710 can be opened to remove the element 720 and the fluid 730 from the launcher 420, as in FIG. 7G. For example, the fluid 730 may be a cleaning agent for removing the flammable fluid 208 from inside the launcher 420 and the vehicle 101. The fluid 730 can occupy the launcher 420, cleaning the launcher 420 and the vehicle 101. The drainer 710 can open to remove the fluid 730 from the launcher 420 following the cleaned launcher 420 and vehicle 101. The drainer 710 and the vent 610 may be closed once the element 720 and the fluid 730 are removed.

Referring to FIG. 7H, the lid 430 can be removed from the launcher 420 subsequent to substances drained from the launcher 420. Once the lid 430 is removed, the vehicle 101 may be removed from the launcher 420, as in FIG. 7I. The removal of the vehicle 101 from the launcher 420 may indicate the completion of the tank inspection process.

In some implementations, the vehicle 101 may not be turned off prior to moving out the launcher 420. For example, the vehicle 101 may remain turned on during the process of draining substances from the launcher 420. The vehicle 101 may detect that the lid 430 is opened and exit the launcher 420 without assistance. The vehicle 101 may use one or more wheels or other movement mechanism to move out the launcher 420. The vehicle 101 may power off in response to exiting the launcher 420.

Referring to FIGS. 8A-G, illustrations of an example system for recovering the vehicle from the tank containing a flammable fluid are shown. The system 800 can include one or more components or functionalities of at least systems 100, 200, 300, and 400 depicted in FIGS. 1-4. The system 800 can illustrate a vehicle 101 recovering procedures without cleaning the launcher 420 and the vehicle 101. The vehicle 101 may enter the launcher 420 after completing the tank inspection. In some cases, the vehicle 101 may enter the launcher 420 due to receiving a termination trigger, a timeout, an indication of an error, a wireless communications message. The gate valve 410 may close once the vehicle 101 is situated inside the launcher 420.

Still referring to FIGS. 8A-G, the drainer 710 can open to remove the flammable fluid 208 from the launcher 420. The vent 610 can open to facilitate the removal of the flammable fluid 208. The removal of the flammable fluid 208 can reduce the pressure inside the launcher 420. The vehicle 101 can detect the reduction in pressure. The vehicle 101 can power off in response to a pressure threshold. The launcher 420 can be emptied of the flammable fluid 208. The vent 610 and the drainer 710 can be closed. The lid 430 can open subsequent to the removal of the flammable fluid 208. The vehicle 101 can be removed from the launcher 420 after the lid 430 is removed.

In some implementations, the vent 610 can be configured to couple with an external device. For example, the vent 610 can couple to an air blower, a vacuum machine, or a pump. In further example, the vent 610 can couple to the external device to facilitate removal of the flammable fluid 208 through the drainer 710 of the launcher 420, such as by air drying the interior of the launcher 420 using the air blower.

Figure 9:
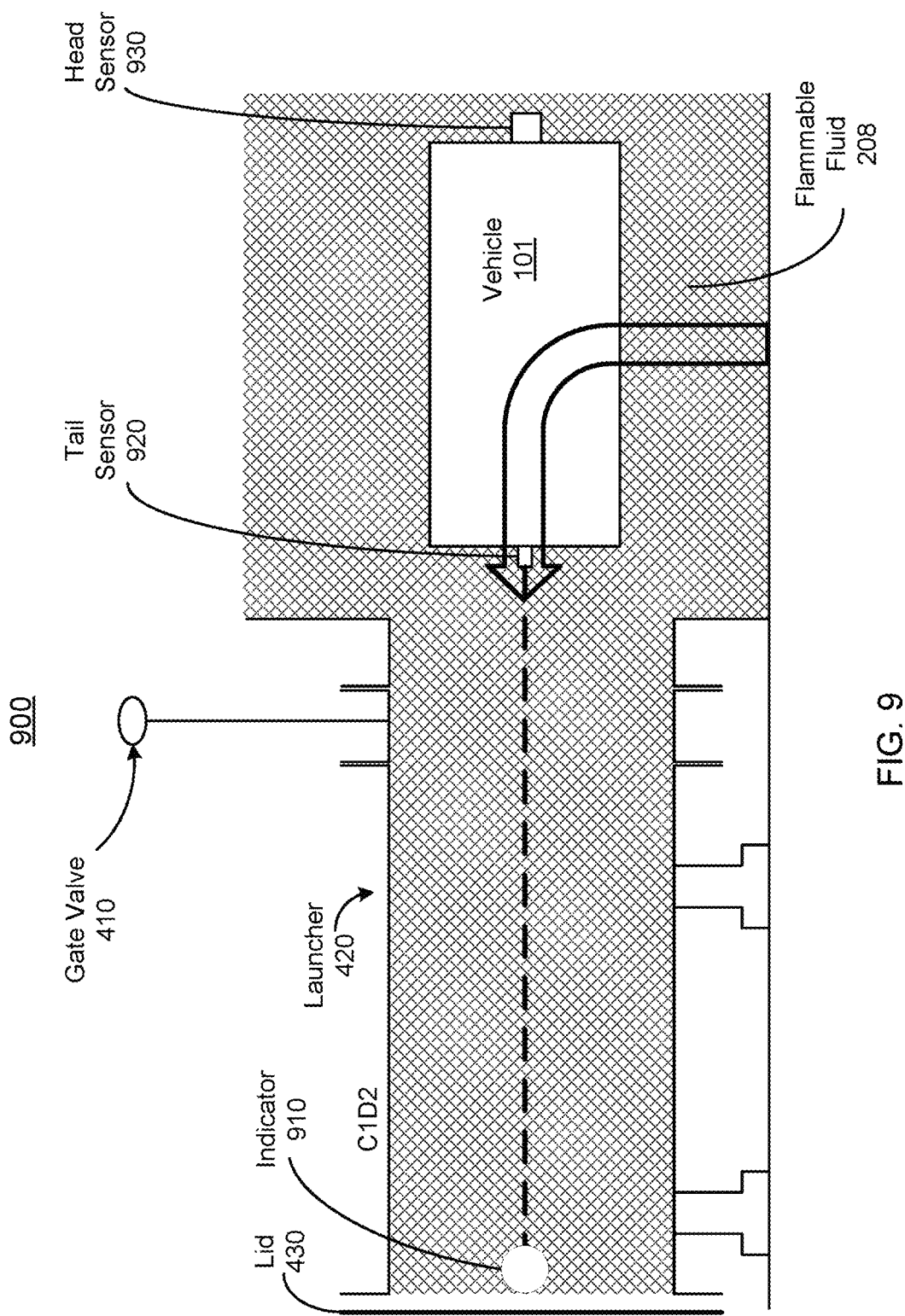
FIG. 9 is an example illustration of a system for recovering the vehicle from the tank containing a flammable fluid, in accordance with some implementations.

Referring to FIG. 9, an illustration of an example system for recovering the vehicle from the tank containing a flammable fluid is shown. The system 900 can include one or more components or functionalities of at least systems 100, 200, 300, and 400 depicted in FIGS. 1-4. The system 900 can include an indicator 910 situated inside the lid 430 of the launcher 420. The indicator 910 can be a light source, an acoustic source, or other indicator to guide the vehicle 101 into the launcher 420. The vehicle 101 can include a tail sensor 920 and a head sensor 930 for navigation into the launcher 420. The tail sensor 920 can refer to a first sensor, and a head sensor 930 can refer to a second sensor. The tail sensor 920 and the head sensor 930 may be interchangeable.

The tail sensor 920 can include a light sensor, an acoustic sensor, or other sensor configured to sense the indicator 910. The head sensor 930 can include a doppler velocity log ("DVL") to measure the velocity and distance of the vehicle 101 with respect to the floor of the tank 202. DVL velocity measurements combined with heading measurements from a heading sensor 116 can be used to calculate position. For example, the vehicle 101 may initiate an exit instruction to move into the launcher 420. The vehicle 101 may initiate the exit instruction while on the floor or elevated in the tank 202. The tail sensor 920 can detect the indicator 910 located inside the launcher 420. The vehicle 101 can move to a position based on the indicator 910. The position can be at an elevation equal to the center of the manway 212. This position can be held using the position derived from the head sensor 930 and heading sensor 116. Elevation can be maintained based on the distance to the floor measured by the DVL. The vehicle 101 can align itself with the launcher. The vehicle 101 can move towards the launcher 420 subsequent to being aligned with the center of the manway 212. The vehicle 101 can move in reverse to exit the tank 202 and into the launcher 420, such that the tail of the vehicle 101 faces the lid 430. In some cases, the vehicle 101 can move headfirst into the launcher 420, such that the head of the vehicle 101 faces the lid 430.

The vehicle 101 can relocate to identify the indicator 910. For example, the vehicle 101 may float from the tank floor to locate the indicator 910. The vehicle 101 may sink down to locate the indicator 910. The vehicle 101 may rotate in various degrees for the tail sensor 920 to locate the indicator 910. In some implementations, the vehicle 101 may include additional sensors, similar to the tail sensor 920, to locate and identify the indicator 910. The additional sensors may be embedded or coupled to the body of the vehicle 101, such as the front, the back, the bottom, the top, and the sides of the vehicle 101, for example.

In some implementations, the vehicle 101 may include a maximum velocity for entering the launcher 420. For example, the vehicle 101 may not exceed 5 cm per second ("cm/s") when entering the launcher 420, for safety and stability of the vehicle 101 and tank 202. The head sensor 930 may be used to determine the velocity of the vehicle 101. The rotation of the propeller 118 of the vehicle 101 may decrease when the velocity approaches the set maximum of 5 cm/s. Once the maximum is exceeded, the vehicle 101 may instruct the propeller 118 rotate in reverse to decrease the velocity.

The indicator 910 may be powered on during the tank inspection operation. In some implementations, the indicator 910 may be powered on when a termination request is provided to the vehicle 101 or when the vehicle 101 completed the tank inspection procedures. The vehicle 101 may interact with the indicator 910 via wireless connection to turn on the indicator 910 in response to executing exit instructions.

One or more indicators 910 can be within the launcher 420, located where the launcher 420 meets the tank 220, or otherwise located in the system 900 to facilitate directing the vehicle 101 to or from the launcher. In some implementations, the indicator 910 may be situated in other location, such as above the manway 212 or in the gate valve 410. For example, the indicator 910 may be installed around the edge of the manway 212 to indicate an exit hole. In another example, the indicator 910 may be installed linearly along the bottom of the manway 212, the gate valve 410, and the launcher 420 to indicate an exit path. The vehicle 101 can may navigate out of the tank 202 using the exit hole or the exit path by following the indicator 910, for example.

In some implementations, the indicator 910 may not be installed. Instead, the vehicle 101 can include the indicator 910. For example, the vehicle 101 can include a light source to emit light inside the tank 202. The vehicle 101 can use an imaging sensor to identify the location of the manway 212. Subsequently, the vehicle 101 can position at the center of the manway 212 and move towards the launcher 420.

Figure 10:
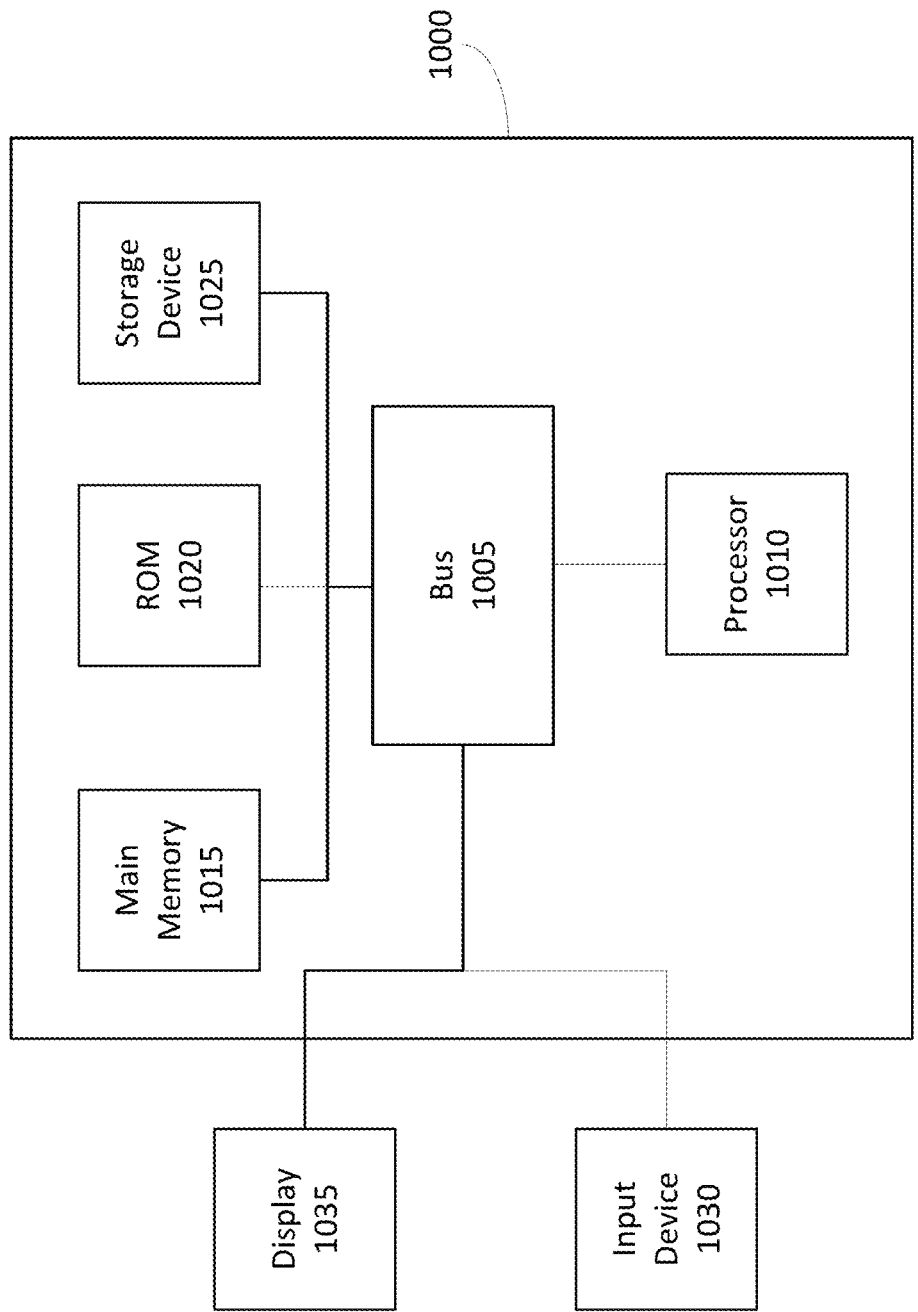
FIG. 10 is a block diagram illustrating an architecture for a computer system that can be employed to implement elements of the systems, methods and apparatus described and illustrated herein, including, for example, the systems, apparatus, and methods depicted in FIGS. 1-9.

FIG. 10 is a block diagram of an example computer system 1000. The computer system or computing device 1000 can include or be used to implement one or more component of system 100, 200, or 300, or perform one or more aspect of the system 400, 500, 600, 700, 800, or 900. For example, the system 1000 can implement one or more component or functionality of the ATIS 102, the data processing system 302, the vehicle, or the administrator device 322. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015. The main memory 1015 can also be used for storing one or more of a propeller control program, tank map, collected data, tank inspection process, quality metric, diagnostic program, or other information. The computing system 1000 may include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions. The storage device 1025 can include or be part of the vehicle resource repository 126.

The computing system 1000 may be coupled via the bus 1005 to a display 1035, such as a liquid crystal display, or active matrix display, for displaying information to a user of the administrator device 322. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035. The display 1035 (e.g., on a vehicle dashboard) can, for example, be part of the ATIS 102, vehicle, data processing system 302, administrator device 322, or other component depicted herein.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components, such as components of the control unit 104, which illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

Figure 11:
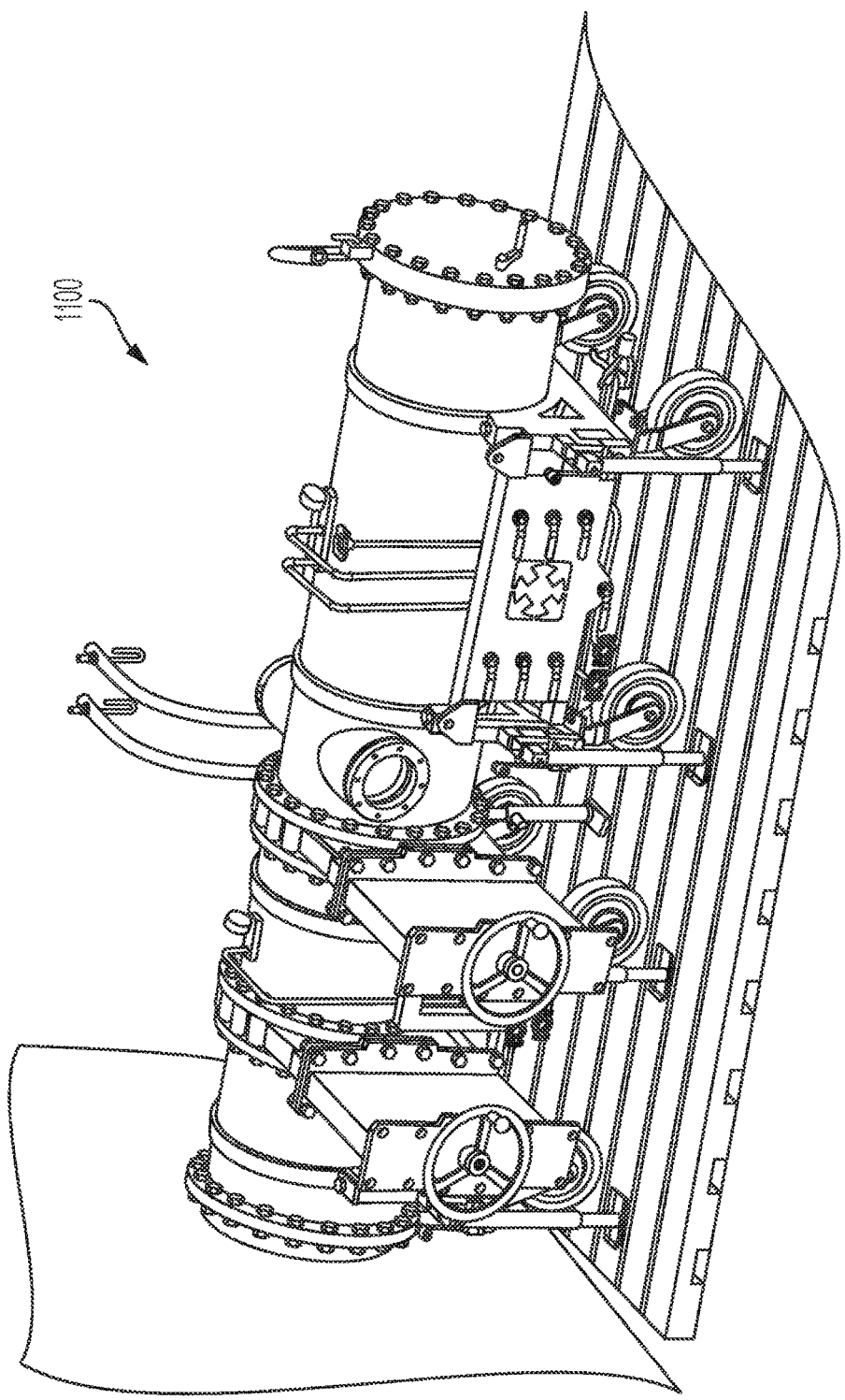
FIG. 11 is an example illustration of a side launcher system, in accordance with some implementations.

Referring to FIG. 11, an example illustration of a side launcher system 1100, in accordance with some implementations, is shown. The side launcher system 1100 can include one or more components or compartments to deploy a robot (e.g., vehicle 101) into the tank via manway entry. The side launcher system 1100 can include a manway located at the side of the tank, a manway adapter, and a launcher. The manway adapter can be installed on or attached to the manway. The manway adapter can be uninstalled from the manway. The side launcher can be attached to the manway adapter. The side launcher can be uninstalled from the manway adapter. Each of the one or more components can include a lid. The side launcher system 1100 can be environment-agnostic. Accordingly, by utilizing the side launcher system 1100, the barrier of entry for in-service inspections can be removed. The features, functionalities, and components of the side launcher system 1100 can be described in further detail herein.

Figure 12A:
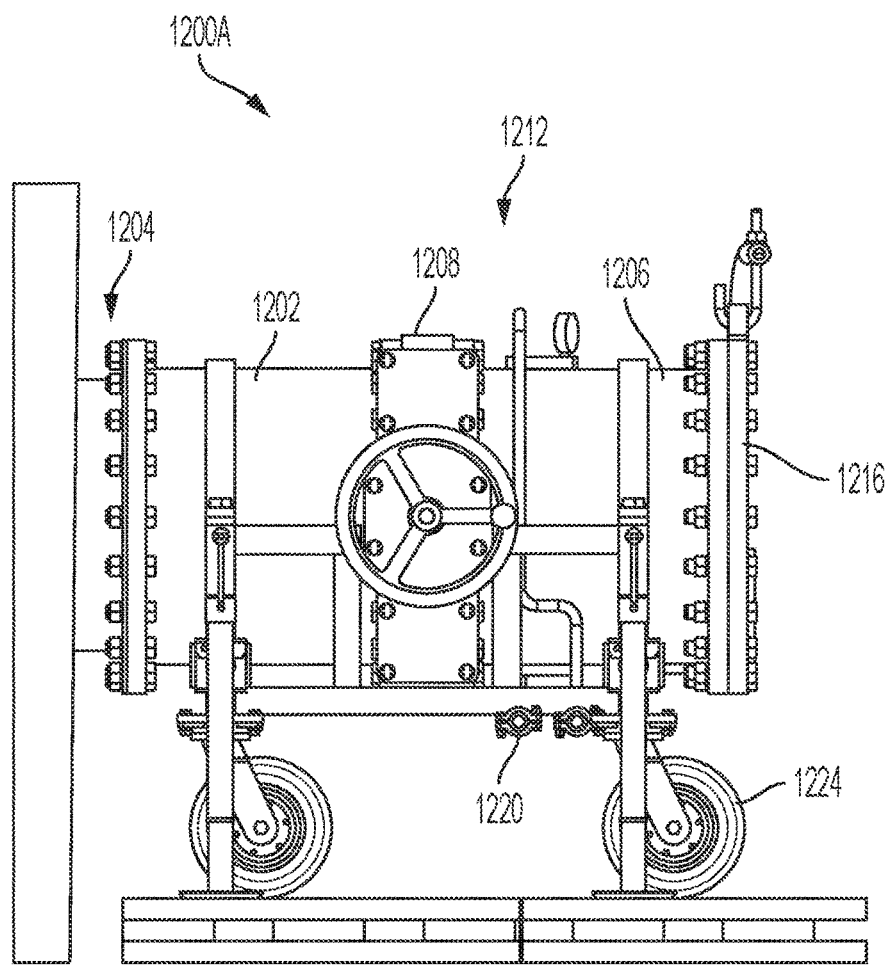
FIG. 12A is an example illustration of a manway adapter, in accordance with some implementations.
Figure 12B:
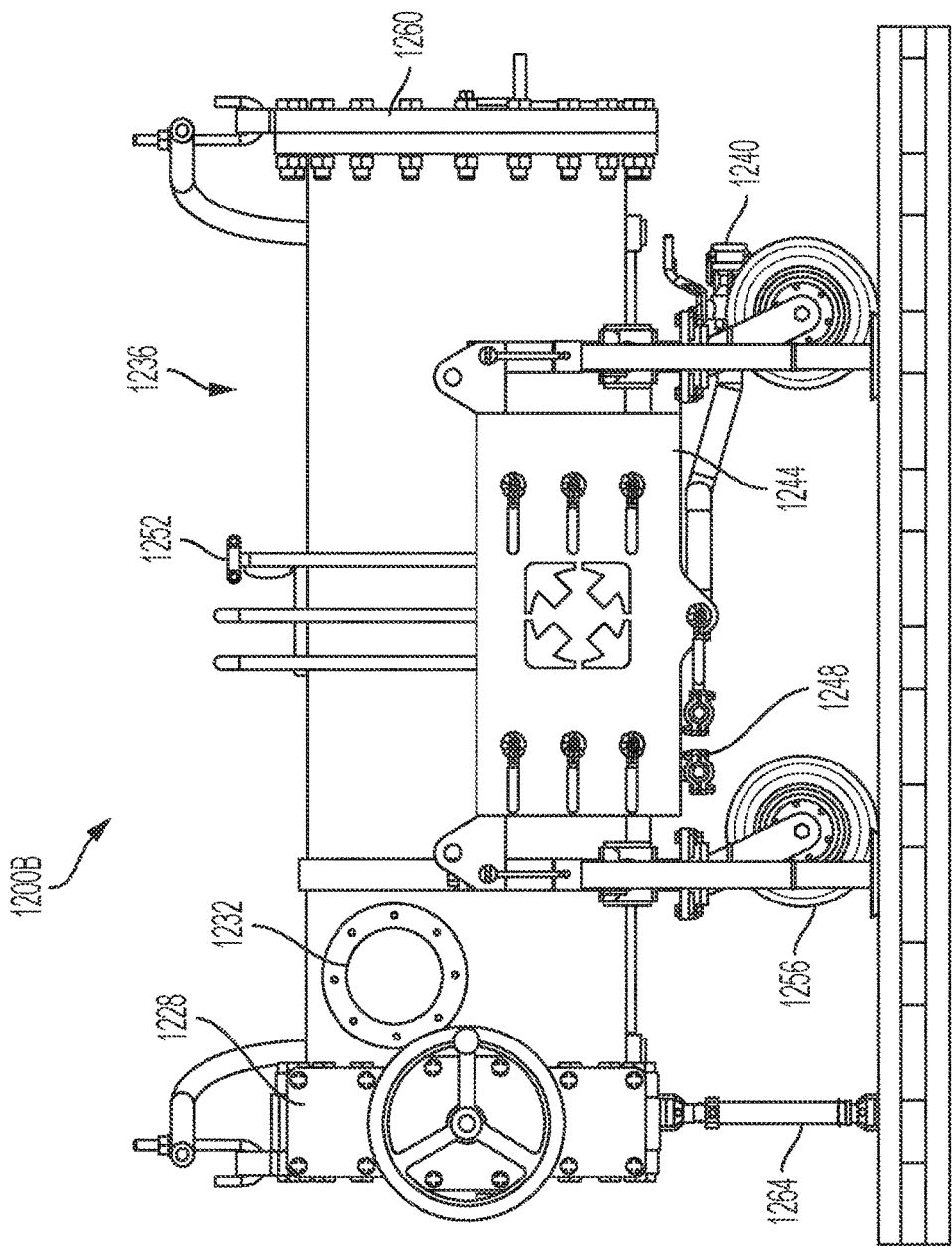
FIG. 12B is an example illustration of a launcher, in accordance with some implementations.

Referring to FIGS. 12A-B, example illustrations 1200A-B of a manway adapter and a side launcher, in accordance with some implementations, are shown. The example illustrations 1200A-B can include one or more subassemblies, such as the manway adapter 1212 and a launcher 1236. Referring to FIG. 12A, in greater detail, the example illustration 1200A can include a manway adapter 1212 and the manway 1204 located at a side of the tank. The manway adapter 1212 can provide an interface between the launcher 1236 and the tank. The manway adapter 1212 can be installed on a tank (e.g., attached to the manway 1204 or shell manway) prior to installing the launcher 1236. The manway adapter 1212 can be installed on the tank while the flammable fluid (e.g., flammable fluid 208) is below the level of the manway 1204. For example, the flammable fluid can be below the manway 1204, such that there is no leakage when opening the lid of the manway 1204. The tank can be filled to capacity (e.g., above the level of the manway 1204) after the manway 1204 is installed.

The manway adapter 1212 can be assembled with one or more components including a tank interface pipe 1202, a gate valve 1208 (e.g., primary gate valve), a launcher interface pipe 1206, one or more valves 1220 for drainage or venting, and a cap 1216 (e.g., blind/blank flange end cap). The tank interface pipe 1202 can be adjusted for various manway geometries, such as to attach the manway adapter 1212 to the manway 1204. The tank interface pipe 1202 can be swapped out or fitted with adapters to couple and seal with the manway 1204. The gate valve 1208 can be connected to a lever or a steering wheel for opening and closing the valve 1208. The gate valve 1208 can be operated manually. The valve 1208 can be connected to one or more hardware components in communication with a software component (e.g., an application), such as to open or close the valve 1208. The operator can control the application to open or close the valve 1208. The gate valve 1208 and the cap 1216 can act as seals for the manway adapter 1212 to prevent leakage.

The launcher interface pipe 1206 can interface with a launcher 1236. The launcher interface pipe 1206 can provide an airlock space during operations. The launcher interface pipe 1206 can include multiple ports, such as on the top and on the bottom of the pipe 1206. The bottom port, such as the drain 1220, can be used for draining the system after operations. The top port can be used for venting or purging the system with inert gas. The top port and the bottom port can refer to the one or more valves 1220. The manway adapter 1212 can include a removable cap 1216. The cap 1216 can protect the sealing surfaces of the launcher interface pipe 1206. The cap 1216 can provide an additional seal to the manway adapter 1212 and the tank prior to installing the launcher 1236.

The manway adapter 1212 can include or be installed with one or more wheels 1224, such as for moving the manway adapter 1212 for installation. The wheels 1224 can provide elevation to the manway adapter 1212. The manway adapter 1212 can include one or more additional components to facilitate in-service tank inspection.

Referring now to FIG. 12B, in greater detail, an example illustration 1200B of a launcher 1236 (e.g., side launcher, vehicle launcher, or device launcher) is shown. The launcher 1236 can be configured to attach to the manway adapter 1212. The launcher 1236 can be assembled with one or more components and equipment to facilitate a safe launch and recovery of an in-service inspection robot (e.g., vehicle 101). The launcher 1236 can include a gate valve 1228 (e.g., secondary gate valve) a glass 1232, a drain valve 1240, a valve control assembly 1244, one or more connection ports 1248, a vent 1252, and one or more wheels 1256. The launcher 1236 can be referred to as a vehicle capsule, such as to encapsulate a vehicle prior to or after the in-service tank inspection.

The valve 1228 can be an interface between the manway adapter 1212 and the launcher 1236. The valve 1228 can enable the launcher interface pipe 1206 and the launcher 1236 to be inerted, filled, or drained separately. The valve 1228 can be an airlock for containing fluids within the launcher 1236 and the launcher interface pipe 1206, for example. The valve 1228 can prevent leakage. The valve 1228 can remove the risk of emissions of gas or vapor from the tank. The launcher 1236 can include a brace 1264 beneath the valve 1228 to provide structural support for the launcher 1236, for example, after attaching to the manway 1212.

The launcher 1236 can be a sealed pressure vessel composed of a pipe with flanges at both ends. The launcher 1236 can house a robot during loading, launch, and recovery operations. The launcher 1236 can include multiple ports, for example, three ports. For example, the launcher 1236 can include two ports at the top of the launcher 1236 for purging with inert gas or for venting the launcher 1236, such as vent 1252. The launcher 1236 can include a third port located at the bottom of the launcher 1236 for draining the internal pressure vessel of fluid, such as system drain valve and coupling 1240. The flow of product (e.g., flammable fluid or other liquid) and gas can be controlled by the valves on the valve control assembly 1244. The valve control assembly 1244 can include gauges and level indicators for a visual representation of the status of the manway adapter 1212 and the launcher 1236. An operator can monitor the status of the manway adapter 1212 and the launcher 1236 using the valve control assembly 1244. The connection port 1248 can be connected to the drain/vent pipe 1220 of the manway adapter 1212, for example, to control the flow of the product. The cap 1260 at the end of the launcher 1236 can be used to seal the pressure vessel during operations.

Figure 13:
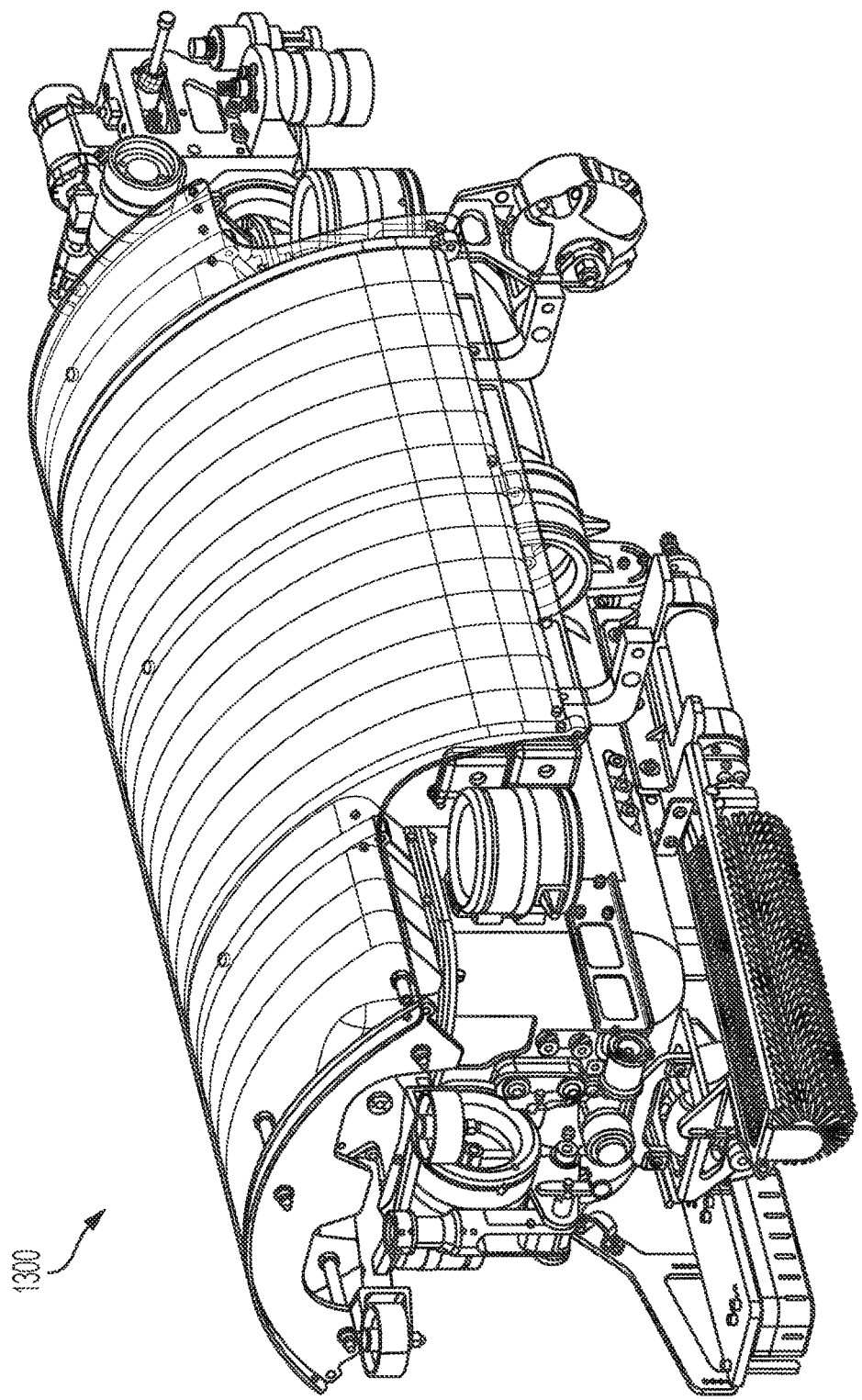
FIG. 13 is an example illustration of an inspection robot, in accordance with some implementations.

Referring to FIG. 13, an example illustration of an inspection robot 1300, in accordance with some implementations, is shown. The inspection robot 1300 can be referred to as an in-service tank inspection robot, an autonomous tank inspection vehicle, or an inspection device. The robot 1300 can include features, functionalities, hardware components, and software components similar to the vehicle 101. For example, the robot 1300 can be equipped with two 1080p cameras, Pulsed Eddy Current Sensors ("PECS") or Phased Array Ultrasonic Sensors ("PAUS") to support non-destructive testing ("NDT") inspections, such as in accordance with API 653 standards. The robot 1300 can gather high-resolution data of the tank floor, annular plate, or shell wall of the tank (e.g., Aboveground Storage Tanks ("AST")). The robot 1300 can inspect tanks filled with water, diesel, distillate, or products. The robot 1300 can be certified for use in Class 1, Division 2, Group D Hazardous Locations. The robot 1300 can be configured to accommodate a variety of payloads and mission profiles to support any type of tank inspection. The robot 1300 can minimize the logistics involved with operations on-site.

The robot 1300 can autonomously execute tank inspection procedures, such as performing navigation initialization and calibration, executing trackline surveys in contact with tank floor, executing an annular plate survey, or executing visual inspection surveys at altitude, determined based on the areas to be inspected. The status and data collected by the robot 1300 can be received in real-time and stored on a storage device. The robot 1300 can be operated or monitored by a remote computing system. The remote computing system can be operated by an operator. The robot 1300 can be launched the side launcher system 1100. The robot 1300 can be installed in the launcher 1236 for deployment (e.g., manually or by a machine configured to install the robot 1300). The robot 1300 can be recovered from the launcher 1236 manually or by a machine configured to recover the robot 1300.

Upon completion of a tank inspection procedures, the robot 1300 can autonomously dock at the launcher 1236 for recovery by moving through the manway 1204. The robot 1300 can be powered down by an operator remotely controlling the robot 1300. The robot 1300 can autonomously power off, for example, once the launcher 1236 pressure is equalized with the atmosphere within the side launcher system 1100. The robot 1300 can be mobilized to perform multiple tank surveys. The robot 1300 can be serviced and cleaned after recovered from the tank, such as at an off-site maintenance facility.

The robot 1300 can be certified for use in Class I, Division 2, Group D, T6, or unclassified locations by FM Approvals, among others. The robot 1300 can be configured to operate under different environmental conditions. For example, the robot 1300 can operate at an operating temperature between 0° C. to 35° C. (32° F. to 95° F.). The robot 1300 can operate in a tank with a storage temperature between −10° C. to 60° C. (14° F. to 140° F.). The robot 1300 can operate at an operating depth of at least 27.4 meters (90 ft) in fluid (Pabs=370 kPa, Pgauge=269 kPa). The robot 1300 can operate in fluid density between 810 kg/m3 to 1000 kg/m3 (6.8 lbs/gal to 8.3 lbs/gal). The robot 1300 can operate at different specific gravity (e.g., relative density), such as between 0.81 to 1. The robot 1300 can be operated in different fluids, such as Water, Diesel, Jet, Kerosene, Similar Distillates. The robot 1300 may not be limited to the aforementioned operating conditions. For example, the robot 1300 can operate at a higher or lower operating temperature, storage temperature, depth, fluid density, among others.

In further example, the robot 1300 can weigh less than or equal to 120 kg while dry. The wet weight of the robot 1300 can be between −10 kg and −4 kg. The dimension of the robot 1300 can be 1.277 m×0.543 m×0.500 m, for example. The specification of the robot 1300 can be less than or greater than the specification mentioned above, and can be configured for inspecting different tanks.

Figure 14:
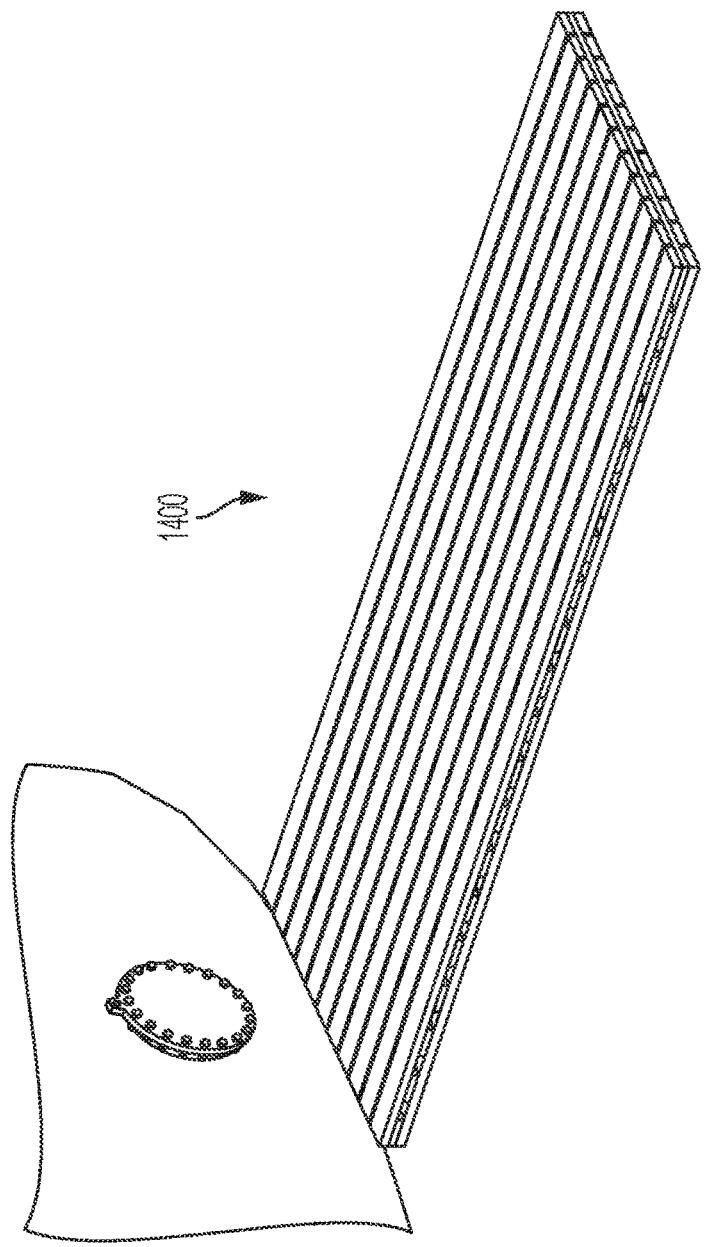
FIG. 14 is an example illustration of a mat for installing the side launcher system, in accordance with some implementations.

Referring to FIG. 14, an example illustration of a mat 1400 for installing the side launcher system 1110, in accordance with some implementations, is shown. The mat 1400 can be placed in front of the manway 1204. The mat 1400 can support the elevation of the manway adapter 1212 for installation on the tank. The mat 1400 can support the elevation of the launcher 1236 for installation on the manway adapter 1212. The mat 1400 can be constructed with materials that can support the weight of the manway adapter 1212 and the launcher 1236, such as timber. The mat 1400 can be a flat surface or approximately leveled at all portions of the mat 1400.

Figure 15B:
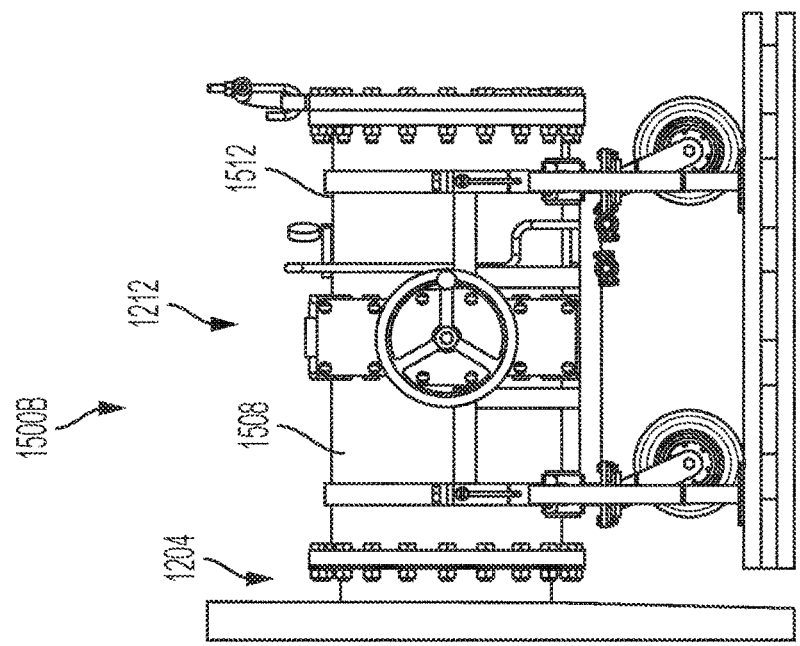
FIGS. 15A-C are example illustrations of a system for installing a manway adapter, in accordance with some implementations.
Figure 15A:
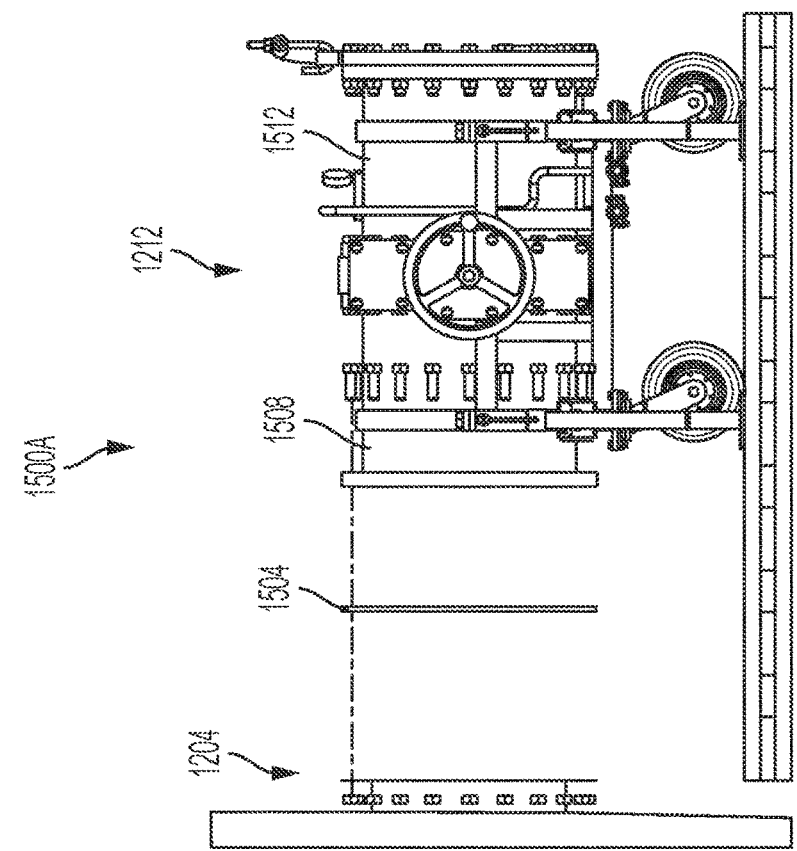
Figure 15C:
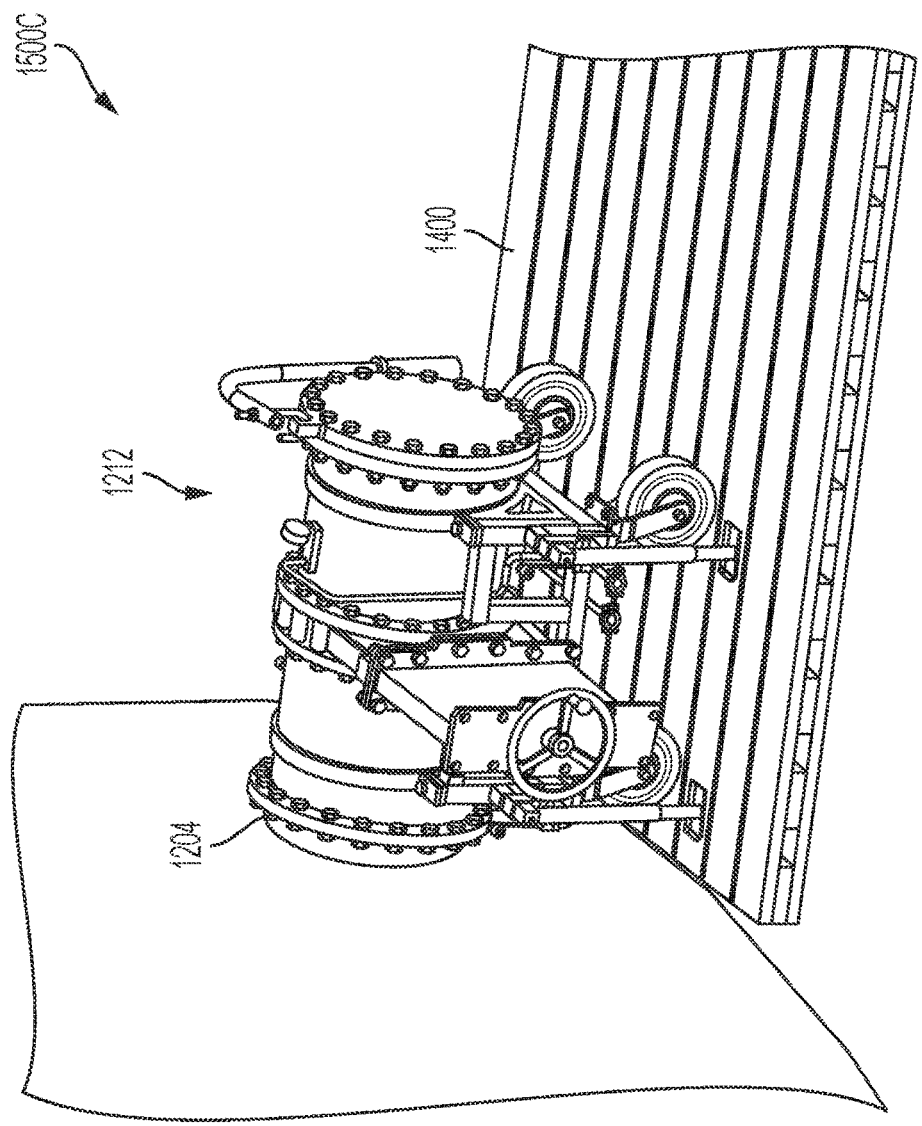

Referring to FIGS. 15A-C, example illustrations 1500A-C of a system for installing a manway adapter 1212, in accordance with some implementations, are shown. The manway adapter 1212 can be placed on the 1400 and wheeled into position (e.g., up to the manway 1204). The manway 1204 can include a cap 1504 (e.g., blank flange). The cap 1504 can be removed from the manway 1204. Once the cap 1504 is removed, the manway adapter 1212 can be moved into position, aligned, or mated to the manway 1204. The height of the manway adapter 1212 can be adjustable to support the alignment with the manway 1204. For example, the tank interface pipe 1508 (e.g., similar to the tank interface pipe 1202) can be in contact with the manway 1204. The manway adapter 1212 can be attached to the manway 1204, for example, by bolting the tank interface pipe 1508 to the manway 1204. The gasket between the manway 1204 and the manway adapter 1212 can be installed with equal compression to provide a proper seal between the two components. The tank interface pipe 1508 can be referred to as the first section of the manway adapter 1212. The launcher interface pipe 1512 (e.g., similar to the launcher interface pipe 1206) can be referred to as the second section of the manway adapter 1212. For example, the first section and the second section of the manway adapter 1212 can be separated or blocked by the gate valve 1208.

The manway adapter 1212 can be disconnected from the manway 1204. For example, the manway adapter 1212 can stay capped and connected to the shell manway until the product (e.g., fluid) can be lowered below the level of the manway 1204. The manway adapter 1212 can be disconnected from the tank after the product is below the level of the manway 1204. The manway 1204 can be reinstalled with the cap 1504 upon removal of the manway adapter 1212. To disconnect the manway adapter 1212 from the manway 1204, the bolt or locking mechanisms connecting the manway adapter 1212 to the manway 1204 can be remove or released. After moving the manway adapter 1212 from the manway 1204, the cap 1504 can be reinstalled on the manway 1204. The manway adapter 1212 can be cleaned after the disconnection, such as to be used for another tank.

Figure 16A:
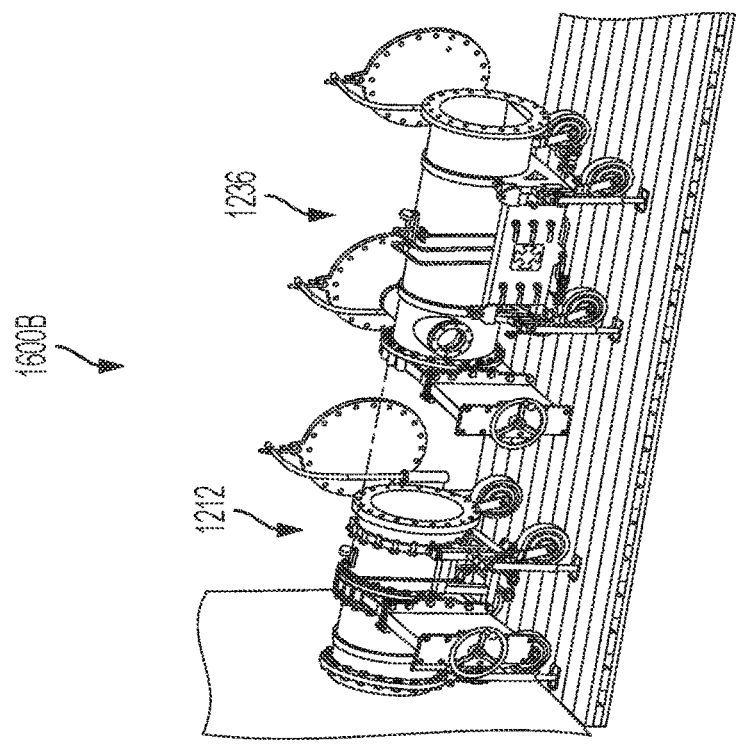
FIGS. 16A-C are example illustrations of a system for installing a launcher, in accordance with some implementations.
Figure 16B:
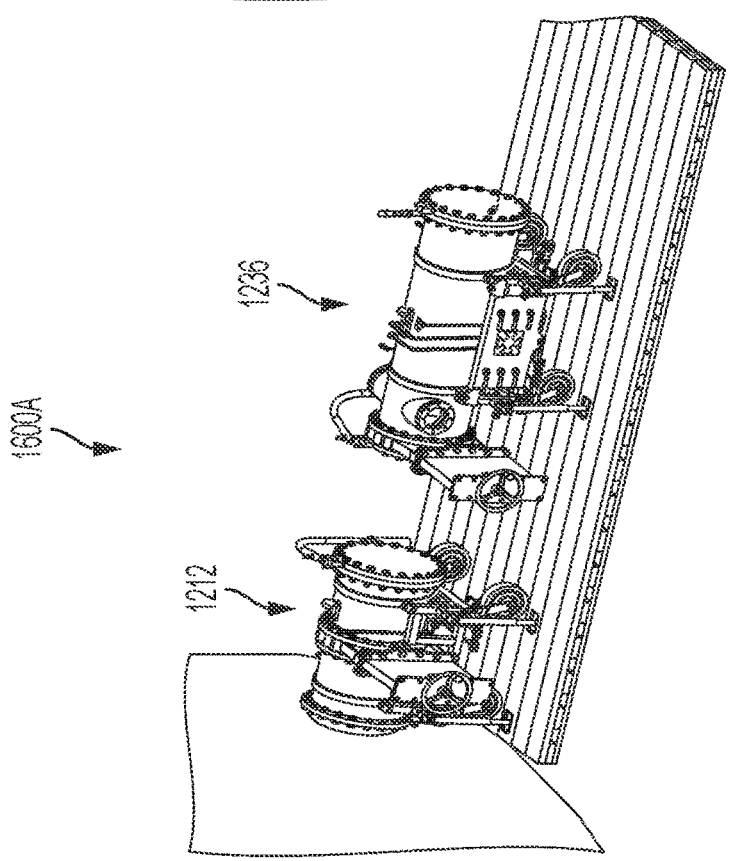
Figure 16C:
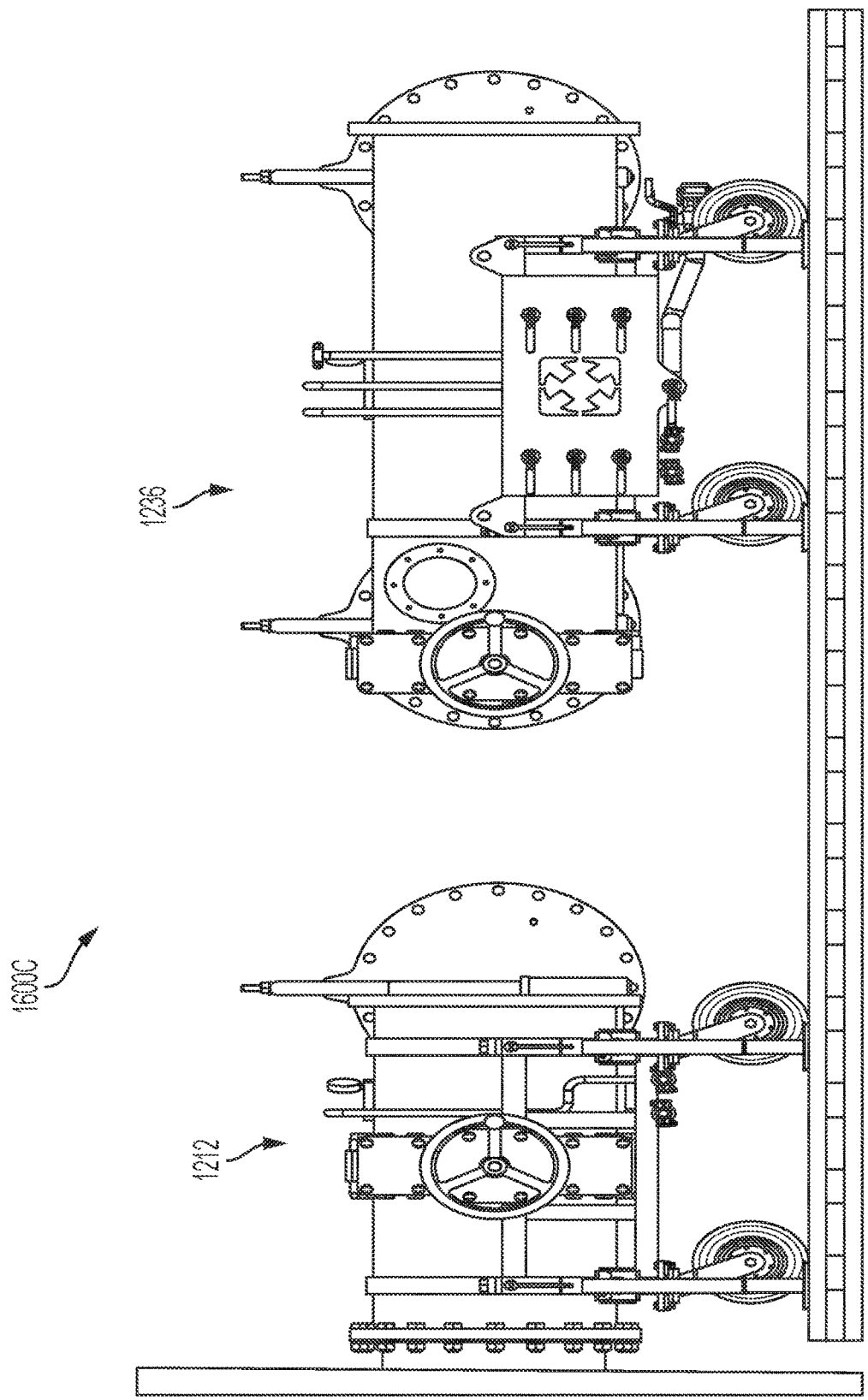

Referring to FIGS. 16A-C, example illustrations 1600A-C of a system for installing a side launcher, in accordance with some implementations, are shown. The launcher 1236 can be placed on the mat 1400 that the manway adapter 1212 is on. The launcher 1236 can be lifted or wheeled onto the mat 1400. Prior to the removal of the cap 1216 on the manway adapter 1212 or the cap 1260 of the launcher 1236, a seal test can be conducted on each of the isolated pressure vessels using the ports and gauges (e.g., 1220, 1240, or 1248). The ports and gauges can be provided to an operator. The seal test can confirm the integrity of the pressure vessels, such as the gate valve 1208 of the manway adapter 1212 and the gate valve 1228 of the launcher 1236. The cap 1216 and the cap 1260 can be uninstalled, for example, after the test. The two caps can be removed from the components and moved to a different location. In some cases, the manway adapter 1212 and/or the launcher 1236 can include at least one hinge to open or close the caps, such as to remain near the components after opened. The launcher 1236 can be moved (e.g., rolled) to the manway adapter 1212. The launcher 1236 can be aligned with the launcher interface pipe 1512. The launcher 1236 can be bolted to the launcher interface pipe 1512 of the manway 1212. The interface 1512 can be sealed with a gasket, such as similar to tank interface pipe 1508. The installation process of the launcher 1236 to the manway adapter 1212 can be similar to the installation of the manway adapter 1212 to the manway 1204.

The launcher 1236 can be disconnected from the manway adapter 1212. For example, the launcher 1236 can be disconnected, capped, and moved away from the manway adapter 1212 for cleaning or decontamination. The pipes (e.g., pipes 1710, as in FIG. 17B) linking the launcher 1236 and manway adapter 1212 can be disconnected. The ports of the launcher 1236 and the manway 1212, such as ports 1220 and 1248, can be capped after removing the pipes. The locking mechanism connecting the manway adapter 1212 to the gate valve 1228 of the launcher 1236 can be removed. The launcher 1236 can be capped with the cap 1260. The launcher 1236 can be moved to a different location for cleaning and decontamination. The disconnection process can be performed in other sequences.

Figure 17A:
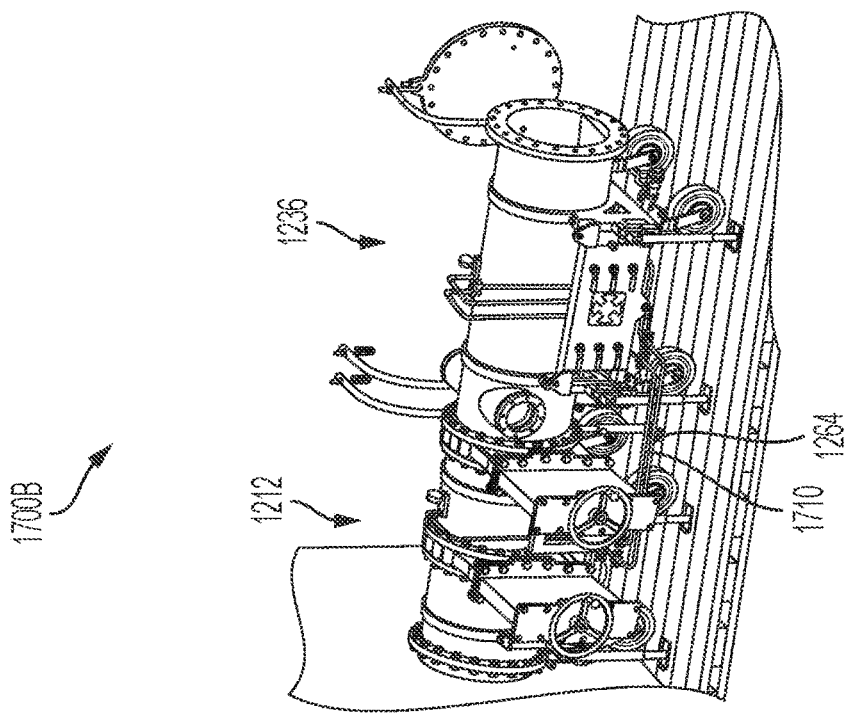
FIGS. 17A-B are example illustrations of the launcher installed to the manway, in accordance with some implementations.
Figure 17B:
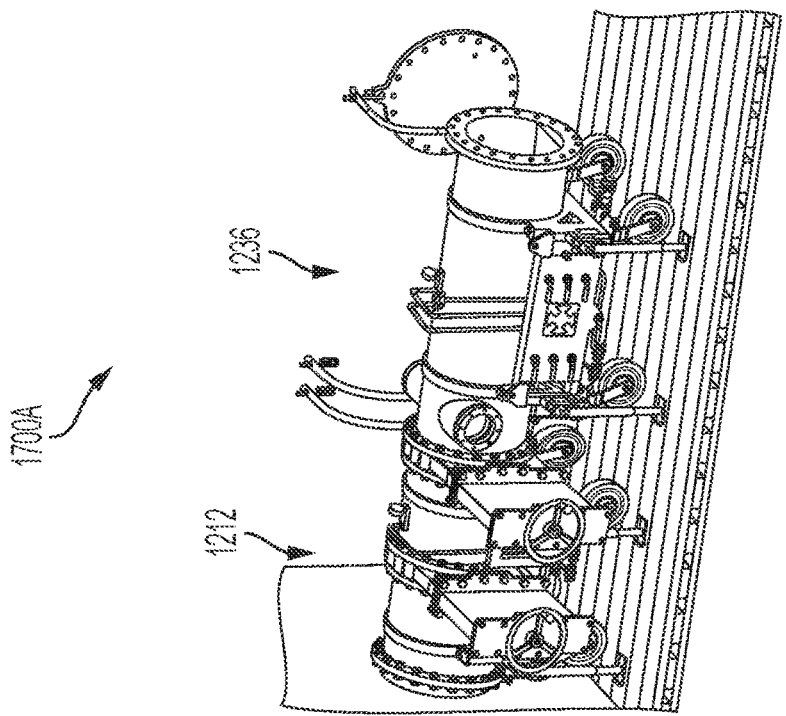

Referring to FIGS. 17A-B, example illustrations 1700A-B of the launcher 1236 installed to the manway 1212, in accordance with some implementations, are shown. The launcher 1236 can be fastened to the manway adapter

1212. Once fastened, a brace 1264 can be installed underneath the gate valve 1228. The brace can provide structural support for the launcher 1236. The caps can be removed from the manway adapter 1212 and the launcher 1236. Connecting pipes 1710 can be installed on the connection ports (e.g., between ports 1220 and 1248), for example, using tri-clamp flanges. After the crossflow connection pipes 1710 are installed between the launcher 1236 and the manway adapter 1212, the robot 1300 can be installed in the launcher 1236.

Figure 18A:
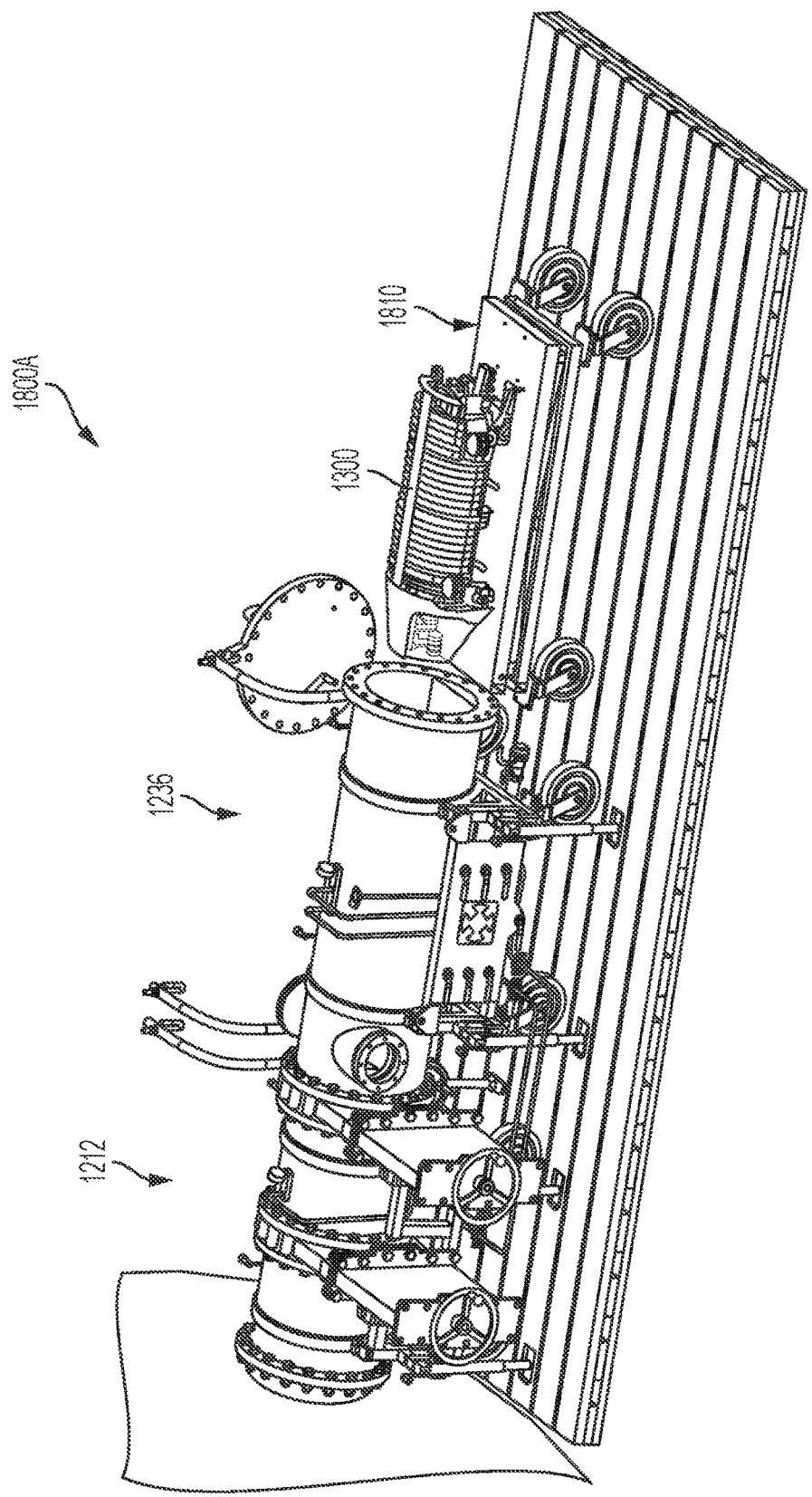

Referring to FIGS. 18A-B, example illustrations 1800A-B of a system for installing an inspection robot in the side launcher, in accordance with some implementations, are shown. The robot 1300 can be moved by an operator using a cart 1810. The cart 1810 can lift the robot 1300 onto the mat 1400 and move the robot to the launcher 1236. The cart 1810 can include wheels to roll the robot 1300 to a destination. In some cases, the cart 1810 can be lifted using a crane to move the robot 1300. The cart 1810 can be positioned in front of the launcher 1236. The cart 1810 can include a height-adjustable mechanism for aligning the robot 1300 with the launcher 1236. The robot 1300 can be installed inside the launcher after the alignment. Installing the robot 1300 can refer to moving the robot into the launcher 1236. The robot 1300 can include wheels to assist with transitioning from the cart 1810 to the launcher 1236.

Figure 19A:
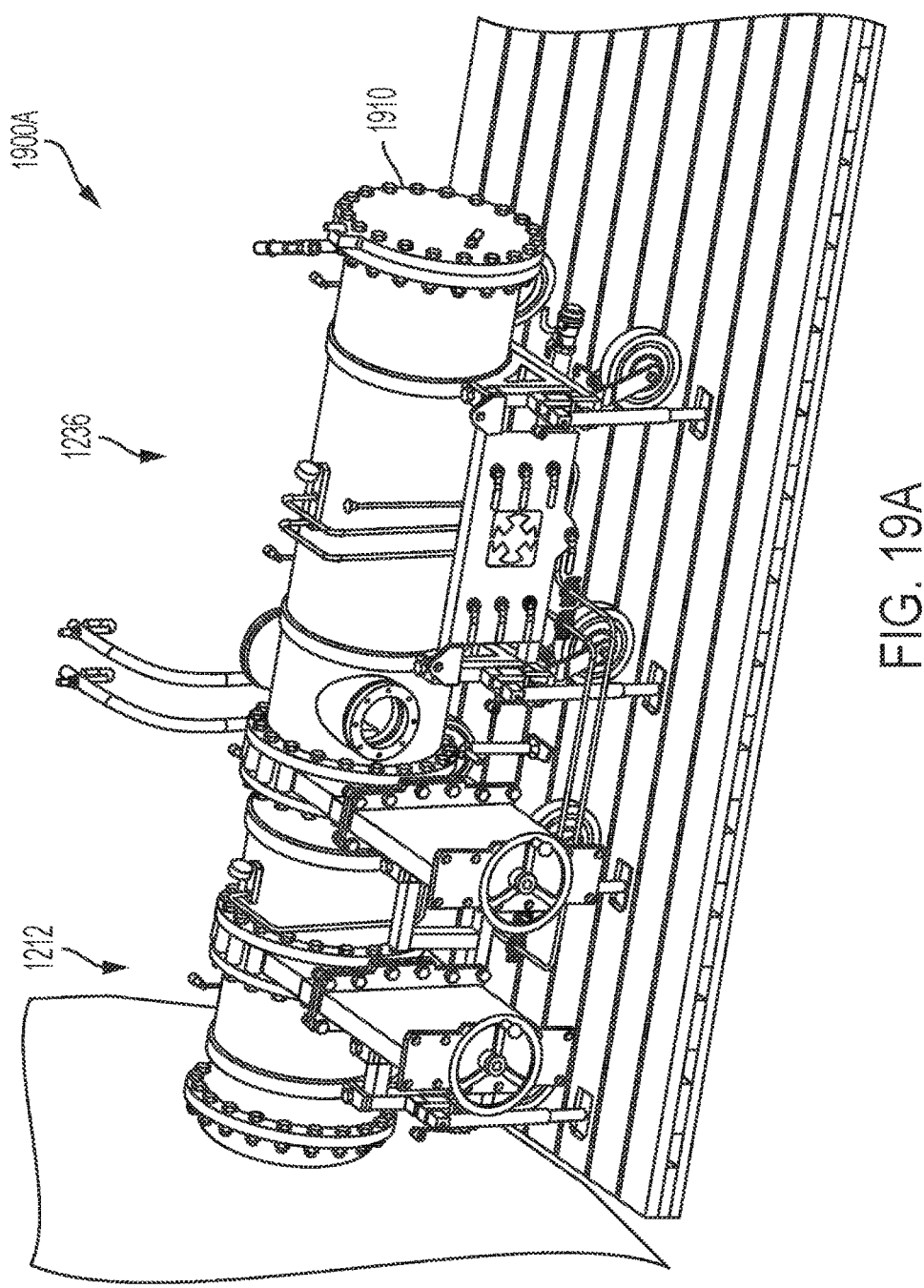
FIGS. 19A-B are example illustrations of the inspection robot installed in the launcher, in accordance with some implementations.
Figure 19B:
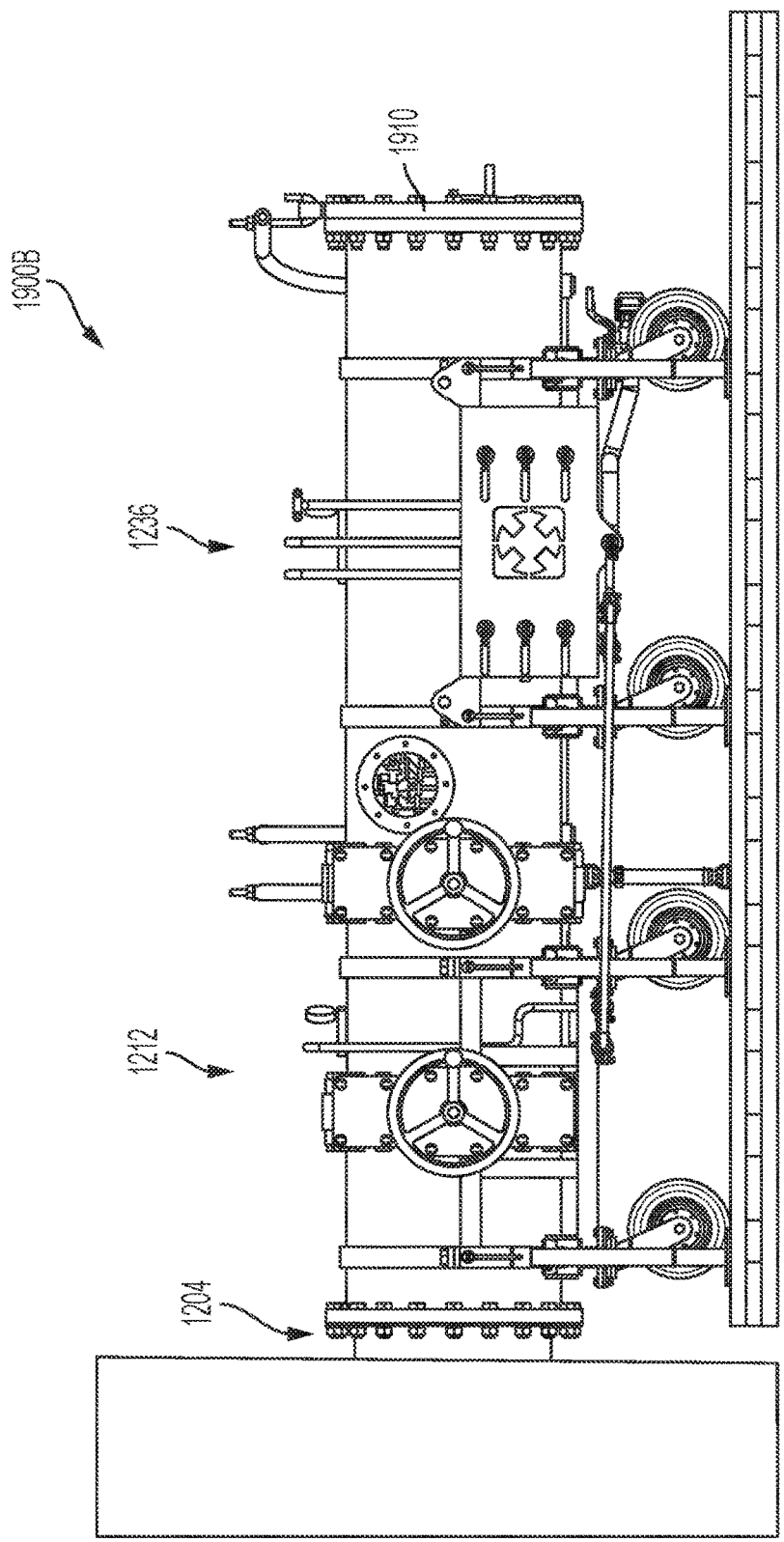

Referring to FIGS. 19A-B, example illustrations 1900A-B of the inspection robot 1300 installed in the launcher, in accordance with some implementations, are shown. After the robot 1300 is installed, the cap 1910 (e.g., aft flange similar to the cap 1260) of the launcher 1236 can be closed. The cap 1910 can be bolted closed or by using other mechanisms. A second seal test and a pre-dive checklist of the side launcher system 1100 can be conducted. After completing the test and the pre-dive checklist, the robot 1300 can initiate tank inspection procedures. The launcher 1236 may not be opened during the inspection. The launcher 1236 may not be opened if there are remaining inert nitrogen gas and/or product vapor concentrations between the lower explosive limit ("LEL") and upper explosive limit ("UEL").

The robot 1300 can be removed from the launcher 1236, such as after completing the in-service inspection. The cap 1910 can be unfastened or removed from the launcher 1236. The cart 1810 can be wheeled to the launcher 1236. The robot 1300 can be moved onto the cart 1810 for transportation. After removing the robot 1300, the cap 1910 can be reinstalled on the launcher 1236.

Figure 20:
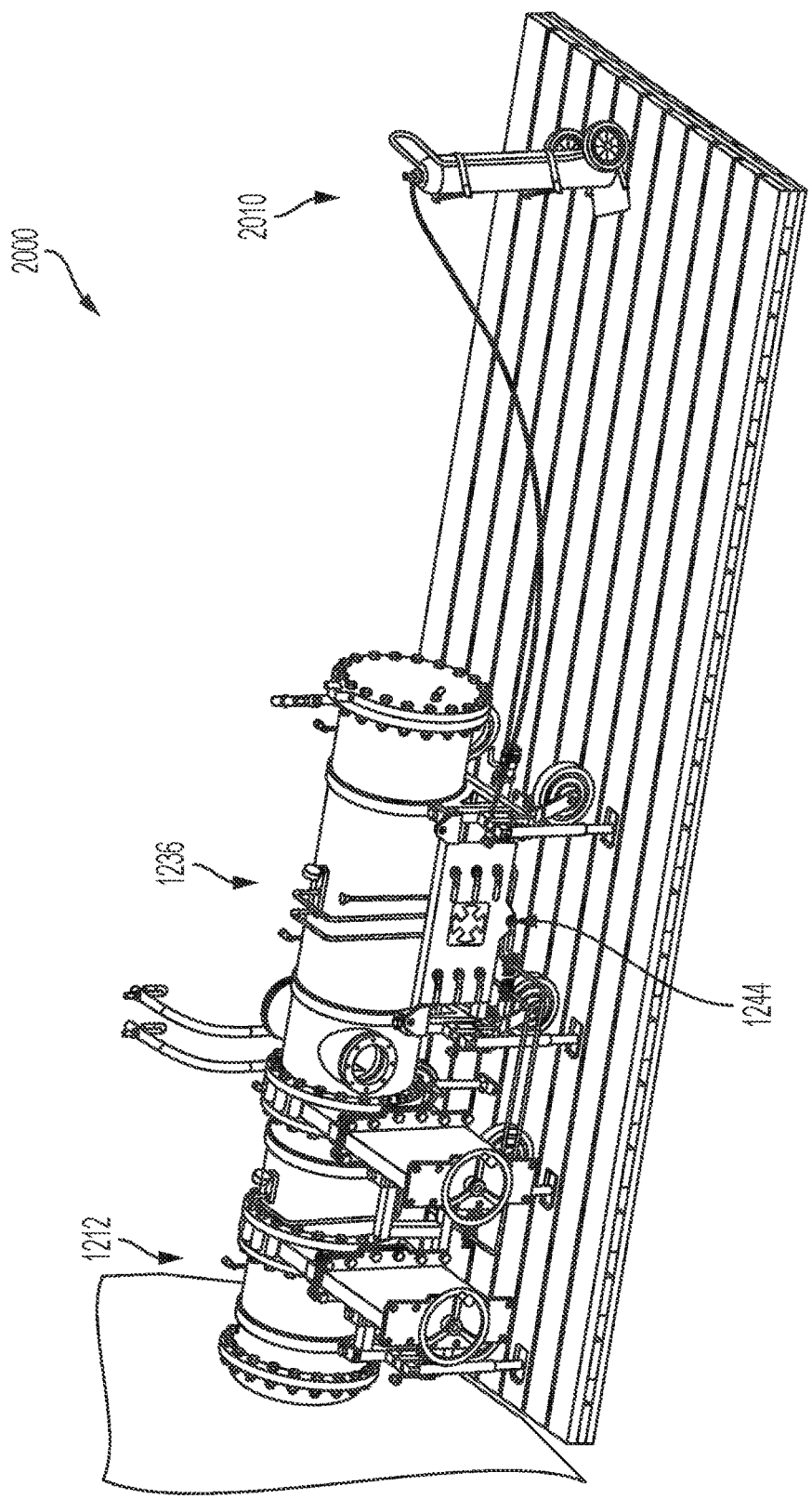
FIG. 20 is an example illustration of an isometric view of the launcher and a purging device, in accordance with some implementations.
Figure 21A:
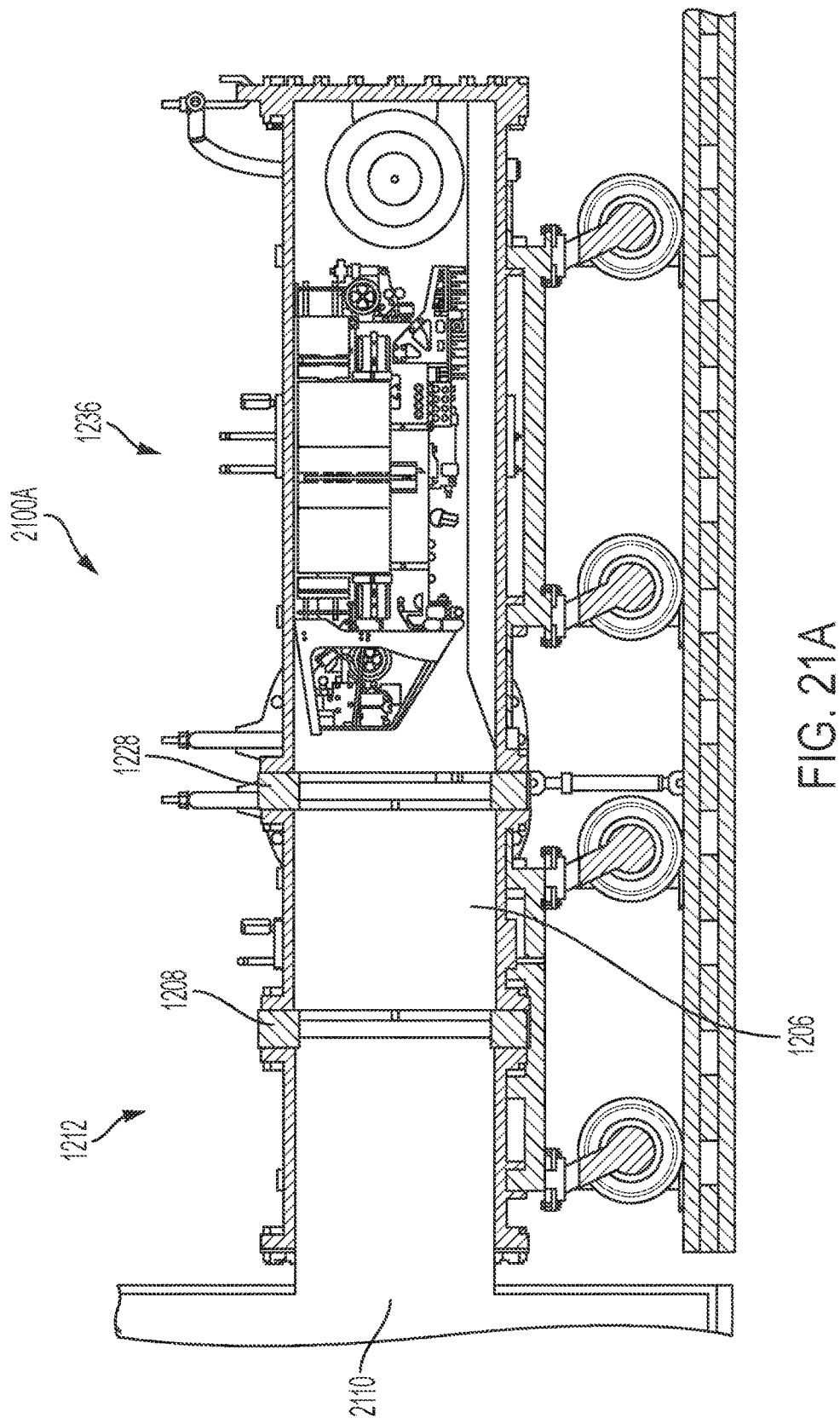
FIGS. 21A-E are example illustrations of a system for purging the launcher, in accordance with some implementations.
Figure 21B:
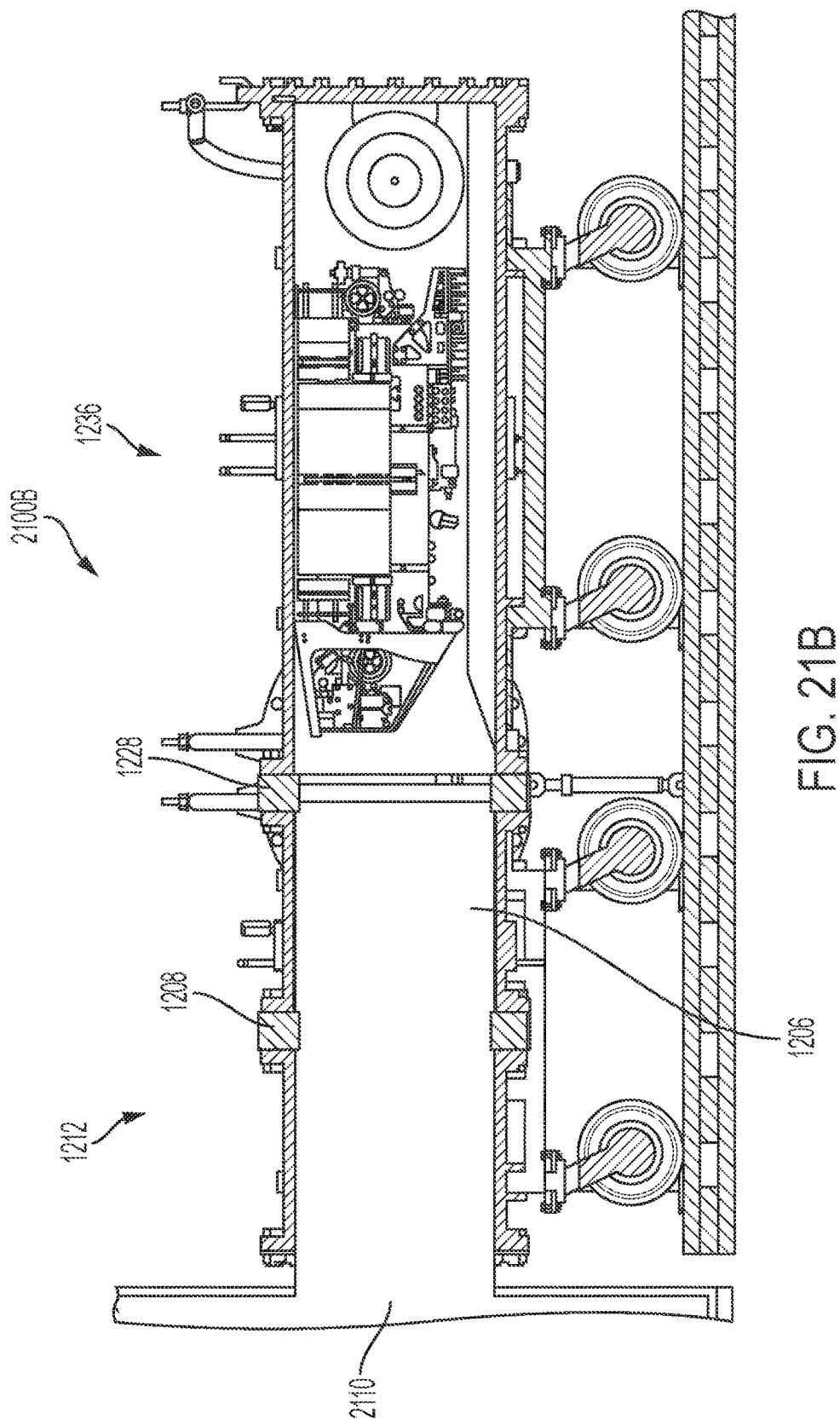
Figure 21C:
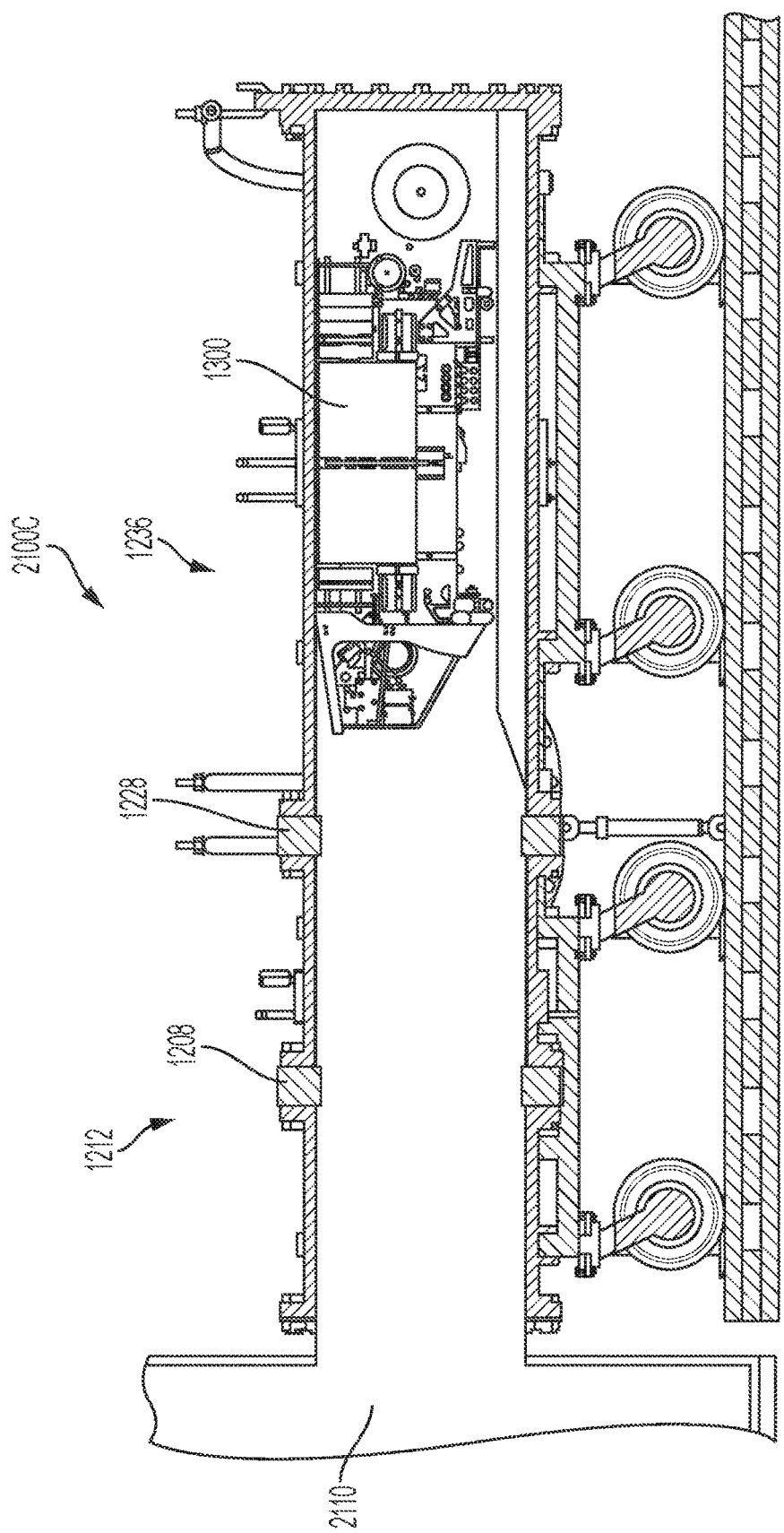
Figure 21D:
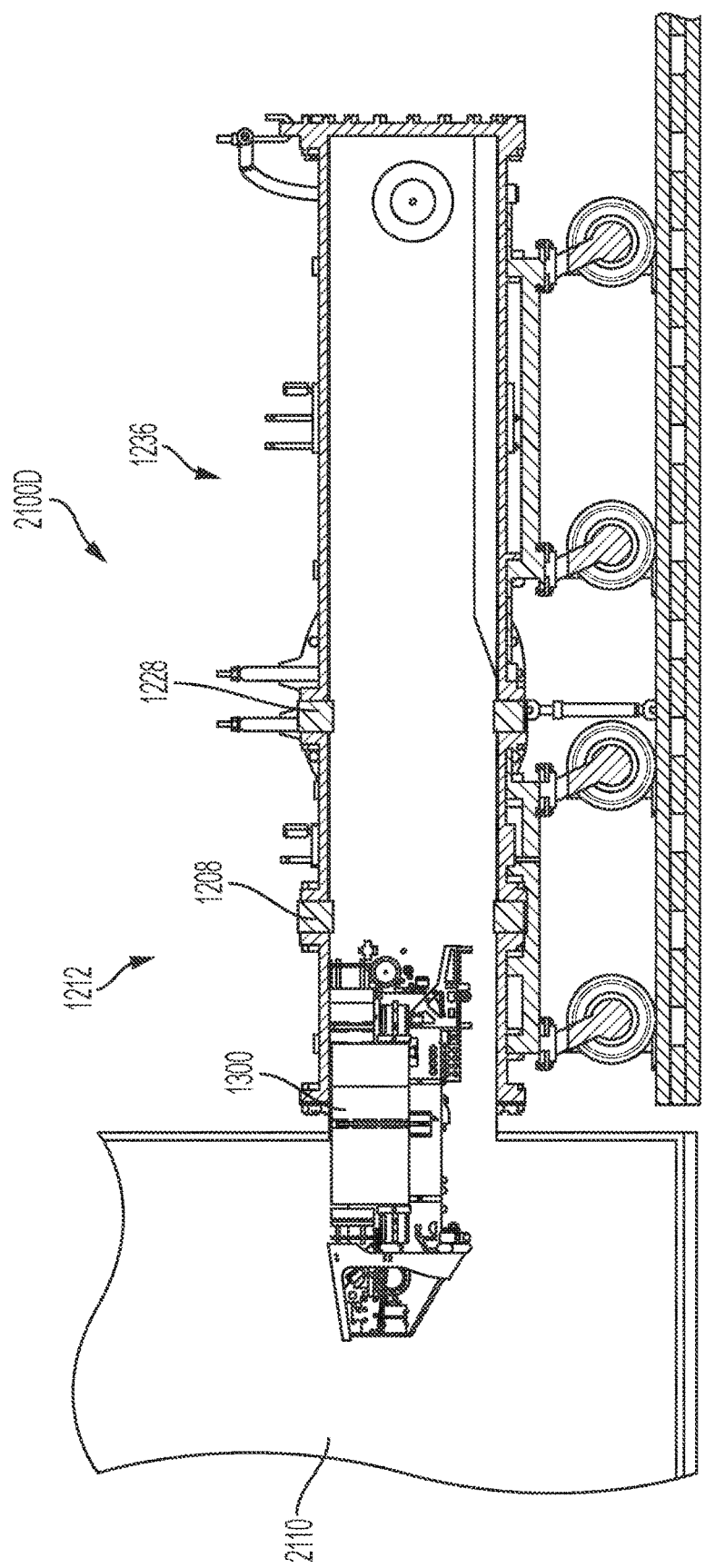
Figure 21E:
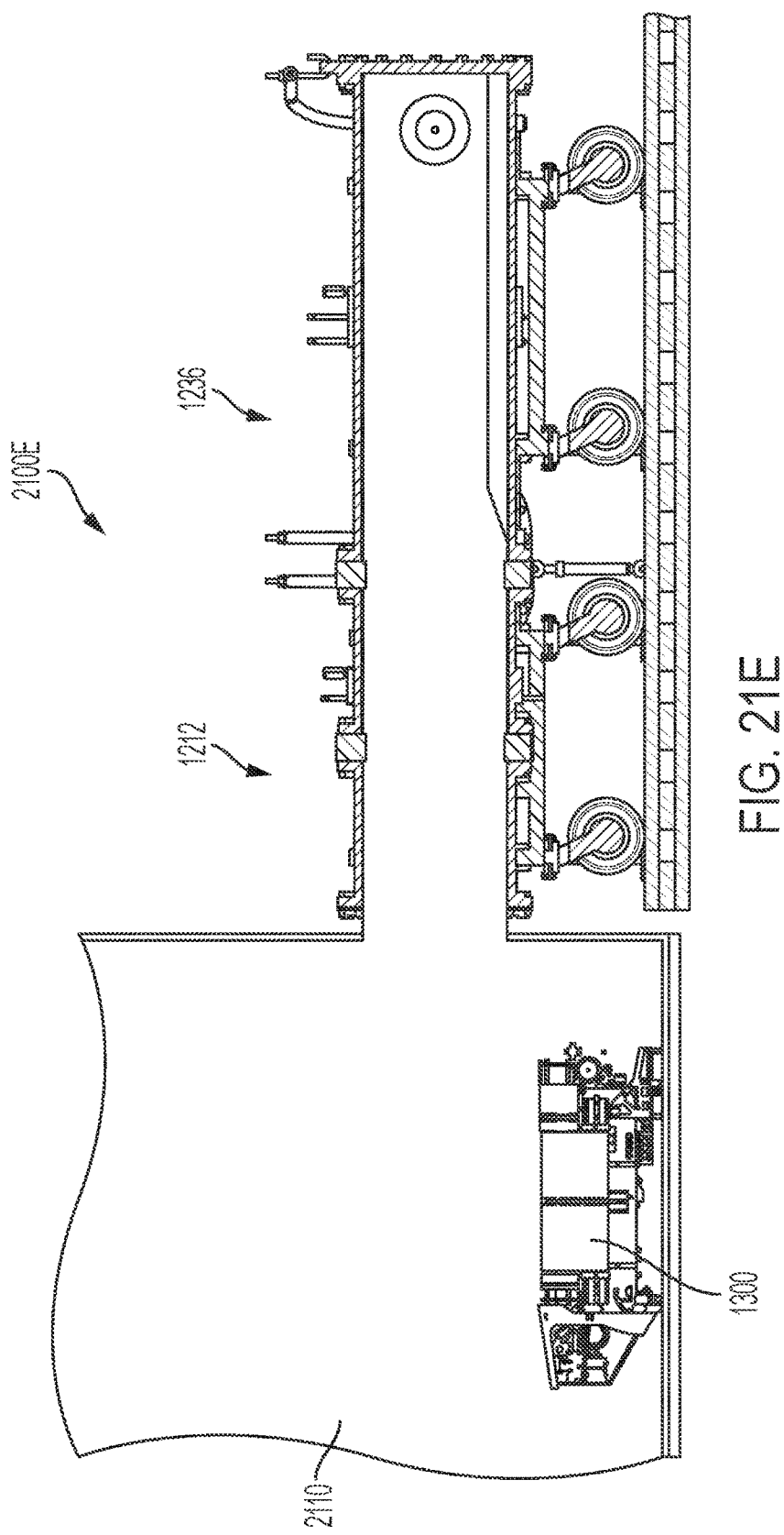

Referring to FIG. 20, an example illustration 2000 of an isometric view of the launcher 1236 and a purging device 2010, in accordance with some implementations, is shown. After installing the robot 1300, the launcher 1236 and manway adapter 1212 volumes can be purged with, for example, nitrogen gas. The purging device 2010 can be connected to each component of the side launcher system 1100. By purging the components using the purging device 2010, oxygen concentration can decrease below 2%, thereby improving the safety of deploying the robot 1300. The purging of the internal atmosphere of the components can be identified using an interface (e.g., valve control assembly 1244) located at the side of the launcher 1236.

Referring to FIGS. 21A-E, example illustrations 2100A-E of a system for purging the launcher 1236, in accordance with some implementations, are shown. The system can purge the launcher 1236 and the manway adapter 1212 prior to opening gate 1208 and gate 1228. The tank can be filled with flammable fluid 2110 (e.g., product) or other products. The launcher interface pipe 1206 and the launcher 1236 can be filled with inert gaseous volume. The gate valve 1208 can be opened after the launcher interface pipe 1206 is filled. The gate valve 1228 can be opened after the launcher 1236 is filled with the inert gaseous volume. The valves can be opened slowly, such as to allow the product from the tank to gradually fill the launcher interface pipe 1206 and the launcher 1236. The valves can be opened by an operator. The vent 1220 can be closed after the level-indicator on the interface indicate that the manway adapter 1212 is full with the inert gaseous volume. The ports 1248 or the drain 1240 can be closed after the level-indicator on the interface indicate that the launcher 1236 is full with the inert gaseous volume. The robot 1300 can be submerged in the product after opening the valves for a certain period of time. Once the robot 1300 is submerged, the robot 1300 can move into the tank containing the product.

The robot 1300 can include a pressure switch. Once the pressure inside the launcher 1236 reaches a threshold (e.g., similar to the pressure inside the tank), the robot 1300 can initiate a launch procedure to move from the launcher 1236 and into the tank containing the flammable fluid 2110. The robot 1300 can initiate the launch procedure to move inside the tank responsive to other commands or signals. For example, the robot 1300 can receive a command from a remote controller of an operator to launch towards the tank. In response to the command to launch, the robot 1300 can proceed towards the tank. Therefore, the robot 1300 can be remotely controlled by an operator to perform one or more features and functionalities operable by the robot 1300. In another example, the robot 1300 can be configured with a timer (e.g., countdown timer or a countdown clock). The timer can be stored in the memory of the robot. The timer can be started as a part of a launching procedure. For example, an operator can start the timer of the robot 1300 prior to inserting the robot into the launcher 1236, the timer can start responsive to triggering the pressure switch, receiving a command from a remote controller, receiving an indication that the tank is sealed or the gate valves (e.g., gate valve 1208 and gate valve 1228) are opened, among others. Therefore, once the countdown is done, the robot 1300 can proceed to move into the tank.

Figure 22:
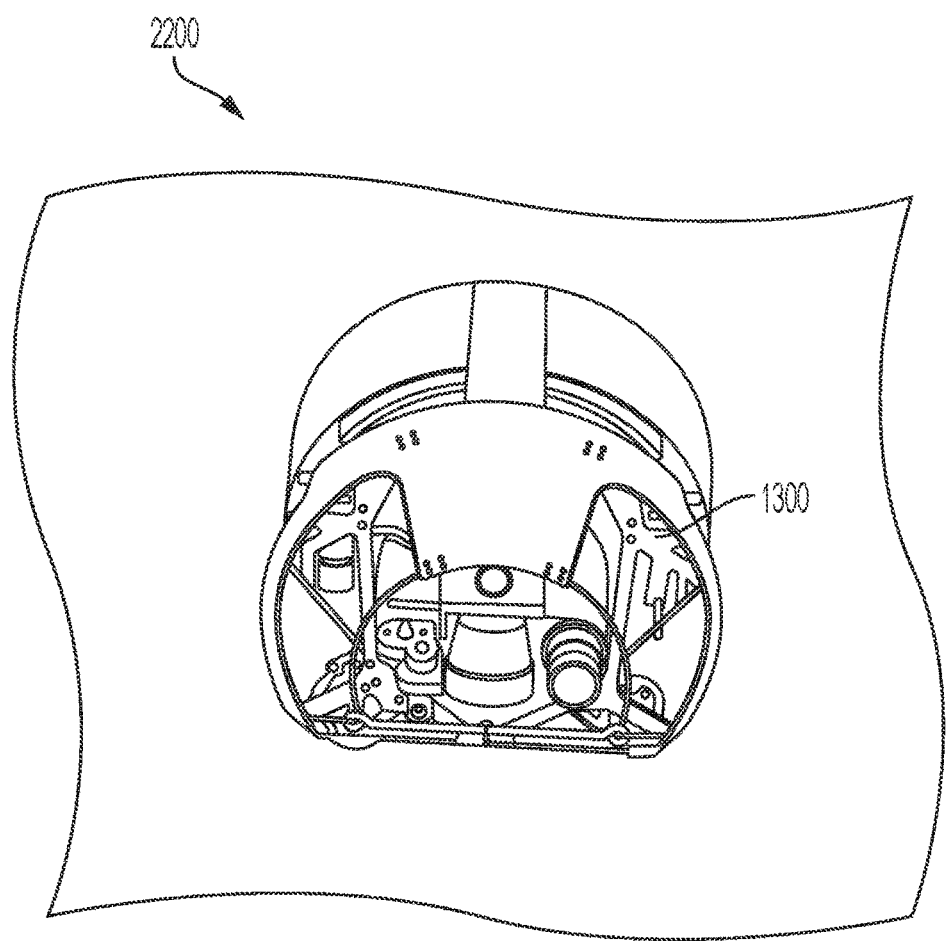
FIG. 22 is an example illustration of the inspection robot entering through the manway, in accordance with some implementations.

Referring to FIG. 22, an example illustration 2200 of the inspection robot 1300 entering through the manway 1204, in accordance with some implementations, is shown. The robot 1300 can use one or more thrusters to move into the tank. The robot 1300 can perform the in-service tank inspection within the tank.

Figure 23:
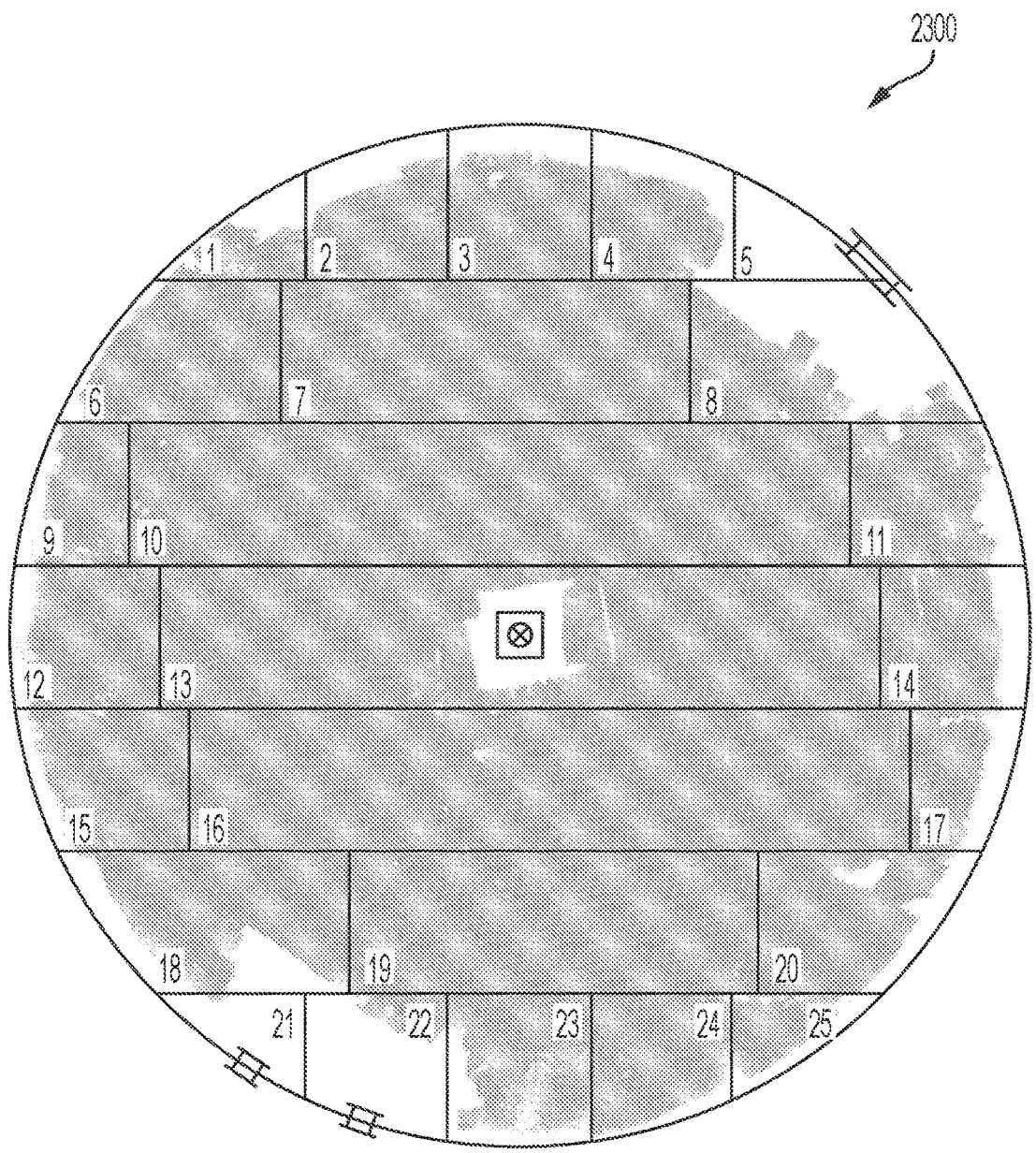
FIG. 23 is an example illustration of a tank inspection coverage map, in accordance with some implementations.

Referring to FIG. 23, an example illustration 2300 of a tank inspection coverage map, in accordance with some implementations, is shown. The map can be a dive plan for the robot 1300 to follow. The dive plan can facilitate the movement of the robot 1300. The robot 1300 can follow the dive plan to complete the tank inspection. The tank inspection coverage map can indicate regions and areas the robot 1300 traveled to. The map can indicate regions in the tank the robot 1300 inspected.

Figure 24A:
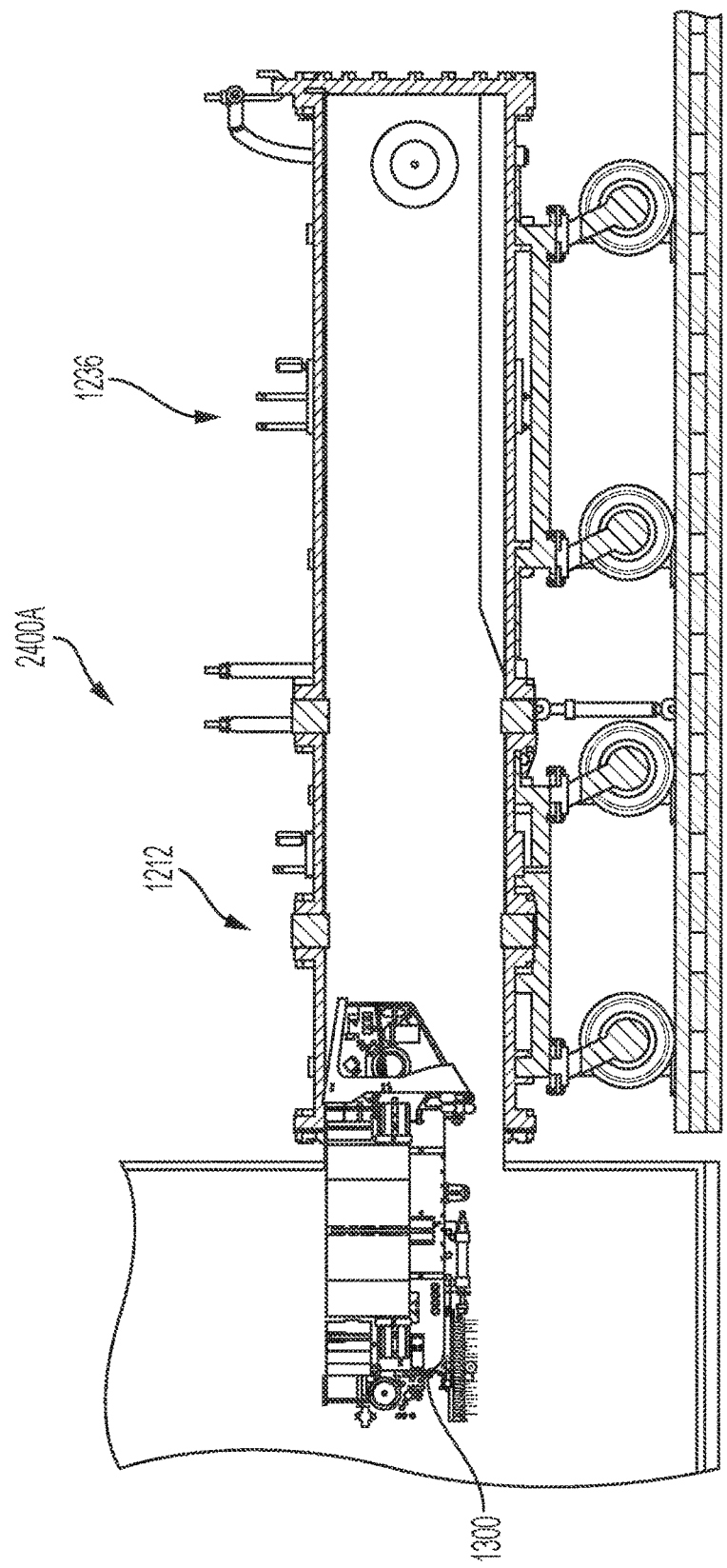
FIGS. 24A-C are example illustrations of a system for recovering the inspection robot, in accordance with some implementations.
Figure 24B:
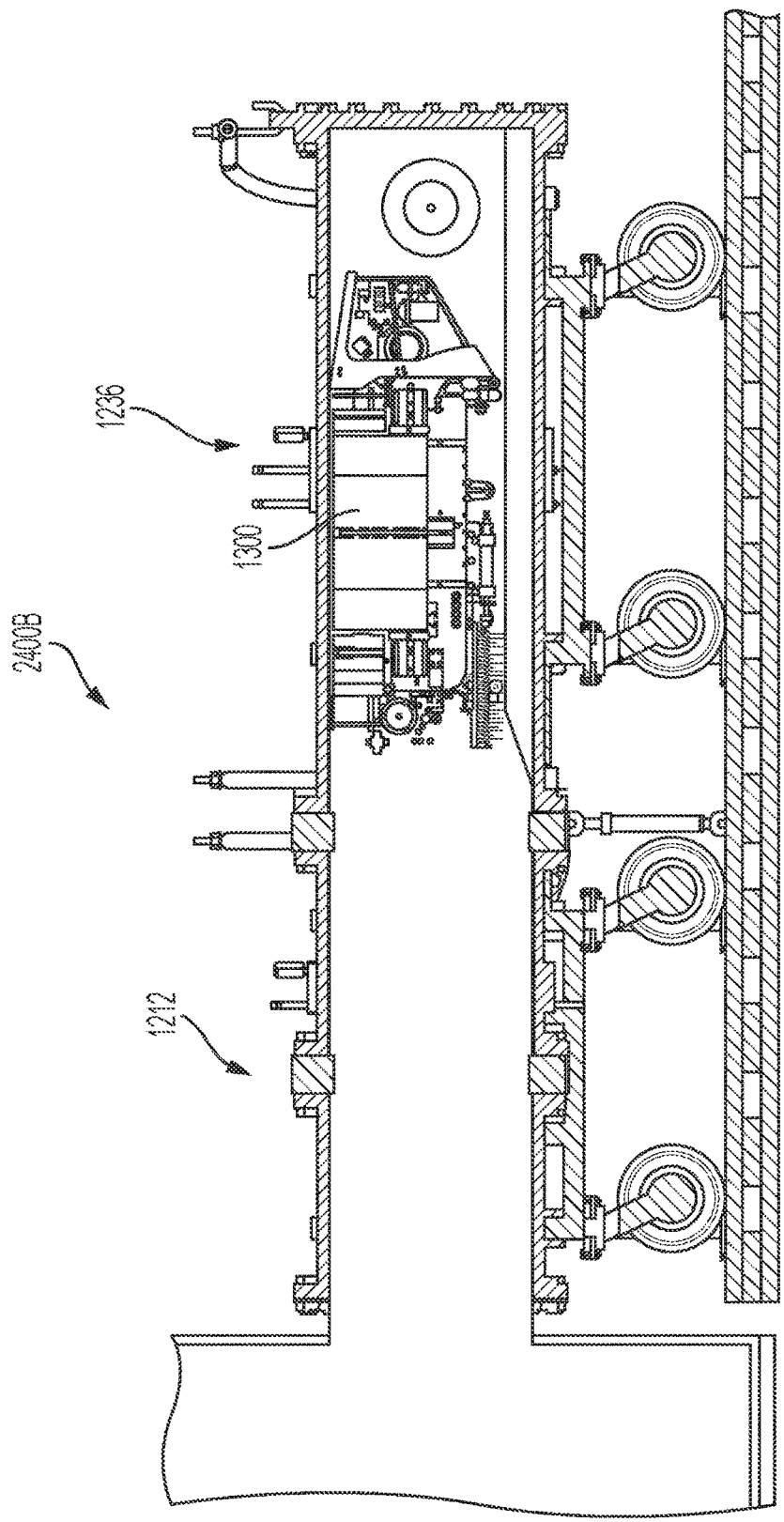
Figure 24C:
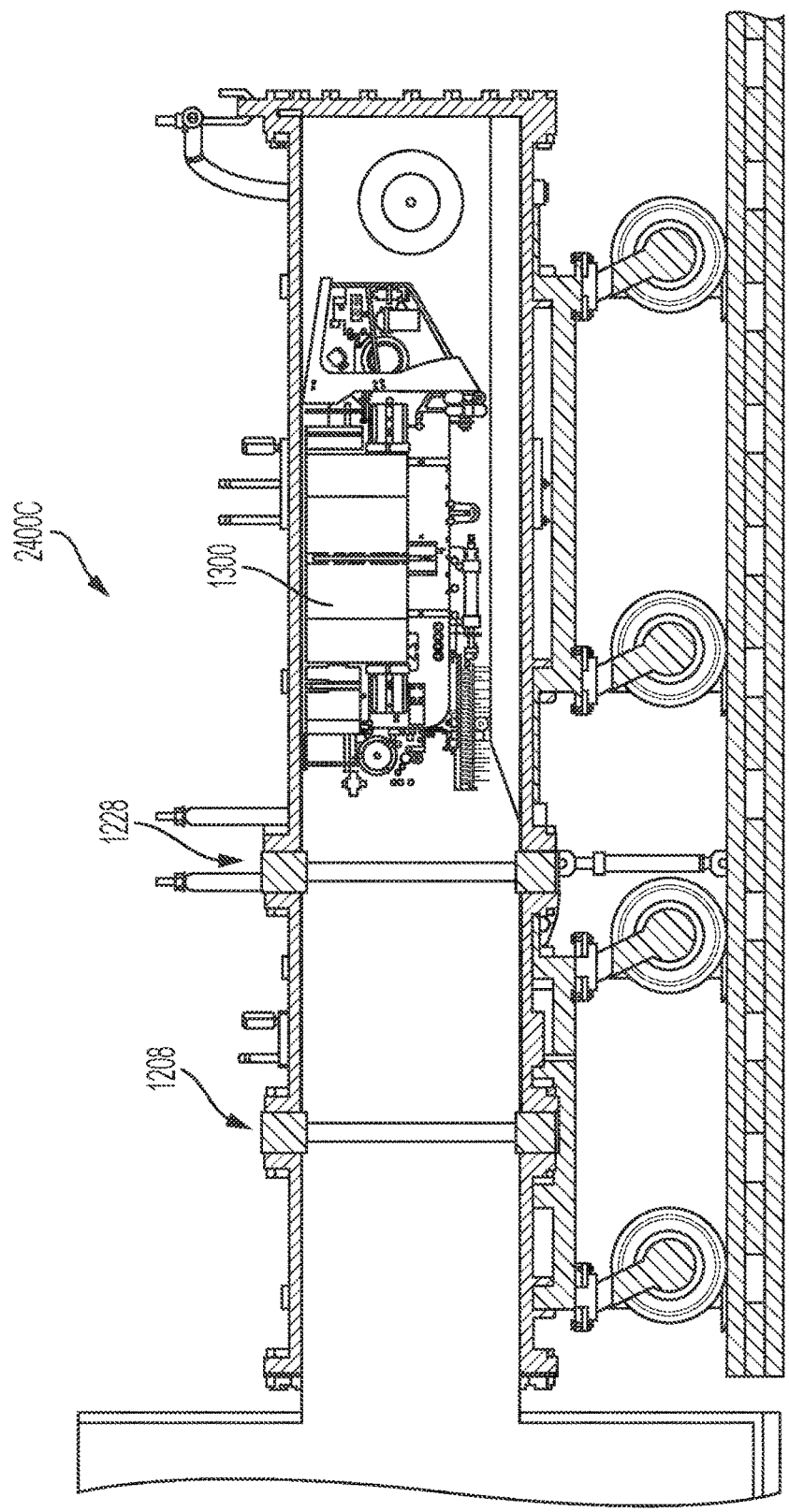

Referring to FIGS. 24A-C, example illustrations 2400A-C of a system for recovering the inspection robot 1300, in accordance with some implementations, are shown. The robot 1300 can autonomously move into the launcher 1236 via the manway 1204 and the manway adapter 1212. The launcher 1236 can include an indicator, such as a lighting system, for the robot 1300 to indicate the location of the launcher 1236 (e.g., to facilitate the robot 1300 movement when executing an exit procedure). The robot 1300 can include physical features and sensors to perform this homing procedure, for example. After the robot 1300 enters the launcher 1236, gate valve 1208 and gate valve 1228 can be closed.

The robot 1300 can identify the location of the manway 1204 or the launcher 1236 by other means and proceed to the launcher 1236 for recovery. For example, the robot 1300 can identify the hole in the tank shell indicating the launcher 1236 (e.g., the hole having 24 inches diameter, among other sizes capable of fitting the robot 1300). The robot 1300 can find the hold in the tank shell using at least one sensor, such as a sonar, a laser, or a camera. In this case, the robot 1300 may not rely on an indicator inside the launcher 1236 to navigate into the launcher 1236 from the tank. The robot 1300 can identify and proceed to the launcher 1236 by other features and methods in addition to the aforementioned.

Figure 25A:
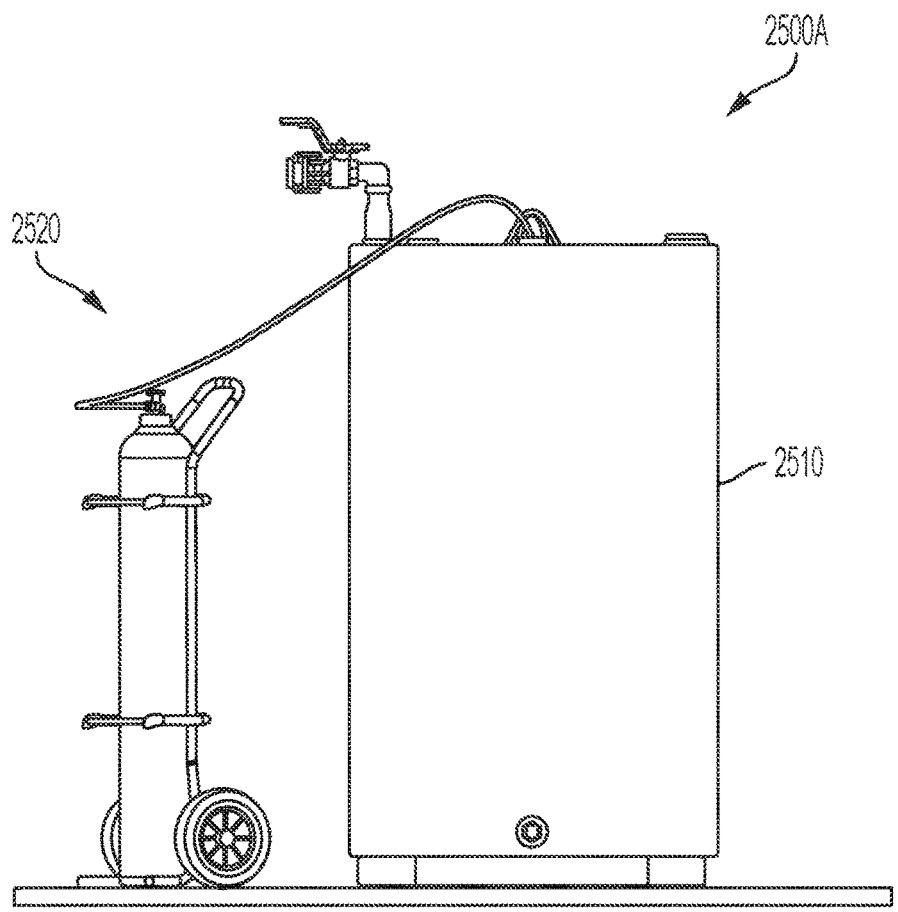
FIGS. 25A-B are example illustrations of a holding tank, in accordance with some implementations.
Figure 25B:
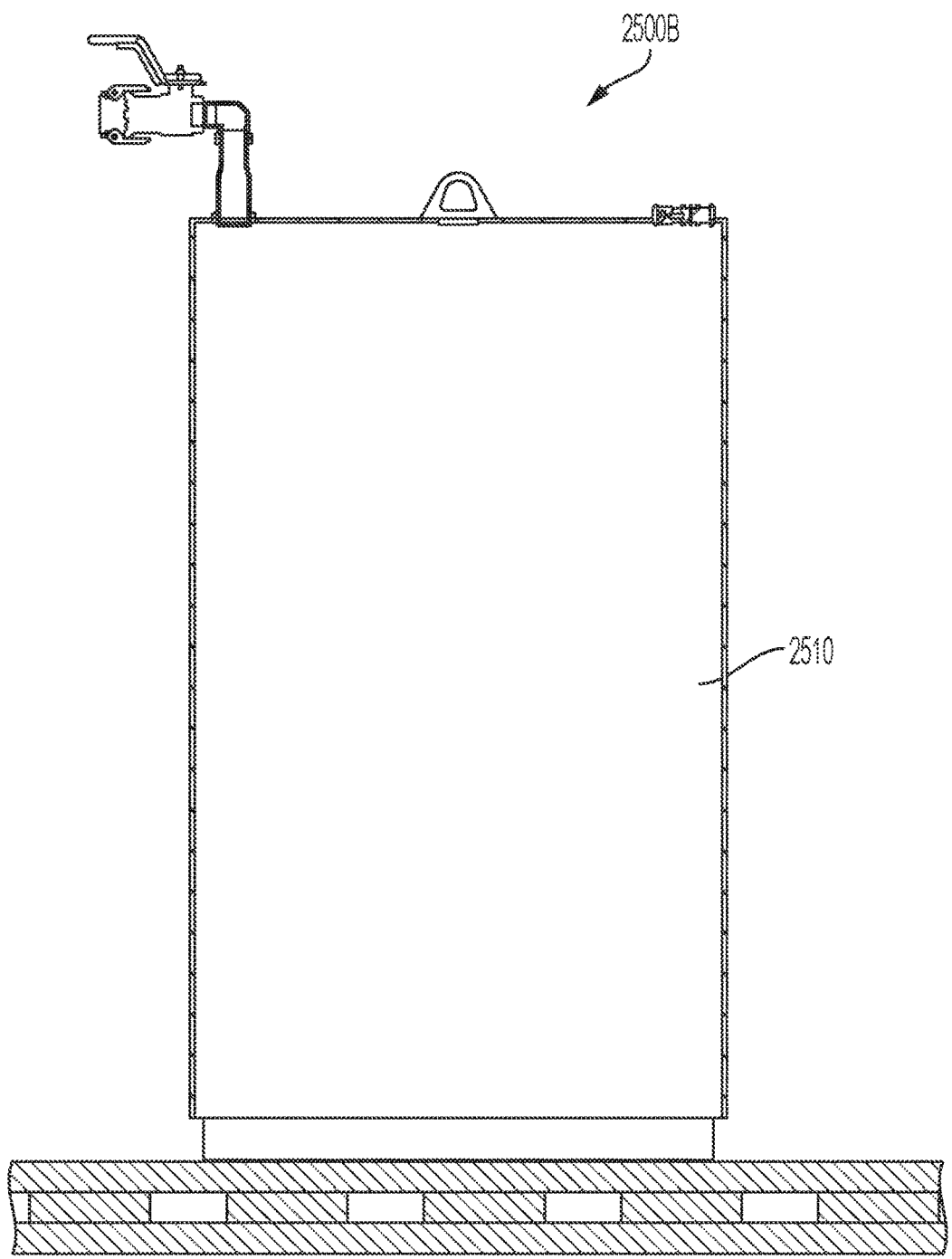
Figure 26A:
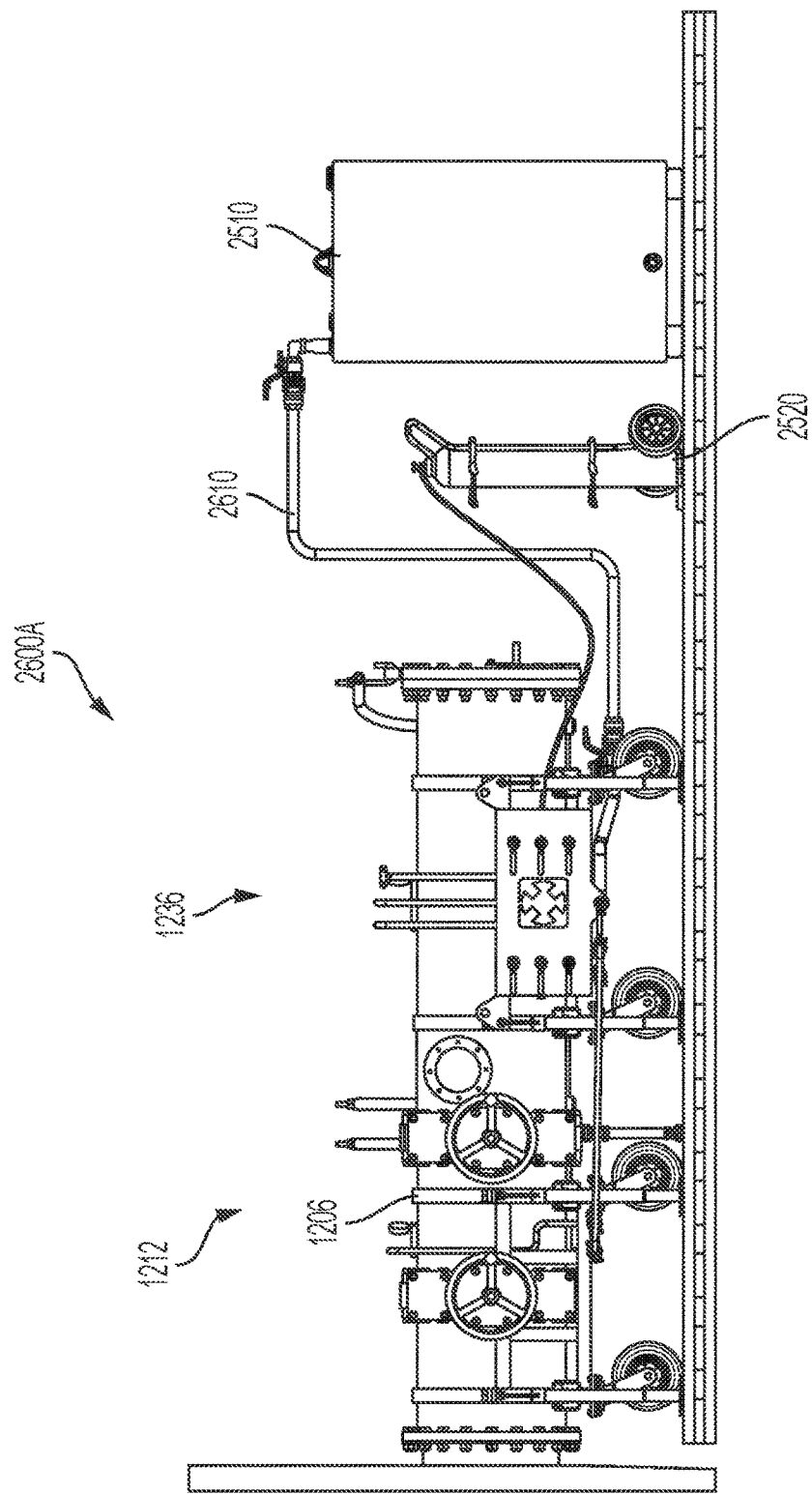
FIGS. 26A-E are example illustrations of a system for draining the manway adapter and the launcher, in accordance with some implementations.
Figure 26B:
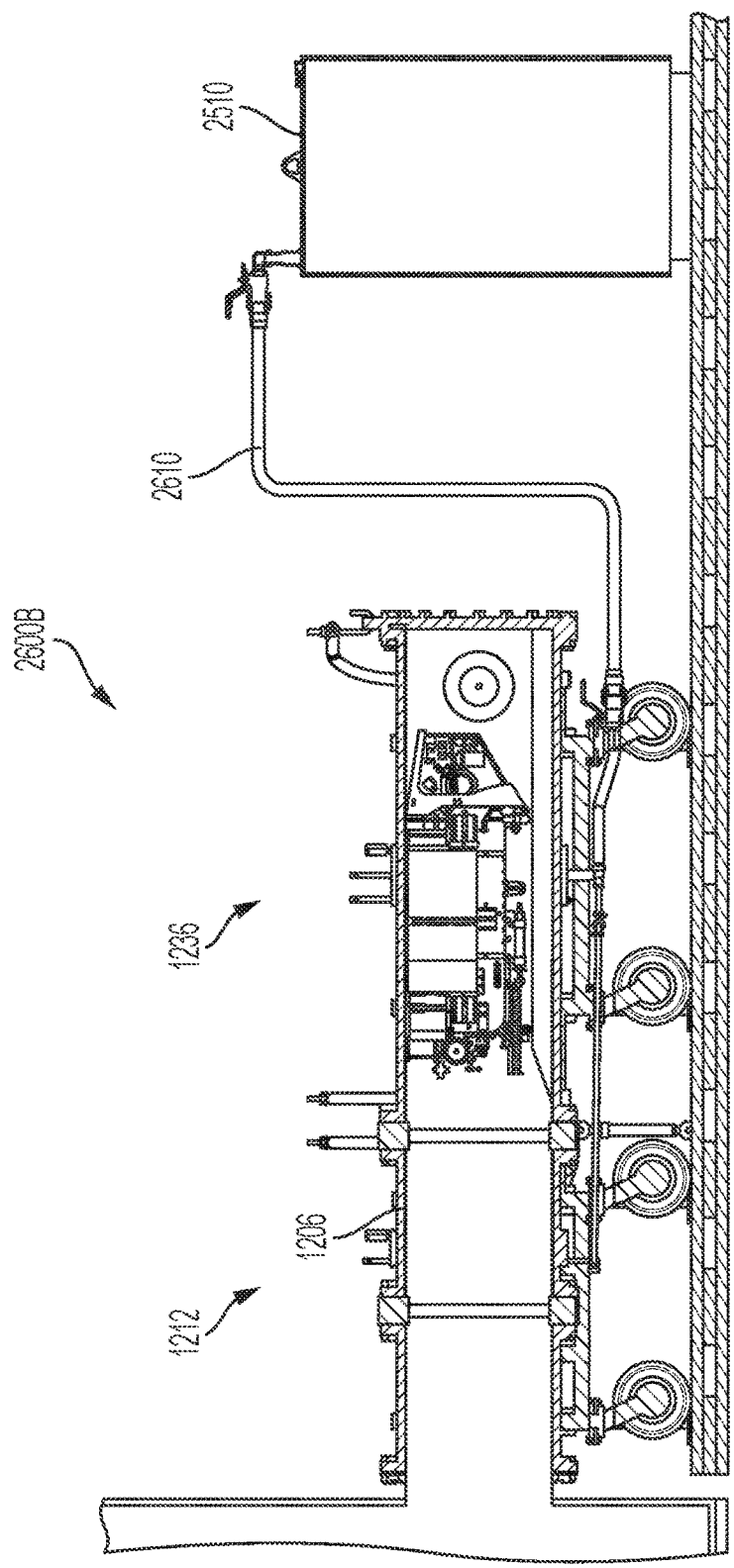
Figure 26C:
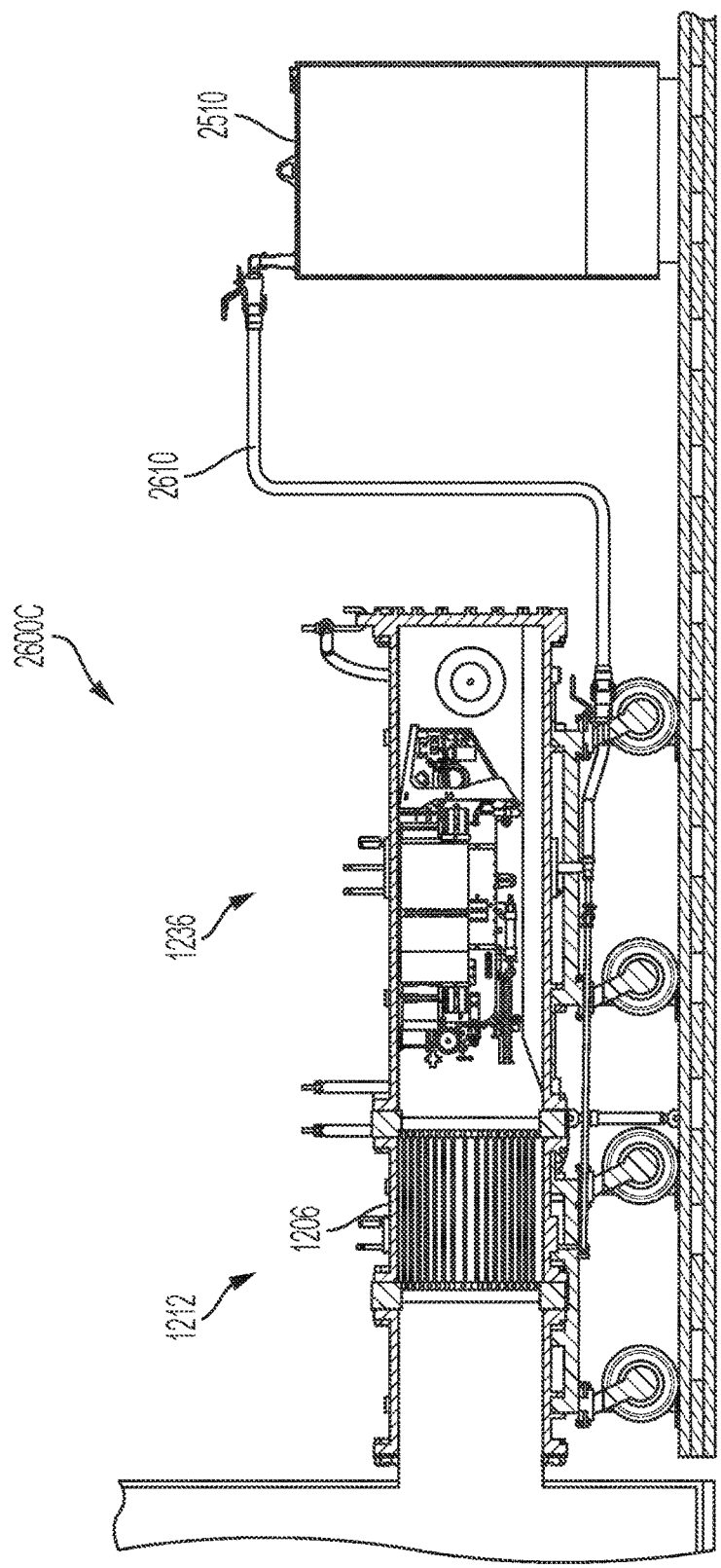
Figure 26D:
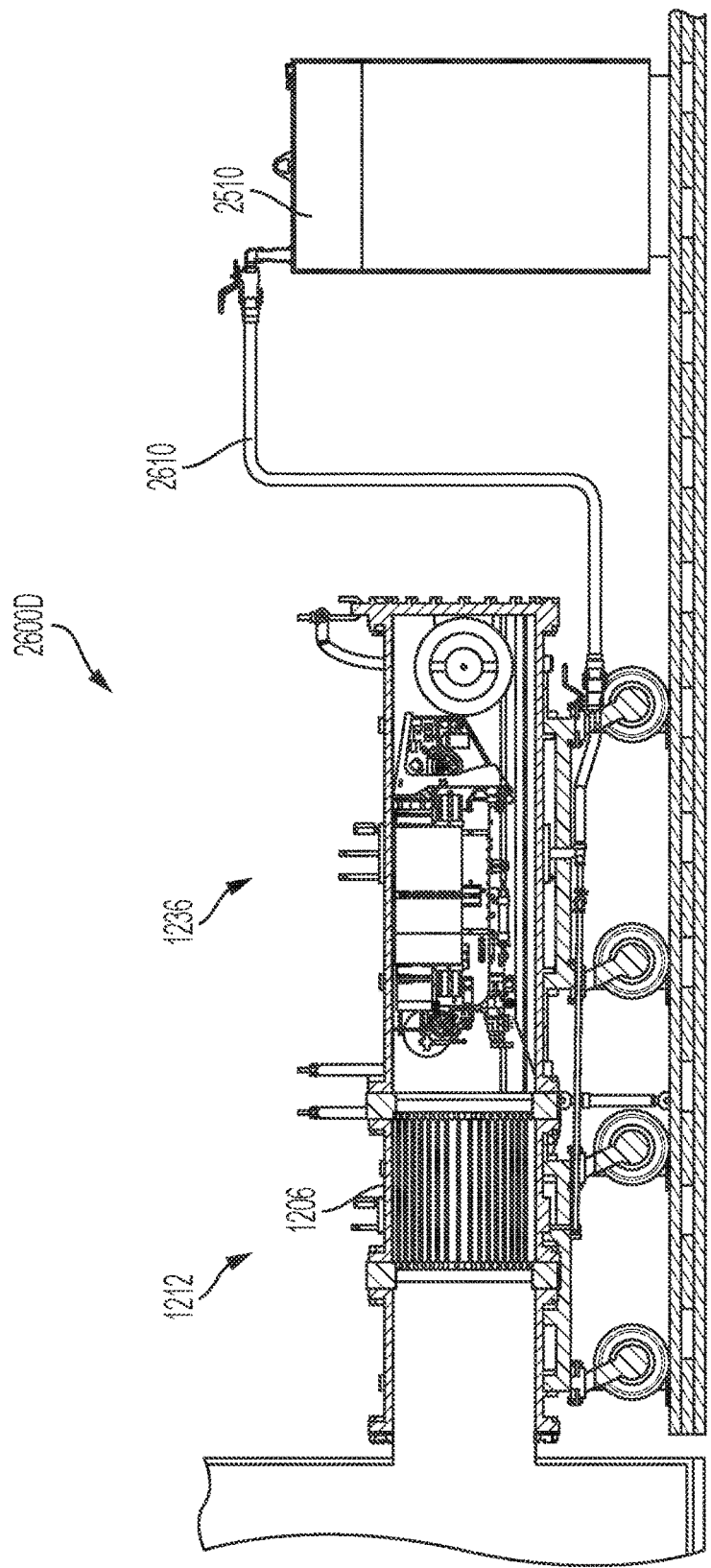
Figure 26E:
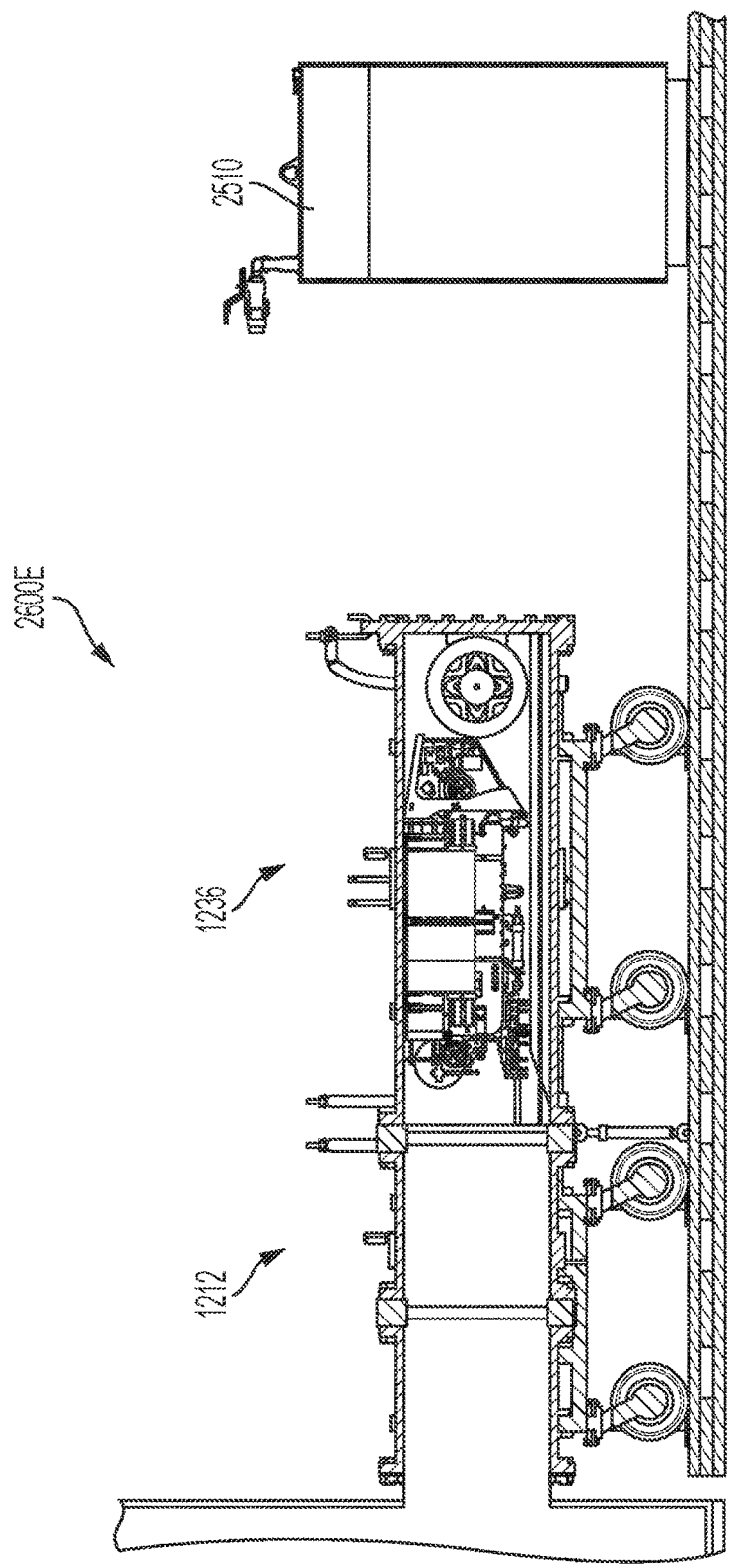

Referring to FIGS. 25A-B, example illustrations 2500A-B of a holding tank 2510, in accordance with some implementations, are shown. The holding tank 2510 can be constructed with similar materials as the tank, such as steel. The holding tank 2510 can be brought to the launcher 1236 or the manway adapter 1212. For example, the holding tank 2510 can be either lifted with a crane, a cart, or brought over with a fork-lift. Before connecting to the launcher 1236, the internal atmosphere of the holding tank 2510 can be purged, for example, with nitrogen until the oxygen concentration is below 2%. The holding tank 2510 can be purged with a purging device 2520. The purging device 2520 can be similar to the purging device 2010. The holding tank 2510 can be configured to store the product.

Referring to FIGS. 26A-E, example illustrations 2600A-E of a system for draining the manway adapter 1212 and the launcher 1236, in accordance with some implementations, are shown. The manway adapter 1212 and the launcher 1236 can be drained after the robot 1300 enters into the launcher 1236 for recovery. The holding tank 2510 can be connected to at least a drain outlet (e.g., main drain 1240) on valve control assembly 1244 using the pipe 2610. The valve control assembly 1244 can include one or more levers in connection to the valves of the drains of the side launcher system 1100 (e.g., drain 1220, 1244, and 1248). The drains connected to the launcher interface pipe 1206 and the launcher 1236, such as the manway adapter drain 1220, the main drain 1240, and the valves on the launcher outlet and holding tank inlet can be opened to fill the launcher interface pipe 1206 and the launcher 1236 with inert gas stored in the holding tank 2510. The product can be drained from the launcher interface pipe 1206 and the launcher 1236 simultaneous to the inert gas filling the components.

The holding tank 2510 can be disconnected from the launcher 1236 by disconnected the pipe 2610. The holding tank 2510 can be disconnected after the launcher interface pipe 1206 and the launcher 1236 is filled with the inert gas. The robot 1300 can be recovered from the tank after at least the launcher 1236. For example, the cap 1260 of the launcher 1230 can be opened. With the cart 1810 (e.g., or any other cart configured to carry the robot 1300), the robot 1300 can be transported from the launcher 1236. The cap 1260 can be reinstalled on the launcher 1236 after removing the robot 1300.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A method of inspecting a tank containing a flammable fluid, comprising:
    providing a launcher having a first end and a second end distal from the first end;
    coupling, via a gate valve, the second end of the launcher to a vertical side of the tank containing the flammable fluid;
    removing a first lid from the first end of the launcher;
    loading into the launcher, via the first end of the launcher, an autonomous vehicle;
    replacing, subsequent to loading the autonomous vehicle, the first lid on the first end of the launcher;
    opening the gate valve to release the flammable fluid into the launcher;
    causing the autonomous vehicle to be powered on based on a pressure within the launcher increasing above a pressure threshold from the flammable fluid being released into the launcher; and
    launching the autonomous vehicle, subsequent to being powered on, from the launcher into the tank to perform a tank inspection process.

2. The method of claim 1, wherein causing the autonomous vehicle to be powered on comprises:
    triggering a pressure switch of the autonomous vehicle to cause the autonomous vehicle to enter a powered state.

3. The method of claim 2, further comprising:
    navigating the autonomous vehicle from the launcher into the tank to perform the tank inspection process.

4. The method of claim 1, further comprising:
    filling the launcher with inert gas of a lower density than a density of the flammable fluid prior to releasing the flammable fluid into the launcher.

5. The method of claim 1, further comprising:
    removing a second lid from a manway located at the vertical side of the tank;
    coupling the gate valve, while closed, to the manway of the tank; and
    loading the tank with the flammable fluid.

6. The method of claim 1, further comprising providing a manway adapter having a first side comprising a first gate valve, and a second side coupled to the vertical side of the tank.

7. The method of claim 6, wherein coupling the launcher to the vertical side of the tank comprises coupling the launcher to the first side of the manway adapter.

8. The method of claim 1, further comprising:
    identifying, by the autonomous vehicle, a location of the launcher; and
    navigating, by the autonomous vehicle responsive to identifying the location of the launcher, from the tank into the launcher.

9. The method of claim 8, further comprising:
    closing the gate valve subsequent to the autonomous vehicle navigating from the tank into the launcher;
    removing the flammable fluid from the launcher; and
    removing the first lid on the first end of the launcher to retrieve the autonomous vehicle from the launcher.

10. The method of claim 9, wherein removing the flammable fluid comprises transferring the flammable fluid from the launcher into the tank.

11. The method of claim 9, further comprising:
    releasing, subsequent to removing the flammable fluid from the launcher, a cleaning solution into the launcher via a vent of the launcher; and
    draining the cleaning solution from the launcher.

12. The method of claim 1, wherein the launcher comprises a plurality of wheels to maneuver the launcher for coupling to the vertical side of the tank.

13. The method of claim 1, wherein loading comprises loading into the launcher, via the first end of the launcher, a plurality of autonomous vehicles.

14. A system of inspecting a tank containing a flammable fluid, comprising:
    a launcher comprising a first end having a lid and a second end, distal from the first end, coupled, via a gate valve, to a vertical side of the tank; and
    an autonomous vehicle loaded into the launcher via the first end of the launcher and comprising a data processing system causing the autonomous vehicle to:
        detect a pressure within the launcher based on the flammable fluid being released, via the gate valve, into the launcher;
        enter, responsive to the detected pressure being greater than a pressure threshold, a powered state; and
        navigate from the launcher into the tank to perform a tank inspection process based on the powered state being entered.

15. The system of claim 14, wherein the autonomous vehicle is in an unpowered prior to detection of the pressure greater than the pressure threshold.

16. The system of claim 14, wherein the autonomous vehicle further comprises a pressure switch to detect that the pressure is above the pressure threshold and cause the autonomous vehicle to enter the powered state, the autonomous vehicle navigating, responsive to entering the powered state, from the launcher into the tank.

17. The system of claim 14, further comprising:
    a manway adapter having a first side comprising a first gate valve and a second side coupled to the vertical side of the tank.

18. The system of claim 17, further comprising:
    a manway located at the vertical side of the tank, wherein the manway adapter couples to the manway.

19. The system of claim 14, wherein the autonomous vehicle further:
    identifies a location of the launcher; and
    navigates from the tank into the launcher for retrieval.

20. The system of claim 14, wherein the autonomous vehicle comprises a sensor, a propeller, a ranging device, and an inspection device.

* * * * *